July 19, 1966 W. GRAHAM 3,262,111

SYNCHRONIZED COMMUNICATIONS SYSTEM

Filed Dec. 6, 1963 17 Sheets-Sheet 1

SYSTEM TIMING

SYNCHRONIZATION BETWEEN TWO STATIONS (IN - SYNC. CONDITION)

INVENTOR.
WALTON GRAHAM

BY Darby & Darby

ATTORNEYS

SYNCHRONIZED COMMUNICATIONS SYSTEM

Filed Dec. 6, 1963 17 Sheets-Sheet 2

SYNCHRONIZATION BETWEEN TWO STATIONS
(OUT-OF-SYNC. CONDITION)

INVENTOR.
WALTON GRAHAM

BY Darby & Darby

ATTORNEYS

COARSE SYNCHRONIZATION USING START (B) PULSES

INVENTOR.
WALTON GRAHAM

BY Darby & Darby

ATTORNEYS

SYNCHRONIZED COMMUNICATIONS SYSTEM

Filed Dec. 6, 1963 17 Sheets-Sheet 4

INVENTOR.
WALTON GRAHAM

BY Darby & Darby

ATTORNEYS

SYSTEM TIMING DURING DATA TRANSMISSION PERIOD

INVENTOR.
WALTON GRAHAM

BY Darby & Darby

ATTORNEYS

July 19, 1966 W. GRAHAM 3,262,111

SYNCHRONIZED COMMUNICATIONS SYSTEM

Filed Dec. 6, 1963 17 Sheets-Sheet 6

INVENTOR.
WALTON GRAHAM

BY Darby & Darby

ATTORNEYS

INVENTOR
WALTON GRAHAM
BY Darby & Darby
ATTORNEYS

July 19, 1966 W. GRAHAM 3,262,111

SYNCHRONIZED COMMUNICATIONS SYSTEM

Filed Dec. 6, 1963 17 Sheets-Sheet 9

SYNCHRONIZATION-LEAD CASE

INVENTOR.
WALTON GRAHAM

BY Darby & Darby

ATTORNEYS

SYNCHRONIZATION - LAG CASE

INVENTOR.
WALTON GRAHAM
BY Darby & Darby
ATTORNEYS

INVENTOR.
WALTON GRAHAM

BY Darby & Darby

ATTORNEYS

July 19, 1966 W. GRAHAM 3,262,111

SYNCHRONIZED COMMUNICATIONS SYSTEM

Filed Dec. 6, 1963 17 Sheets-Sheet 12

INVENTOR.
WALTON GRAHAM

BY Darby & Darby

ATTORNEYS

SYNCHRONIZED COMMUNICATIONS SYSTEM

Filed Dec. 6, 1963 17 Sheets-Sheet 13

PULSE POSITION SELECTOR FOR B, A AND G PULSES

INVENTOR.
WALTON GRAHAM

BY Darby & Darby

ATTORNEYS

"OWN" INTERROGATION POSITION PULSE SELECTOR

START PULSE COARSE SYNCHRONIZATION

INVENTOR.
WALTON GRAHAM
BY Darby & Darby
ATTORNEYS

INVENTOR.
WALTON GRAHAM

BY Darby & Darby

ATTORNEYS

July 19, 1966 W. GRAHAM 3,262,111

SYNCHRONIZED COMMUNICATIONS SYSTEM

Filed Dec. 6, 1963 17 Sheets-Sheet 16

INVENTOR.
WALTON GRAHAM

Darby & Darby

ATTORNEYS

INVENTOR.
WALTON GRAHAM
BY Darby & Darby
ATTORNEYS

United States Patent Office 3,262,111
Patented July 19, 1966

3,262,111
SYNCHRONIZED COMMUNICATIONS SYSTEM
Walton Graham, Roslyn, N.Y., assignor, by mesne assignments, to Control Data Corporation, South Minneapolis, Minn., a corporation of Minnesota
Filed Dec. 6, 1963, Ser. No. 328,655
46 Claims. (Cl. 343—7.5)

This invention relates to radio communications systems and more particularly to a system for providing range, bearing and altitude information for a plurality of stations with respect to each other in order to provide for navigation, collision avoidance and air traffic control capabilities.

I. INTRODUCTION

In applicant's prior copending applications Serial No. 35,659 filed June 13, 1960, entitled "A Compatible Airborne Navigation-Air Traffic Control and Collision Avoidance System" now U.S. Patent No. 3,183,504, and Serial No. 42,886, filed July 14, 1960, and having the same title, both of which are assigned to the assignee of this application, systems were disclosed which provided navigation, collision avoidance and air traffic control capabilities for a plurality of stations. The systems previously disclosed utilize a master station which transmits synchronizing signals to a number of fixed base stations. The fixed base stations, which are at a known distance from the master station and therefore have a known time delay between the transmission and reception of the synchronizing signals, use these synchronizing signals to become synchronized with the master station, thereby providing a network of synchronized base stations.

Each of the base stations in those systems transmits reference pulses at a fixed rate and on a different carrier frequency. These reference pulses are received by a number of movable stations, such as aircraft. The movable stations transmit interrogation pulses to which the base stations respond by transmitting reply pulses. Enough different carrier frequencies are used to permit unambiguous interrogation of and reply by a particular base station.

The movable stations measure their range to any base station within their transmission range using beacon techniques which includes the transmission of interrogation pulses by the movable station combined with an automatic search for the reply pulse transmitted by the base station in response to a particular movable station's interrogation pulse. The search technique is used in order to separate the desired reply pulse from the reply pulses transmitted by the base station in response to interrogation pulses from other movable stations. Since each movable station can determine its range to a base station, thereby knowing the time of propagation of the base station reference pulses, it is possible to synchronize the interrogation pulses of the movable stations with the base station reference pulses. Therefore, since every movable station is synchronized with one or another base station, all of the base stations being synchronized with each other, all of the movable stations are in synchronism. Consequently, every movable station is capable of measuring the range to every other movable station or base station by observing the time of arrival of pulses from those stations. By restricting the time of transmission of various ones of the pulses from the moving stations to certain transmission positions, it is possible to provide additional information concerning the movable station, such as its altitude. Also, it is possible to make measurements on various received pulses in order to determine the bearing of one station from another. Therefore, these previous systems provide a complete arrangement having navigation, collision avoidance and air traffic cntrol capabilities.

While the aforesaid systems provide a complete working arrangement for the desired operations, several disadvantages are present. First of all, the presence of a number of base stations is required and these base stations must be synchronized with each other at the added cost of providing an auxiliary system for synchronization. Additionally, the operation of the various base stations on different frequencies requires the use of a substantial radio frequency bandwidth out of the already crowded frequency spectrum and also requires transmitters and receivers for the movable stations which must be both stable in frequency and tunable over the frequency band. Since the receivers for the movable stations must have a bandwith which is adequate to receive interrogation pulses transmitted at many possible frequencies in a wide frequency band, the range of operation of the systems is limited by the design of these wide band receivers.

The present invention is directed to a system for navigation, air traffic control and collision avoidance which eliminates many of the aforesaid disadvantages and also introduces unique operating advantages. In the present system, no master station is needed and there are no intermediate base stations which must be synchronized with each other by some auxiliary means. Instead, every station acts to synchronize with every other station, whether the station is fixed or movable. Also, all transmissions and receptions from movable or fixed stations occur at the same frequency, thereby considerably reducing the cost of each station's transmitter and receiver and at the same time allowing for greater receiver sensitivity and operation of the transmitters at relatively low powers. One advantage of the present system is that each base station is essentially identical with the movable stations and each base station is capable of providing range information to any of a number of movable stations by transmission of a small, fixed number of additional pulses, no matter how many movable stations are operating with a particular base station. This is in contrast to conventional base stations (beacons) which must transmit an additional number of reply pulses for each additional movable station to which range information is supplied.

As a further advantage, the present system is capable of providing range and other data among a number of movable stations without the necessity of any base station. This is desirable for providing collision avoidance and other necessary information to movable stations which are operating over large areas, for example, oceans, where base station facilities are unavailable.

It is therefore an object of this invention to provide a navigation, air traffic control and collision avoidance system.

A further object of this invention is to provide a system for synchronizing the transmissions of various stations, both fixed and mobile, without the use of separate synchronization apparatus.

Yet another object of the invention is to provide a navigation, air traffic control and collision avoidance system in which the transmissions of the fixed and mobile stations are synchronized.

Still a further object of the invention is to provide a system for synchronizing the transmissions of various stations, both fixed and mobile, and using these transmissions to provide range and altitude information of one station with respect to another.

Another object of this invention is to provide a system for synchronizing the transmissions of a plurality of stations by using only the transmissions themselves.

Other objects and advantages of the present invention will become more apparent upon reference to the following specification and annexed drawings, in which:

FIGURES 15A and 15C are block diagrams of different types of reversible counters while FIGURE 15B illustrates binary counting techniques;

II. SYSTEM SIGNAL TRANSMISSIONS

In order to explain the operation of the system of the present invention, the following symbols are adopted for the various transmissions:

R—reply pulses
I—interrogation pulses
B—start pulses
G—ground station information pulses
A—airborne station information pulses
*o*—subscript designating a signal transmitted by own station Throughout the description, the term "base station" is used to mean a station which is fixed relative to the movable stations. The base station, for example, may be a fixed ground station or a relatively stationary beacon station operating on the water. The term "movable station" is used to define those stations which move relative to the base stations and/or to each other. These may be, for example, aircraft, helicopters, or other types of stations moving in the air, on the ground, or on the water. It should be realized that other stations will fall within the definition of "base" or "movable" in the manner as defined herein.

Figure 1:
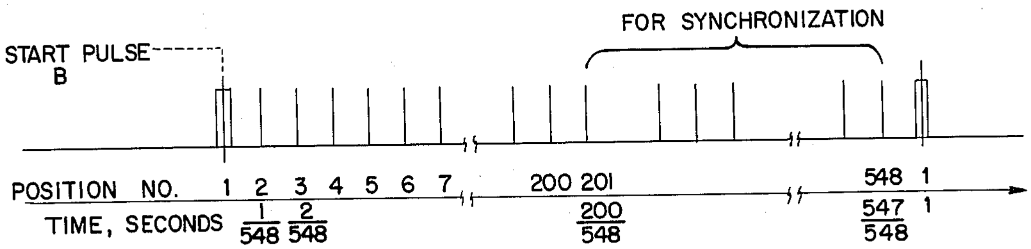
FIGURE 1 is a timing diagram showing various transmissions from base and movable stations.

In order to explain the operation of the system, reference is made to FIGURE 1 which shows some of the signals that are transmitted during each operating interval which, for the purposes of explanation is assumed to be one second.

The one second interval is divided up illustratively into 548 transmission positions occurring every 1/548 second. At *t* equal 0 second and at transmission position #1 the transmission interval begins with a START pulse B which is transmitted by each operating station. Positions #2 to #200 are data transmission positions with the even numbered positions, #2, #4 . . . #200 assigned to particular base stations for transmission of base station information pulses G and the odd numbered positions starting at #3 and up to #199 assigned to the movable stations. In the illustrative system application being described, the odd numbered positions are for transmission of airborne station information pulses A in accordance with the altitude layer within which the respective airborne stations are located.

For example, with respect to the base stations, base station X is assigned to transmit an information pulse G at position #2, base station Y to transmit an information pulse G at position #4 . . . and base station ZZ to transmit information pulse G at position #200. Since a particular base station transmits an information pulse only at its assigned transmission position with respect to start pulse B, a base station may therefore be identified by its transmission position. It should be realized that the same transmission position can be used for two base stations provided the two base stations are sufficiently far enough apart, so that the transmissions from one base station cannot be received by a movable station operating within range of the other base station.

In the illustrative embodiment of the invention being described, the odd numbered positions #3 . . . #199, for transmission of aircraft information pulses, correspond to a plurality of successive altitude layers of 300 feet. Therefore, those aircraft in the altitude layer from 0–300 feet transmit information pulses A at position #3, those aircraft in the altitude layer from 300–600 feet transmit pulses A in position #5, and so forth. It should be realized that a plurality of aircraft may be located in a particular altitude layer and each of these aircraft will transmit its respective altitude information pulse only at the proper position. The height of the altitude layers can be established in accordance with the complete system requirements, which includes the operating altitudes of the various aircraft. It should also be realized that each altitude layer does not have to be the same height but, for example, the height of the respective altitude layers can be increased with increasing altitude in order to take into consideration the fact that the accuracy of aircraft altimeters decreases with increasing altitude. In this case, therefore, the upper altitude layers would be of greater height than the lower altitude layers. For example, the lower layers would be 300 feet each and the upper layers 1000 to 1500 feet each.

Transmission positions #201 to #548 of FIGURE 1 are used by both the base stations and the movable stations to transmit interrogation pulses I for the purpose of obtaining and maintaining synchronization among all of the stations. The achievement of synchronization is necessary in order that the various stations may be able to transmit information at the proper positions and identify all the positions to obtain information from the other stations. According to the principles of the invention, no station, fixed or movable, transmits information pulses G or A in positions #2 to #200 unless it is synchronized. The determination of synchronization condition is automatically recognized by each station by the production of zero or minimal error signals in the station's error determining circuits and synchronization is achieved in a manner to be described.

Once the various stations are synchronized, they are able to determine the range to and altitude of the other stations within their transmission and reception range. For example, upon obtaining synchronization each movable station knows the transmission position and time of an information pulse G from a particular ground station and the measurement of the time between the transmission position and the reception of the G information pulse gives the range from the movable station to the ground station. A ground station is able to determine the range and altitude of aircraft by measuring the time of reception of the aircraft information pulse A after the occurrence of an odd numbered position and noting the transmission position number. In the same manner, each aircraft can determine the range to and altitude of every other aircraft.

While the system is described as using 548 transmission positions, of which 199 are used for information pulses and 248 for synchronization purposes, it should be realized that other transmission position rates, either higher or lower, may be used. Also, the rates of the information and synchronization positions may be different, if desired. The choice of the proper rates depends upon a number of factors, including station density (number of stations operating in a given area), desired range of operation between stations, system power, etc.

To summarize the various pulses that are transmitted by the system, at the start of each transmission interval each station, fixed or movable, transmits a start pulse B at position #1; information pulses G and A are transmitted by the base and movable stations respectively at the respective even and odd positions #2 to #200; and interrogation pulses I are transmitted by both the fixed and movable stations from positions #201 to #548 for synchronization purposes.

During the time allotted for synchronization (positions #201 to #548), in addition to the above pulses each station transmits a reply pulse R (not shown in FIG. 1) under certain conditions. The reply pulse is transmitted by a station in the time interval between the transmission position at which the station transmitted its own interrogation pulse and the next transmission position. A reply pulse is also transmitted by a station only after the first interrogation pulse from another station is received and the reply pulse is used by the other station to achieve synchronization.

Thus, during the time allotted for synchronization each station transmits its own I pulses and receives I pulses from other stations. Each station also transmits R pulses in reply to certain received I pulses and receives R pulses transmitted from other stations in response to the first mentioned station's own transmitted I pulses. As is described below, each station uses its own I pulses and the R pulses received from other stations in response to its own I pulses to achieve synchronization.

III. SYNCHRONIZATION OF TWO STATIONS

Figure 2:
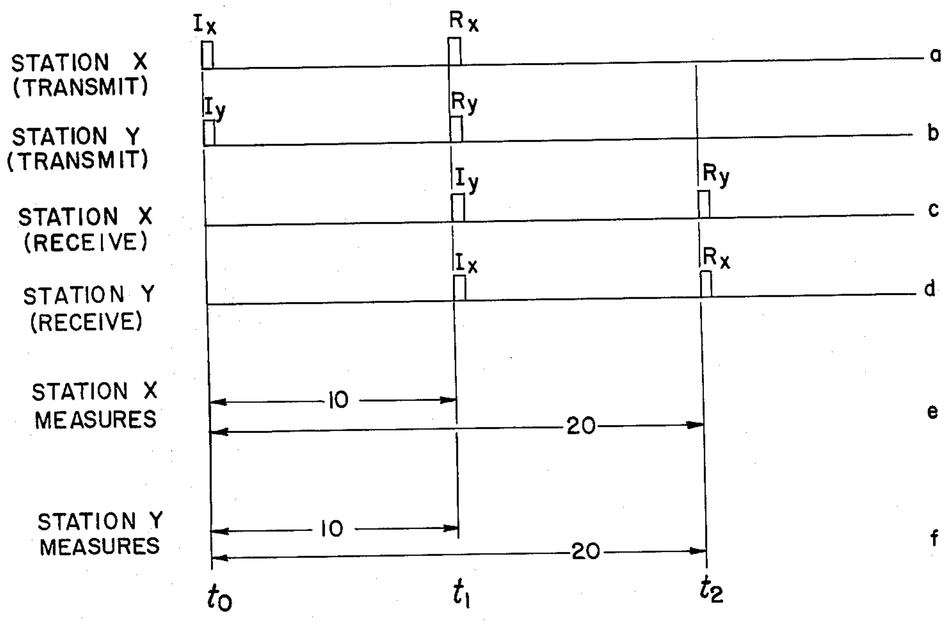
FIGURE 2 is a timing diagram showing the transmitted and received pulses of two stations in the synchronized condition.

To explain how the many stations operating in an overall field (i.e. all those stations, fixed or movable, operating together to achieve common synchronization) of stations are synchronized, reference is made to FIGURE 2 which shows the pulse transmissions which occur when two stations in the field are synchronized. The term "synchronized" may be explained as follows. Starting with the condition that a pulse is transmitted by each station at the instant that an oscillator at the station which controls the pulse producing means has a certain phase angle, for example, at the time of a positive zero crossing of a sine wave, two such stations and their respective oscillators are considered to be synchronized when the pulses transmitted by each station at a particular instant are observed simultaneously at a point midway between the two stations. The condition of synchronization to be described holds true for two movable stations, a fixed and a movable station, or two fixed stations. It should be recalled that the stations operate to achieve synchronization only during positions #200 to #548. However, once the synchronized condition is obtained by a station, it is held during the other positions #1 to #199 by various circuits at the station.

In order to obtain synchronization between the stations during transmission positions #200 to #548, each station transmits two kinds of pulses which are respectively interrogation pulses I and reply pulses R. Each station transmits interrogation pulses I in some of the positions after #200 and reply pulses R in response to the reception of the first interrogation pulse I from another (second) station received after transmission of the first station's own I pulse. The first I pulse received would be from the closest station in the field of stations which happened to transmit at the same position.

In order to achieve the synchronized condition each station attempts to synchronize the transmission of its own interrogation pulse I with the interrogation pulse transmitted by the other station. Each station does this by determining its range to the other station. This is accomplished by having each station measure the elapsed time between transmission of the station's own interrogation pulse and reception of the reply pulses transmitted by the second station in response to this interrogation pulse. Since the round trip time between the transmission of the interrogation pulse by a station and the reception of the reply pulse transmitted by the other station in reply to this interrogation pulse multiplied by the velocity of propagation of the signal is equal to twice the range between the two stations, the actual range between the two stations can be determined by dividing the overall round trip range by two.

By measuring the range between stations, each station is also able to determine the actual transmission time of the interrogation pulse I received from the other station. This is done by determining the time of receipt of the other station's interrogation pulse with respect to the first station's own interrogation pulse transmission time and the receipt of the reply pulse from the other station. If a station's own interrogation pulse was not transmitted in synchronism with the interrogation pulse of the other station, a correction is made to the station's master oscillator so that the system pulse transmission time is corrected on subsequent transmissions. It should be pointed out that both stations are normally trying to achieve synchronism so that both will be simultaneously making corrections.

FIGURE 2 shows the synchronized condition for two stations X and Y. Lines *a* and *b* show the pulses transmitted by Stations X and Y respectively while lines *c* and *d* show the pulses respectively received by Stations X and Y. At time $t=t_0$ in the in-sync (synchronized) condition, both stations X and Y transmit the respective interrogation pulses $I_X$ and $I_Y$ (lines *a* and *b*). This transmission would occur at any of positions #201 to #548. Pulses $I_Y$ and $I_X$ are received at the respective Stations X and Y at time $t=t_1$. The time between transmission of $I_X$ (or $I_Y$) and reception of $I_Y$ (or $I_X$) is called $T_{INT}$ and may be measured as a voltage $E_{INT}$.

In response to the reception of the interrogation pulses at time $t=t_1$, Station X transmits reply pulse $R_X$ and Station Y transmits reply pulse $R_Y$ (lines *a* and *b*). Reply pulses $R_Y$ and $R_X$ are received at the respective Station X and Y at time $t=t_2$ (lines *c* and *d*). The time between transmission of $I_X$ (or $I_Y$) and reception of $R_Y$ (or $R_X$) is called $T_{RPY}$ and may be measured as a voltage $E_{RPY}$ or as a number of pulses counted from a clock.

For explanatory purposes, line *e* shows that Station X measures 10 units of time ($T_{INT}$) and/or distance between times $t=t_0$ and $t=t_1$, i.e. between the transmission of its interrogation pulse $I_X$ and the reception of interrogation pulse $I_Y$ from Station Y. Station X measures 20 units of time ($T_{RPY}$) or distance between the transmission of its own interrogation pulse $I_X$ and the reception of reply pulse $R_Y$. Since the interrogation pulses $I_X$ and $I_Y$ are initially synchronized, Station Y also measures the same respective number of units of time or distance (10 and 20) between the transmission of its own interrogation pulse $I_Y$ and the reception of interrogation pulse $I_X$ and between transmission of $I_X$ and the reception of reply pulse $R_X$. When synchronization exists there is a 2:1 ratio between $$\frac{T_{RPY}}{T_{INT}}$$

or $$\frac{E_{RPY}}{E_{INT}}$$

These time and/or distance measurements may be made in analog fashion by storing a voltage proportional to time on a capacitor or digitally, by counting pulses generated by a high frequency clock. Both of these techniques are well known in the art.

It should be noted that when the stations are syncronized the range from Station X to Y is determined at Station X by measuring the elapsed time between transmission of pulse $I_X$ and reception of pulse $R_Y$. Station Y determines the range to X by measuring the elapsed time between transmission of $I_Y$ and reception of $R_X$. The range between stations is equal to one-half the time measured multiplied by the velocity of propagation. Also, the range between the two stations is equal to the time of transmission of $I_X$ (or $I_Y$) and the time of reception of $I_Y$ (or $I_X$) multiplied by the velocity of propagation.

As can be seen, if the interrogation pulses $I_X$ and $I_Y$ are initially synchronized, each station receives the interrogation pulse transmitted by the other station midway in time between transmission of its own interrogation pulse and reception of the reply pulse transmitted by the other station. This follows from the fact that the elapsed time between transmission of an interrogation pulse by one station and reception of the interrogation pulse which was transmitted at the same time by the other station equals the distance between the stations divided by the velocity of propagation. The elapsed time between transmission of an interrogation pulse by one station and reception of a reply pulse transmitted by the other station upon reception of this interrogation pulse is equal to the two-way (round trip) distance between stations divided by the velocity of propagation.

It should be noted that when there is a relative velocity between the two stations a small error in measurement will occur. This error is proportional to the range between the stations and their relative velocity. In a typical case of a 200 mile range between the stations and 1000 feet per second relative velocity, this error is only in the order of $10^{-9}$ seconds, which is negligible with respect to the overall accuracy of the system.

When the interrogation pulses from the two stations are not initially synchronized, one station will conclude, after making measurements of the elapsed time between transmission of its interrogation pulse and receipt of the interrogation and the reply pulses from the other station, that its own interrogation pulse was late (or early) with respect to that of the other station. The other station will conclude that its interrogation pulse was early (or late) with respect to the first station. Therefore, at both stations the 2:1 ratio of time or voltage measurements, in which the larger quantity $T_{RPY}$ or $E_{RPY}$ of the ratio is produced by measuring the interval from the transmission of an I pulse to the reception of an R pulse and the smaller quantity $T_{INT}$ or $E_{INT}$ by measuring the interval between the transmission of an I pulse and the reception of another I pulse, will not be present.

Figure 3:
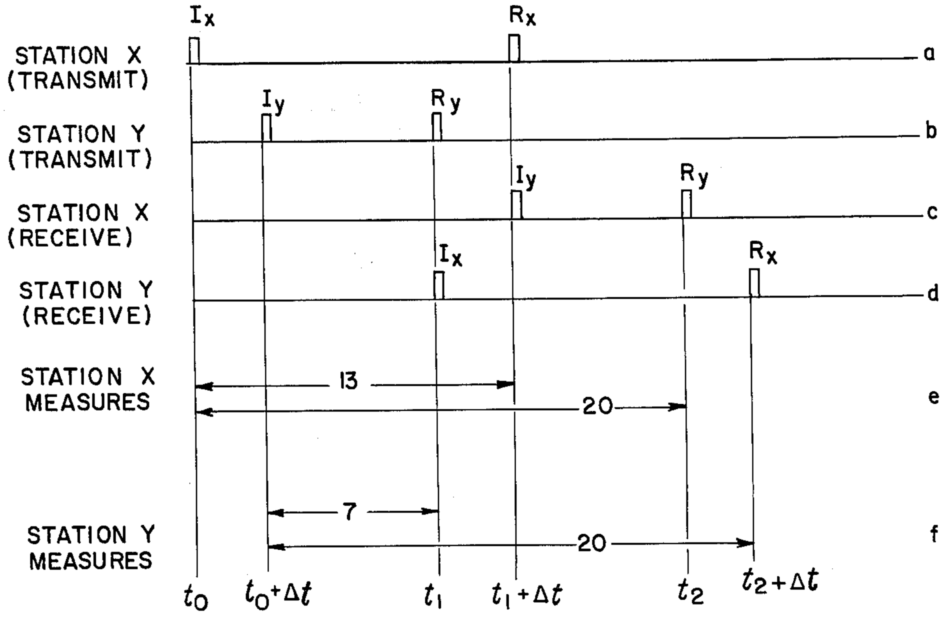
FIGURE 3 is a timing diagram showing the transmitted and received pulses for two stations in the unsynchronized (out-of-sync) condition.

The unsynchronized condition between two stations is shown in FIGURE 3, wherein Station Y transmits its interrogation pulse $I_Y$ at a time $t=t_0+\Delta t$ which is $\Delta t$ late with respect to the transmission of interrogation pulse $I_X$ at time $t=t_0$. It can be seen (line *c*) that Station X receives pulse $I_Y$ at a time which is more than halfway between the time of transmission of its own interrogation pulse $I_X$ and the time of reception of the reply pulse $R_Y$ which was transmitted by Station Y in response to interrogation pulse $I_X$. Similarly, it can be seen (line *d*) that Station Y receives interrogation pulse $I_X$ at a time less than halfway between the time of transmission of its own interrogation pulse $I_Y$ and the time of reception of the reply pulse $R_X$ which was transmitted by Station X in response to interrogation pulse $I_Y$. The magnitude of the discrepancy in the ratio of the two times measured by Stations X and Y from the ratio of 2:1 for the synchronized condition is proportional to the synchronization error. This is quantitively shown in FIGURE 3, where it can be seen that Station X measures 13 units from time $t=t_0$ to the reception of pulse $I_Y$ at time $t=t_1+\Delta t$ and 20 units from time $t=t_0$ to the reception of reply pulse $R_Y$ at time $t=t_2$. Station Y measures 7 units from the time of transmission of pulse $I_Y$ at time $t=t_0+\Delta t$ to the reception of pulse $I_X$ at time $t=t_1$ and 20 units from the time $t=t_0+\Delta t$ to the reception of reply pulse $R_X$ at time $t=t_2+\Delta t$. This gives the respective time or voltage ratios of 20:13 and 20:7 for Stations X and Y and the stations are therefore not synchronized. If the error in transmission was reversed, i.e., Station X transmitted later than Station Y, then the measured quantities and ratios would also be reversed. In either case, the error produced by the deviation of the measurement ratio from the synchronized ratio of 2:1 is used to produce synchronization.

The operation of present system is such that at each station the time between transmission of its own interrogation pulse I and reception of the reply pulse R, generated by another station upon the reception of the I pulse, is independent of synchronization and depends only on the distance between the two stations as in a conventional beacon system. The distance is measured by a time quantity. On the other hand, the time of reception of the interrogation pulse transmitted by the other station depends on synchronization and the distance between the two stations. Thus, at each station if the interrogation pulse received from the other station lies in time less than or greater than halfway between the time of transmission of an interrogation pulse and the reception of the reply pulse transmitted by the other station in response to this interrogation pulse, it is determined that the two stations are out of synchronism. The amount of error greater than or less than the halfway distance in time is used to correct the oscillators of both stations so that the stations are driven to the synchronized condition.

The time-synchronization error can be measured in any of a number of ways. For example, capacitor and switching circuits can be used in which the station's own interrogation pulse starts two capacitors charging toward a predetermined voltage level established by a voltage source by activating an electronic switch which is connected between each capacitor and the voltage source. The charge up of one of the capacitors is terminated by the interrogation pulse received from the other station to measure $T_{INT}$ and produce $E_{INT}$ by having this pulse operate the switch to disconnect the circuit from the voltage source. The charge up of the other capacitor is terminated by the reply pulse received in response to the station's own interrogation pulse to measure $T_{RPY}$ and produce $E_{RPY}$. The various pulses are sorted out and applied to the proper circuits by pulse decoders in the station's receiver. Also the capacitor which measures the time $T_{RPY}$ between the interrogation and the reply pulses charges at one-half the rate of the one that measures the time $T_{INT}$ between the transmitted and received interrogation pulses. Therefore, when the two stations are synchronized, the voltages $E_{RPY}$ and $E_{INT}$ on the two capacitors will be equal. If the stations are not synchronized then an error voltage is produced which is used to control the phase of an interrogation pulse oscillator at each station. It should be realized, of course, that any suitable time measuring circuits may be used, as is well known in the art. One such circuit would be of the digital type in which two counters are started by the station's own interrogation pulse to count the number of pulses from a clock oscillator. The count of one counter is terminated by the interrogation pulse received from the other station while the count of the other is terminated by the reply pulse received from the other station in response to the station's own interrogation pulse. The difference in the two counts is used to produce a control voltage to control the phase of the interrogation pulse oscillator. If desired, the second counter can be made to count every other pulse from the clock so that the output of the two counters may be directly subtracted and used to produce the error voltage.

Figure 4:
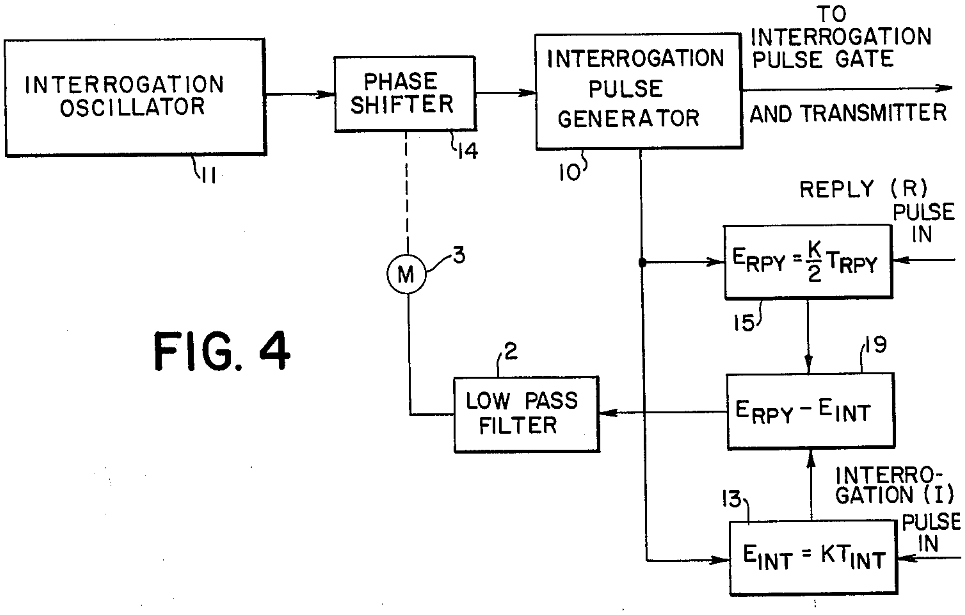
FIGURE 4 is a schematic block diagram of one type of circuit for correcting the phase of an oscillator to obtain synchronization.

FIGURE 4 shows an analog circuit at a station for producing the error voltage used for synchronizing the interrogation pulses of that station to those of the other station (or stations) operating in the field. The circuit includes an interrogation oscillator 11 which controls an interrogation pulse generator 10. The pulse generator 10 supplies interrogation pulses to an interrogation pulse gate and transmitter (not shown in this figure) and to two time-measuring circuits 13 and 15. Circuits 13 and 15 measure the times $T_{INT}$ and $T_{RPY}$ and produce the respective voltages $E_{INT}$ and $E_{RPY}$.

The interrogation pulse from the generator 10 starts the time-measuring cycle of each of the circuits 13 and 15. As described before, these circuits may be capacitors which charge toward some predetermined voltage. In the case of circuit 13, the charging cycle is terminated by another interrogation pulse which is received by the station's receiver, decoded from the other received pulses, and applied to measuring circuit 13. The voltage $E_{INT}$ produced by the measuring circuit 13 is a measure of the time between transmission of the station's own interrogation pulse and receipt of the other station's interrogation pulse. The measuring cycle of circuit 15 is terminated by the reply pulse which is received from the other station and the voltage $E_{RPY}$ is produced. As pointed out before, circuit 15 preferably measures or charges at one-half the rate of circuit 13, so that when the two stations are synchronized, $E_{INT}$ will equal $E_{RPY}$. The synchronization error voltage is produced by a subtractor circuit 19, in which $E_{INT}$ is subtracted from $E_{RPY}$. If the two stations are asynchronized, the output of circuit 19 is zero and there is no error voltage produced. However, if the two stations are unsynchronized then an error voltage is produced.

The magnitude and polarity of the error voltage depends upon the amount by which the interrogation pulses of the two stations were early or late with respect to each other. The error voltage is applied through a low pass filter 2 to a motor 3 which controls a phase shifter 14 interposed between the interrogation pulse generator 10 and the interrogation oscillator 11. Depending upon the magnitude and polarity of the error voltage produced by circuit 19, the motor 3 moves phase shifter 14 in a direction so that the signals from oscillator 11 are shifted in phase the correct amount and direction to synchronize the interrogation pulses from generator 10 to those of the other station. It should be recognized that each station is performing the phase shift correction, so that synchronization is obtained somewhere between the overall error in synchronization between the two stations.

IV. SYNCHRONIZATION OF MORE THAN TWO STATIONS

In the preceding section the synchronization of two stations was discussed. In this section it will be shown that synchronization can be obtained when more than two stations exist or are present in the field of stations to be synchronized, although the presence of many stations complicates the problem. In order to illustrate this, difficulty consider the case of three stations, X, Y, and Z, which are initially unsynchronized but which are to become synchronized with each other. At some transmission position after #200, each of the Stations X, Y, and Z transmits an interrogation pulse. These interrogation pulses are initially unsynchronized. Each station also transmits a reply pulse in response to each interrogation pulse that it receives. Therefore, each station receives two interrogation pulses, which are transmitted by the other two stations and four reply pulses, two reply pulses being transmitted by each of the other stations in response to the two interrogation pulses that each of these other stations receives. Of the four reply pulses received by each station, two of these reply pulses are in response to the interrogation pulse transmitted by the station itself. If these two reply pulses are isolated and each reply pulse is paired with the interrogation pulse which was transmitted by the same station that transmitted the reply pulse, synchronization with either station could be effected as described in Section III above in the same manner as for two stations.

It should be realized that a difficulty would arise if Station X synchronized with Station Y, Station Y with Z, and Z with X since this would actually leave all stations unsynchronized. In order to overcome this, each station could be allowed to correct its interrogation pulse transmission to the average time of transmission of all three stations, thereby eventually achieving synchronism. Also, a coding system could be utilized wherein Stations X, Y, and Z send out indentifiable (coded) interrogation and reply pulses, so that one station could select the identifiable pulses from another station and synchronize with it. It should be realized that as the number of stations in the field increases, such types of time averaging or coding arrangements become more complex and therefore less feasible and reliable. A preferred technique for achieving synchronization among a number of stations in the field, called the "red-green" condition technique, is described in Section VI below.

In order to understand how a number of unsynchronized stations are driven in a convergent manner into synchronization, the following qualitative explanation is given. Consider, for example, the case in which there are 200 stations in the field. Each station has an oscillator for controlling the production of interrogation pulses and the output of each oscillator is assumed to differ in phase by the same amount with respect to the oscillator most nearly in phase, so that the phases of the oscillators are uniformly distributed in angle. Therefore, in the field of the 200 stations during one synchronization interval, in which there is a total phase of 360 degrees over which the oscillators are unsynchronized, the phase difference is 1.8° between the phase of each successive oscillator. Considering each of the oscillators as a vector, there being 200 vectors spaced 1.8° apart from each other, when these vectors all converge all of the oscillators are in synchronism. It should be clear that if the vectors are to converge at all that convergence at any angle in the 360° interval is equally probable.

When a pair of vectors is selected at random from the 200 vectors present in the field and the phases of the two vectors are moved to an angle halfway between their initial phase angles, these two vectors (stations) are said to be synchronized. This type of phase correction for the oscillator of each station can be accomplished by the circuit of FIGURE 4, by gearing the motor to move the phase shifter to change the phase of each oscillator only one-half the amount of synchronization error signal, thereby making each oscillator synchronize at a phase angle half-way between their respective original phase angles. By picking a second pair of vectors at random, this second pair having neither one, nor both of the vectors of the first pair, these two new vectors are also synchronized when both of their phase angles are moved to the bisector of the angle between them. Of course, if the second pair is the same as the first pair, nothing happens, i.e. synchronism is still maintained. However, if one vector of an already synchronized pair is used in a subsequent comparison, the synchronization of the pair from which that one vector is selected is destroyed.

By continuing this random selection of vector pairs and moving the respective phase of each vector to the bisector of the angle between them, the distribution of angles of the vectors changes from a uniform one of one vector at every 1.8° to a non-uniform one in which one or more angular regions become more heavily populated with a number of vectors. This will occur, since, as more comparisons of vectors are made, the probability will increase that one of the vectors selected for a pair will already have been synchronized. Therefore, the already synchronized vector will tend to draw the other vector towards its own angular position, i.e. at least half the angular amount towards its original position of synchronization. As subsequent comparisons are made between two vectors, the probability that one vector of the pair selected comes from a more populated or favored region increases, since more and more vectors are moved into the more populated regions. This tends to draw all the vectors from the less populated regions into the more populated regions. At the same time this selection process tends to spread out the angular range of the favored region into which the vectors are drawn since each originally synchronized vector is moved each time it is used in a comparison. However, as more vectors are moved into a favored region the probability increases that two vectors are chosen from the same favored region than from two unfavored regions. This tends to narrow the angular range of the favored regions and after a number of comparisons the net result is convergence of all the vectors. This means that, by using the random comparison process and making a sufficient number of comparisons, all stations can become synchronized even though the initial condition was one of complete lack of synchronization.

The time required for all stations to reach convergence (synchronization) within a predetermined tolerance or error is dependent upon the number of stations in the field to be synchronized, the number of comparisons required and also the rate at which the comparisons can be made. The latter factor varies with the maximum range of the system, i.e. as the system range within which stations are to be synchronized increases, there must be a longer time between each transmission synchronization position. This decreases the number of intervals reserved for synchronization purposes during a one second interval. Also, if more positions are reserved for data transmission, there will be fewer left for synchronization purposes, thereby increasing the time available for obtaining convergence.

Figures 5, 6:
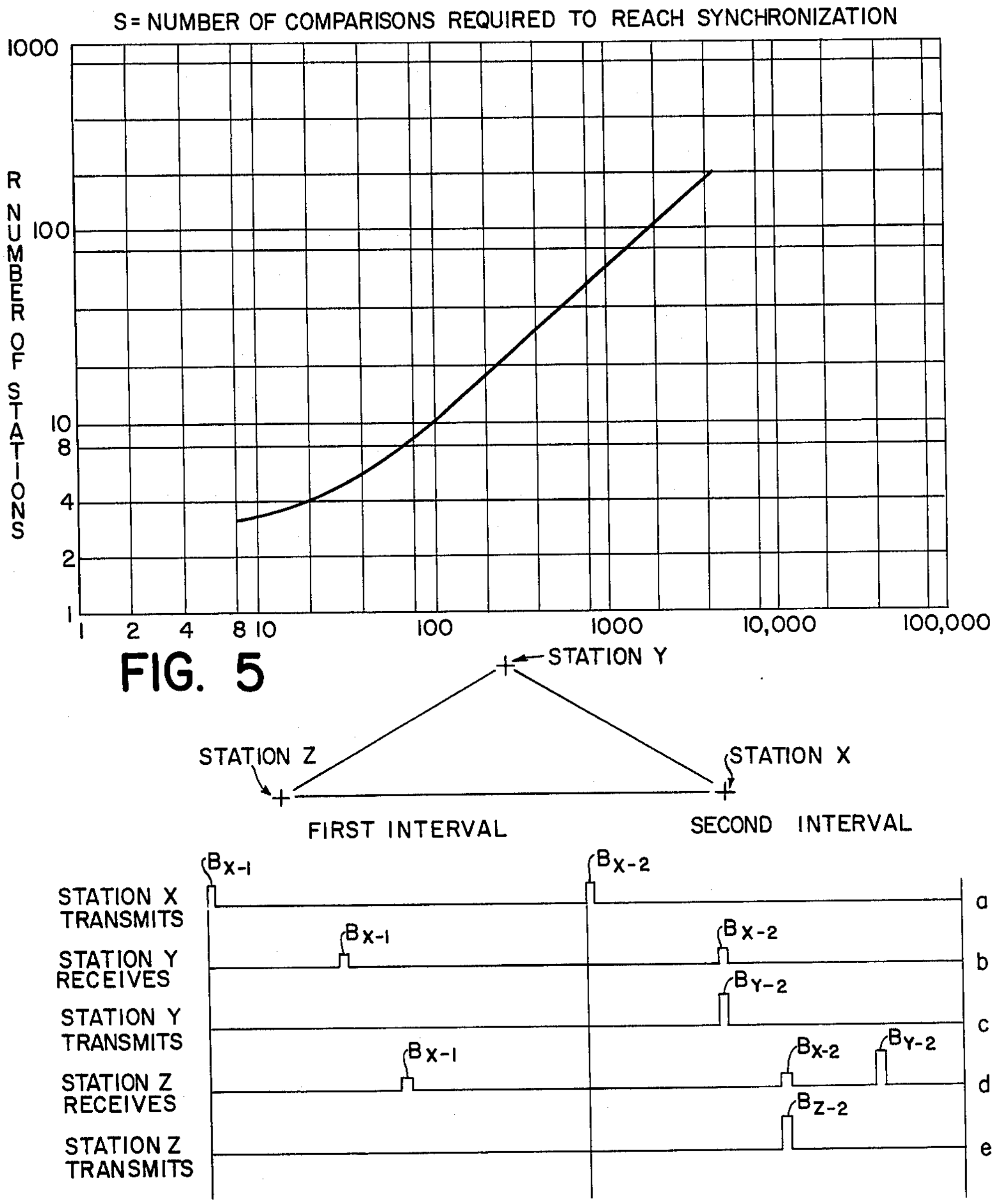
FIGURE 5 is a graph showing the number of comparisons between stations required to reach synchronization.
FIGURE 6 is a timing diagram showing the use of START (B) pulses to achieve coarse synchronization between stations.

To illustrate typical examples of the time necessary to obtain synchronization (convergence) reference is made to FIGURE 5. In FIGURE 5, synchronization times are illustrated for a system using 350 intervals per second for synchronization purposes out of a total of 550 intervals per second. The frequency of the oscillator of each station during synchronization time is therefore 550 c.p.s., giving a period of 1818.1 microseconds or approximately 1800 microseconds per interval. If the oscillators are to be locked in phase with an error of no more than 0.01°, meaning that the vectors will all converge to within 1 part in 36,000, the equivalent maximum time error between oscillators will be 1800/36,000 or 0.05 microsecond. This would give a maximum error in range measurement of approximately only 50 feet due to the absence of complete convergence. This error is relatively insignificant when the system is used with present day aircraft moving at high speeds.

FIGURE 5 shows in general the number of comparisons required to synchronize $n$ stations from the initial condition of complete lack of synchronization (a uniform distribution of the time error in each station over 360°). It should be realized that this is the worst possible condition since it is assumed that all stations are initially unsynchronized. In normal system use there will be, at the worst, only situations in which the field comprises only a few stations which are unsynchronized or there will be many synchronized stations in the field to which a few unsynchronized stations are to be added. The criteria represented in FIGURE 5 is convergence with a maximum phase error of about 0.1°, for the initial condition of uniform distribution of the phases of the oscillators of the various stations, and a system efficiency of about 25%, i.e., each station making a phase correction with another station only in about one-fourth of the synchronization intervals. It can be seen that the time required to achieve complete synchronization is relatively short, for example, for 100 stations it takes about 2000 comparisons to reach convergence within the 0.1° error. When there are 347 intervals per second available for synchronization comparisons and there is a system efficiency of 25%, meaning that only two stations transmit in one interval and a successful comparison is made only during 25% of the synchronization intervals, there is an average of 187.5 comparisons per second. Under the stated conditions, it takes about 12 seconds to reach synchronism where there are 100 stations which are completely unsynchronized initially. As the number of stations decreases, the time required for convergence also decreases. For example, for 50 stations whose oscillator phases are uniformly distributed, it will take only about 9 seconds for the oscillators of these stations to become synchronized within a maximum error of 0.1°, and 14 seconds to become synchronized within 0.01°. It should also be realized that as the maximum permissible phase error for oscillator synchronization is increased, that the time for synchronization decreases. For example, about 20% fewer comparisons are needed for convergence to a 0.1° phase error than for a 0.01° phase error. The values of FIGURE 5 are derived from statistical analysis and probability theory and are believed to be relatively accurate within the normal limits of error imposed by such types of analyses. It should be considered that the values given by FIGURE 5 are illustrative of the invention only.

As pointed out above, the condition described and shown in FIGURE 5 is the worst possible condition where all stations are initially unsynchronized. In actual operation the situation is that there are only a few unsynchronized stations comprising the whole field which will become synchronized in a few seconds or there is a field of many synchronized stations to which a few unsynchronized stations are added. In the former situation the few stations in the field will eventually become synchronized so no special technique is needed. In the latter situation, rather than permit these few unsynchronized stations which are added to the larger group of synchronized stations to pull one or more of the latter out of synchronization, a search and lock mode of operation may be used. If a majority of the comparisons made for synchronization purposes at a station joining the field show an oscillator phase correction to be required, indicating that the station is initially unsynchronized, the station applies the full correction (i.e., search mode). However, if during the making of the synchronization comparisons the majority of comparisons yield little or no phase correction, meaning that the station is synchronized, only a fraction of the correction is applied (the lock mode). Thus, the oscillator of a station already synchronized with many others will take only a very small step toward the phase of an unsynchronized newly added station since the majority of phase comparisons at the synchronized station will show that no oscillator phase correction is needed. On the other hand, the unsynchronized new station shows a larger error and the need for a large phase correction each time it makes a comparison. Therefore, this station will apply the full phase correction during search mode to bring its oscillator into step with the other stations.

Synchronization of all stations in a given field can also be achieved more rapidly by using a coarse synchronization technique in which each unsynchronized station newly added to the field observes the time of arrival of received start pulses and first synchronizes to these pulses before finally synchronizing to the interrogation pulses. This technique is described below.

V. COARSE SYNCHRONIZATION

As stated above, the period of time required to achieve synchronization between stations can be reduced by using a coarse synchronization technique. The coarse synchronization technique utilizes the preliminary adjustment of the time of transmission of interrogation pulses from a station during the synchronization interval based upon observation of start pulses from other stations. The coarse synchronization technique also prevents transmission of information pulses by a station before it achieves synchronization with the rest of the stations in the field.

When a new, unsynchronized station about to become a part of a field of synchronized stations observes the start pulses B being transmitted by the other stations in the field, it will see a few start pulses of large amplitude from nearby stations followed by increasing numbers of start pulses of smaller amplitude from stations further away. This is consistent with the fact that for a given density of traffic the expected number of stations increases with the square of the range from the first station. If the new, unsynchronized station knew the range to the closest synchronized station in the field, it could adjust the time of transmission of its interrogation pulses, so that it would be synchronized with the field as soon as it transmitted. This can be accomplished readily if the range from the unsynchronized to the synchronized station is known, since this tells the unsynchronized station when the synchronized station transmitted. Therefore, the new station can be synchronized the first time it transmits. Such an arrangement can be used, for example, when an unsynchronized aircraft station is about to leave an airport in which the airport station is synchronized to the field of stations and the new station knows its distance from its location, for example, at the end of a runway, to the airport station. This can be done easily by providing runway markers, auxiliary radio signals, etc. In this case, where the range between the two stations is known, the coarse synchronization technique is not needed.

The coarse synchronization technique is used in cases where the new station does not know its range to the closest synchronized station in the field. In accordance with the coarse synchronization technique, the new, unsynchronized station sets the phase of its oscillator to transmit its interrogation pulses by synchronizing with the first start pulse B (position #1) received from the closest synchronized station in the field. It should be recalled that each interrogation pulse is to be transmitted at intervals some time after the start pulse is transmitted (i.e. from positions #201 on) but at a fixed time relation to the start pulse as determined by the station's master oscillator. Therefore, the new station transmits its own interrogation pulse before it receives any other interrogation pulse since the first start pulse which comes from the closest synchronized station, and the interrogation pulse of this closest station is received at the new station before the interrogation pulse from any other synchronized station is received. By using this technique the maximum time error of synchronization that a new station can have upon joining the field is equal to the transmission time of a pulse from the closest synchronized station to the new station.

To illustrate the advantage of coarse synchronization consider the situation where there are approximately 1800 microseconds between allowed transmission synchronization positions (position #201, etc.) and there is another station within 30 miles (180 microseconds transmission time). In this situation the possible initial synchronization error between the two stations, if the new station is permitted to transmit at any time, would be plus or minus 900 microseconds. By using coarse synchronization, it is possible to reduce the initial synchronization error in the transmission time between the two stations. In the illustration given, this error is approximately 180 microseconds. This should be clear when it is considered that if the new station synchronizes its oscillator to the reception of a start pulse from the closest station, the oscillator of the new station is no further out of synchronism than the transmission time of the start B pulse from the other station. Therefore, it is only necessary to apply a phase correction to compensate for this initial transmission time in order to achieve coarse synchronization. Once coarse synchronization is achieved, the new station proceeds to achieve actual synchronization in the manner previously described. By achieving coarse synchronization first, the new station will be able to become absolutely synchronized to the field more rapidly and it will not disrupt the stations in the field which are already synchronized by pulling the phases of their oscillators too far away, if at all, from the synchronized condition. This should also be clear from the description of synchronization given previously.

The use of coarse synchronization also makes it certain that any station which receives a reply pulse from a new station is assured that it will first receive the interrogation pulse of the new station. This is so because the new station must transmit its own interrogation pulse before it will receive other interrogation pulses during a synchronization interval. In other words a new station can only transmit a reply pulse after it receives an interrogation pulse from another station, and this can only occur after the new station transmits its own interrogation pulse. This is very helpful in establishing a simple criterion for determining that a particular interrogation pulse and a particular reply pulse originate with the same station. When this determination is made, fine synchronization corrections are made by observing the time of arrival of these two pulses in the manner described with respect to FIGURES 1–4. The manner by which one station is able to determine that the two pulses originate from the same station is described below.

In order to explain the operation of the coarse synchronization technique, reference is made to FIGURE 6 which shows Stations X, Y and Z located at some distance from each other and not on the same straight line. These stations are considered to be initially unsynchronized. The letter subscripts of the pulses in this figure refer to the station transmitting and the number subscripts to the interval during which the event takes place. In FIGURE 6, it is assumed that Station X transmits the earliest start pulse $B_{X-1}$ (line *a*) during the first one-second interval of operation and that Stations Y and Z are to be coarsely synchronized to X. Start pulse $B_{X-1}$ is received by Station Y during the first one-second interval (line *b*) at a time corresponding to the distance between Stations X and Y. Station Y phases its oscillator so that it transmits its start pulse $B_{Y-2}$ when it receives the second start pulse $B_{X-2}$ from Station X (lines *b* and *c*) during the next one-second interval. Station Y must transmit its start pulse $B_{Y-2}$ one second after receiving pulse $B_{X-1}$ to coincide with the arrival of the second start pulse $B_{X-2}$ from Station X, since Station Y cannot simultaneously receive the first start pulse $B_{X-1}$ from Station X, rephase its oscillator and transmit a start pulse of its own. Station Z receives start pulse $B_{X-1}$ from Station X before it can receive pulse $B_{Y-2}$ from Station Y. Therefore, Station Z transmits start pulse $B_{Z-2}$ during the second interval at the time it receives pulse $B_{X-2}$. Actually, Station Z will always receive the start pulse from Station X first during each interval after the first, unless Station Y is on a line between Stations X and Z. It can be seen that all stations are now coarsely synchronized with the maximum error being the time of transmission between Stations X and Z. It should be noted that Stations Y and Z are more nearly in synchronism than Stations X and Y or X and Z.

In order to realize the effects of coarse synchronization on subsequent attempts at fine synchronization during the synchronization intervals, reference is made to FIGURE 7. In considering FIGURE 7, it should be remembered that the start pulses B are transmitted by every station every second in position #1 after coarse synchronization has been achieved, i.e. synchronization of each station with the first start pulse received. Also, it should be recalled that transmission of interrogation pulses I occur (or do not occur) at random in positions #201 to #548 of FIGURE 1, and that these pulses along with the reply pulses received in response thereto, are used to achieve synchronization. The I pulses of two stations will have the same relationship or synchronization error as their coarsely synchronized start pulses. Therefore, if Station Z is coarsely synchronized to Station X, pulse $I_Z$ will be transmitted by Station Z at the same time it receives pulse $I_X$, if Stations X and Z happen to transmit I pulses at the same position.

In FIGURE 7, Stations X, Y and Z are shown at some instant of time with arbitrary distances (or transmission times) of four units between Stations X and Y, three units between Stations Y and Z, and six units between Stations X and Z. These arbitrary time and distance units are shown for illustrative purposes only.

Figures 7A, 7B, 7C:
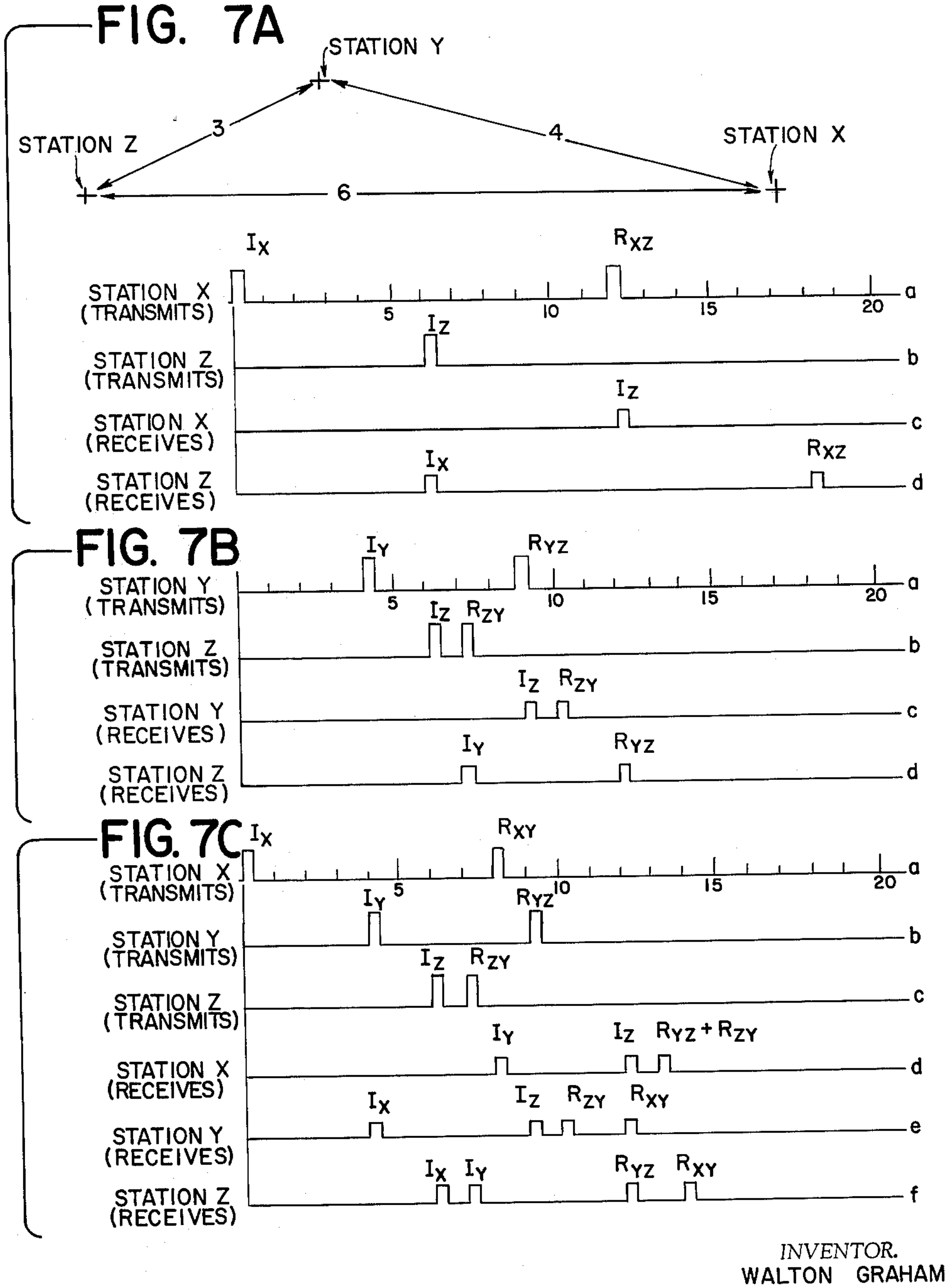
FIGURES 7A, 7B and 7C show the effects of coarse synchronization on three stations.

Referring to FIGURE 7A, consider now that coarse synchronization between Stations X and Z has already been achieved but that no corrections have been applied by either of the stations to achieve fine synchronization of the interrogation pulses. FIGURE 7A shows the situation which exists, after the "second interval" described in FIGURE 6, between Stations X and Z during a fine synchronization interval when only these two stations are operating. Station X transmits its interrogation pulse $I_X$ (line *a*) first and this pulse is received by Station Z at time equal to six units (line *d*), which is the synchronization error. Since coarse synchronization has already been achieved, Station Z transmits its interrogation pulse $I_Z$ (line *b*) simultaneously with the reception of $I_X$. Under these circumstances, Station Z will fail to detect pulse $I_X$ and fail to reply to it. This is so because Station Z transmits its interrogation pulse $I_Z$ simultaneously with the reception of the interrogation pulse $I_X$ from Station X at the beginning of a position and it therefore is not in a condition to transmit a reply pulse, as yet.

At time equal to twelve units, Station X receives pulse $I_Z$ from Station Z (line *c*) and responds to it by transmitting reply pulse $R_{XZ}$ (line *a*) which is received by Station Z at time equal to eighteen units (line *d*). Since Station Z receives both an interrogation and a reply pulse from Station X, it can correct or try to synchronize with Station X. Station X cannot correct towards Station Z because it has not received a reply pulse from Station Z. In this case, Station Z will phase its oscillator to transmit its interrogation pulses earlier. Actually, if Station Z does not see pulse $I_X$ from Station X, i.e., receives $I_X$ at the same time it transmits, $I_Z$, then it cannot synchronize. Therefore pulse $B_Z$ from Station Z should be phased to occur just slightly before Station Z receives the $B_X$ start pulse. This can be readily accomplished by adjusting the phase of the oscillator at Station Z.

In a subsequent comparison between these two stations at a later position number (not shown), the interrogation pulse $I_Z$ from Station Z would be earlier by an amount of time equal to the applied correction. Station X would still transmit its interrogation pulses at the time originally established by the coarse synchronization, since no correction has been applied to its oscillator. Now, however, since pulse $I_Z$ is earlier, Station Z transmits a reply pulse $R_{ZX}$ in response to $I_X$ and since each station receives I and R pulses from the other, both stations can now correct their respective oscillators to achieve synchronism. Therefore the use of coarse synchronization considerably reduces the time necessary to achieve absolute synchronization between Stations X and Z or any two coarsely synchronized stations, since the two stations try to obtain synchronism starting with an error in the phases of their respective oscillators which is much less than the average error which would be present in the absence of coarse synchronization.

FIGURE 7B depicts the situation when only Stations Y and Z transmit. In this case, there is still a measure of coarse synchronization between these two stations because Stations Y and Z both synchronized to the first start pulse $B_X$ that they received, this being from Station X. In FIGURE 7B interrogation pulse $I_Y$ (line *a*) transmitted from Station Y is received at Station Z (line *d*) at a time three units after transmission. These two stations being coarsely synchronized, Station Z transmits its interrogation pulse $I_Z$ (line *b*) before receiving interrogation pulse $I_Y$ (line *d*). Pulse $I_Z$ is received by Station Y (line *c*) at a time three units later. Since Station Z receives interrogation pulse $I_Y$ some time later than it transmits pulse $I_Z$, it replies to $I_Y$ by transmitting reply pulse $R_{ZY}$ (line *b*). Similarly, Station Y transmits reply pulse $R_{YZ}$ (line *a*) in response to receiving interrogation pulse $I_Z$ (line *c*). Since each station receives interrogation and reply pulses from the other station, both stations can make corrections and they will become perfectly synchronized if the oscillator of each station moves halfway towards the oscillator of the other.

FIGURE 7C indicates the situation wherein all three stations transmit during a single synchronization interval. An analysis of the situation presented in this figure illustrates how a station will try to synchronize only if it receives a reply pulse in response to its own interrogation pulse and an interrogation pulse and a reply pulse from the same station. The nature of the system is such that it has an inherent capability of determining when these conditions exist. It should be recalled that a station will only correct its oscillator when these conditions do exist. Also, each station transmits a reply pulse only in response to the first received interrogation pulse after it transmits its own interrogation pulse. It is important to note that Station Y will not transmit a reply pulse to $I_X$, since $I_X$ is received at the same time $I_Y$ is transmitted and that Station Z will not transmit a reply pulse to $I_X$, since it is received at the same time $I_Z$ is transmitted. This means that both Y and Z are coarsely synchronized to X but the oscillators of Y and Z are not yet phased to produce an I pulse ahead of the receipt of $I_X$.

As can be seen from FIGURE 7C, each station receives two I pulses before it receives a reply pulse R (lines *d*, *e* and *f*). Each station cannot determine whether it is receiving an R pulse in response to its own I pulse or receiving an R pulse transmitted in response to the I pulses of other stations. If a phase correction were made at a station using an R pulse not transmitted in response to that station's own I pulse, this phase correction would be erroneous.

Taking, for example, Station Y in FIG. 7C, this station receives pulses $I_X$ and $I_Z$ before it receives its first reply pulse $R_{ZY}$. This is so because $I_X$ is received at time equal to four units and $I_Z$ at time equal to nine units (Z transmits at 6 units at the time of receipt of $I_X$). Both of these times are before the first reply pulse $R_{ZY}$ which is transmitted by Station Z at time equal to seven units and received at Station Y at time equal to ten units. The same situation exists at Station X which receives pulses $I_Y$ and $I_Z$ before pulse $R_{YZ}$ and at Station Z which receives $I_X$ and $I_Y$ before it receives $R_{YZ}$. If, for example, Station Z was not transmitting $I_Z$ and $R_Z$ pulses during this interval then pulses $I_Z$, $R_{YZ}$, $R_{XZ}$ and $R_{ZY}$ would not be produced. Therefore, station Y would receive only pulses $I_X$ and $R_{XY}$. This is only one I pulse preceding an R pulse and this indicates at Station Y that the received I and R pulses come from the same station and that the R pulse was in response to Station Y's own $I_Y$ pulse.

It is shown below in Section VI that the appearance of only one received I pulse before the first received R pulse is a function of range between the observing station and the other stations in the field. This effect is used to determine that the received I and R pulses are from the same station and that the R pulse was transmitted in response to the observing station's own I pulse. This permits synchronization corrections to be made at the correct time.

From the foregoing it should be clear that coarse synchronization assures a fixed relationship between interrogation and reply pulses, so that if only one interrogation pulse and one reply pulse are sequentially received at a station, then that interrogation and reply pulse came from the same station. It also assures that the received reply pulse is transmitted in response to the interrogation pulse transmitted by the station at which the observation is made. Therefore, the observing station can make a proper phase shift correction of its oscillator.

As the synchronization process proceeds, it is possible for one station to become coarsely synchronized with another station without the first changing its timing. This is another way of saying that synchronization of two stations can be achieved without these two stations making a direct comparison. This could happen, for example in the case of Station Z, by comparison of Station Z with other stations (M, N, P, Q, etc.) synchronized with Station X. Since Station Y is closer to Station Z than to Station X, this results in the reception by Station Z of the start pulse from Y prior to that from Station X. Station Y will seem to Station Z to be the first station transmitting start pulses and Station Z will make a coarse synchronization correction to assure transmission of its own interrogation pulse simultaneously with reception of the interrogation pulse from Station Y. This actually brings Station Z closer to synchronization with X. While Station Z can be led to transmit its interrogation pulses earlier and earlier, it cannot be led to transmit before any other station actually transmits, i.e., it still must receive a start pulse B from the closest station before it can transmit. If Z, in the meantime, has already corrected its timing so that its interrogation pulse is coarsely synchronized with Station X, then the above argument still holds true with Station Y assuming the place of Station Z.

VI. THE SYNCHRONIZATION OF PAIRS OF STATIONS FROM A FIELD OF MANY STATIONS

In the foregoing discussion in Section V it was considered that synchronization during a particular synchronization interval was possible only when two stations transmitted. If there were three or more stations and each transmitted during a particular synchronization interval, it appeared to be impossible to achieve synchronization during that interval. It is possible to construct systems in which each station transmits I pulses randomly during a fraction of the synchronization intervals. This would produce a number of intervals during which only two stations transmitted I pulses so that successful phase corrections can be made. However, as described below, it is not necessary since synchronization can be achieved during an interval when three or more stations are transmitting.

It should be recalled that in the discusion of the coarse synchronization technique of Section V, that if a station observes (receives) a reply pulse after a single interrogation pulse, that the observing station is certain that the reply and interrogation pulses were transmitted by the same station. Further, the observing station is also certain that the received reply pulse was transmitted in response to an interrogation pulse transmitted from the station at which the observation was made. This was explained in detail with respect to FIGURE 7.

This situation, where the observing station is certain of the above two conditions is called the "green condition" at the observing station, since when they occur the station is permitted to synchronize with the other station which transmitted the interrogation and reply pulses. Another condition exists, called the "red condition," in which two or more interrogation pulses are received at the observing station prior to receiving a reply pulse. This situation is shown in FIG. 7C and there no attempt was made to synchronize.

When all stations in the field are synchronized, a given station observes the green condition only under one condition. That condition occurs only when the closest station which transmits during the synchronization interval is less than half the distance from the given station to the next closest station which transmits. This should be understood when it is considered that if the closest station from the given station is at a range *r* and the next closest station is at range 2*r*, the interrogation pulse from the next closest station arrives at the given station simultaneously with the reply pulse transmitted by the closest station. This gives rise to the red condition. When the next closest station is at a range slightly greater than 2*r*, i.e. the closest station is less than half the total distance to the next closest station, the reply pulse from the closest station arrives before the interrogation pulse from the next closest station, thereby satisfying the green condition at the given station. Since there initially was synchronization, the interrogation pulse from the closest station arrives halfway between the time of transmission of the interrogation pulse by the given station and the time the given station receives the reply pulse from the closest station. Therefore, the green condition is assured at any station in any interval in which it transmits when the distance to the nearest transmitting station is less than half the distance to the next closest transmitting station.

A different situation exists at a given station with respect to the red and green conditions when the stations in the field are only coarsely synchronized. As explained with respect to FIGURE 6, when coarse synchronization exists, it is certain that the interrogation pulse from the closest station arrives at a given station between the time of transmission of the given station's own interrogation pulse and the time of reception of the reply pulse from the closest station. Therefore, the time error in synchronization between the given and closest stations is not significant in effecting the red and green conditions. The time error in the receipt of the interrogation pulses from the next closest station and stations beyond, is significant however. For example, if the more distant stations transmit interrogation pulses late with respect to the given station, the interrogation pulses from these stations arrive at the given station later than would be the case if all stations were synchronized. This changes certain red conditions to green conditions, since the next closest station, for example, could be less than twice the distance to the closest station and still have its interrogation pulse arrive at the given station later than the reply pulse from the closest station. On the other hand, if some station other than the closest station transmits its interrogation pulse early wih respect to the given station, it could change a green condition to a red one. This is because the interrogation pulse from the next closest station would arrive earlier at the given station than the reply pulse from the closest station, thereby causing two interrogation pulses to be received before a reply pulse and consequently producing a red condition. The complete lack of synchronization between the stations in the field can also cause changes in the red and green conditions in the manner described.

The net effect of coarse synchronization only or the complete lack of synchronization between all stations is to cause, on the average, more stations which are transmitting early to move towards those which are relatively late, than vice versa. However, the average number of green conditions is approximately the same. Both the red and green conditions are readily determinable at a given station by observing the received pulses in the manner described.

When the transmission of interrogation pulses at a particular station is at a relatively fixed rate on a random basis it can be shown mathematically that as the traffic (station) density per square mile increases the number of successful comparisons, which produce correcting (synchronization) action at a station, also increases, reaching an asymptote of approximately 25%. This means that a given station will correct its synchronization time about 25% of the total times that it transmits interrogation pulses. Conversely, at the same transmission rate as the traffic density decreases, meaning that there are fewer stations, the probability of successful comparisons and resultant correction falls off below the 25% figure. This loss in efficiency is generally acceptable because only a few successful comparisons are necessary to obtain and keep adequate synchronization when there are only several stations present in the field. For example, it can be shown that if there are more than ten stations in an area of 10,000 sq. miles each one of these will succeed in correcting its timing in 25% of its attempts. When the traffic is even more dense, this probability is still substantialy unchanged but the mean distance between synchronizing stations becomes smaller. When the traffic density is smaller, e.g., two stations in 10,000 sq. miles, the probability of successful comparisons falls off with the same fixed rate of attempts ($I_o$) pulses being used. For example, suppose in the latter case each station makes eight attempts a second to synchronize. It can be shown that the probability of success is only 12.5%. Therefore, the expected number of successes is only one per second. However, this is sufficient where there are only two stations in the field.

When traffic density is low the "red-green" system operating at the same $I_o$ random pulse rate works at lower efficiency, but when traffic density is high there is increased efficiency for synchronization and the system works optimally. It is also possible to increase the random pulse rate as the traffic density decreases. This will optimize the efficiency of the system. In the preferred embodiment of the invention described in Sections VIII and IX, the "red-green" technique is used in which $I_o$ pulses are transmitted on a random basis either at a fixed rate or at a variable rate used to optimize the probability of success in accordance with the number of stations in the field.

VII. SELECTION OF THE NUMBER OF ALLOWED TRANSMISSION INTERVALS PER SECOND

As described with respect to FIGURE 1 and Section II above, certain transmission positions in each one second period are reserved for transmission of information data and other positions (and the interval occurring thereafter to the next position) are used exclusively for attaining and maintaining synchronization among the stations. It should be realized that it would be desirable to have as many positions available for transmission of information pulses as possible, since the rate at which data can be transmitted increases as more positions become available. On the other hand, it is also desirable to maximize the number of positions available for station synchronization since this minimizes the length of time it takes to achieve synchronization among the stations. However, it should be realized that the effect of reducing the number of positions, i.e., lengthening the time interval between transmission positions, serves to decrease the mean distance between stations which synchronize with each other, because, for a given number of stations transmitting at a given rate, more will transmit at any given position.

In either case of maximizing the number of transmissions for data or synchronization purposes, the upper limit for the number of allowed transmission positions is determined at a station by the possibility of confusion, upon reception of any pulse, as to whether this received pulse was transmitted in the presently occurring transmission position interval or in the penultimate interval. In general, the reception of confusing pulses, i.e., from a penultimate interval, can be prevented by spacing the allowed transmission positions far enough apart in time so that reception of confusing pulses is prevented by attenuation of these pulses due to transmission and/or due to interruption of the signal path by the earth's surface. In most cases, the interruption of the signal path by the earth is more dependable. The criterion for the earth path interruption is explained below.

If a pulse is transmitted at a first station at some time, it is received by a second station at a range $r$ away, $t$ seconds later where:

(1) $$t=r/c$$

where $c$ is the velocity of propagation of the signal (186,000 miles per second). The range $r_h$ in miles from an aircraft at an altitude of $h$ feet to the horizon is given as:

(2) $$r_h=(2h)^{1/2} \text{ miles}$$

Therefore, the maximum range between two aircraft at altitude $h$ feet, which are within line of sight of each other is:

(3) $$2r_h=2(2h)^{1/2} \text{ miles}$$

If the direct range $r$ between two stations is greater than $2r_h$ miles, a pulse transmitted by one aircraft will be received by the other with great attenuation due to interruption by the surface of the earth. While the signal received after earth interruption will not be zero, since there is diffraction, scattering, and refraction of signals over the horizon, its amplitude will be such that it can be easily discriminated against by a suitable clipper circuit. In using the earth interruption approach (radio horizon) to determine the selection of the position transmission rate or rates, first of all consider the problem of confusion that potentially exists during synchronization between stations already synchronized. This confusion can occur among the various interrogation and reply pulses transmitted during two successive synchronization intervals by two or more stations that are using these pulses to maintain synchronization. In order for there to be no confusion during these intervals, it is necessary that an interrogation pulse transmitted at the time of an allowed position, or a reply pulse transmitted in response to a received synchronized interrogation pulse, will not be received at some other station at a time following the next allowed transmission position. Stated another way, the interrogation or reply pulse transmitted during a particular synchronization interval should not be received at another station during the next synchronization interval. Since the reply pulses are transmitted later in time during each interval than the interrogation pulses, the reply pulses may be easily eliminated as a source of confusion by stopping the transmission of reply pulses by a station after a time corresponding to the maximum range $P_{max}$ to which synchronization to other stations is to be obtained.

In order to explain this quantitively, consider the case where the maximum altitude of the stations (e.g. aircraft) using the system is 40,000 feet. Using equation (3) above, the maximum line of sight range $2r_h$ between any two stations is 566 miles, for which the transmission time $2r_h/c$ is 3.04 milliseconds. If the system is to be designed so that stations will not synchronize with other stations more than 100 miles away, the transmitter at each station can be controlled so that it will not transmit a reply pulse later than 0.537 millisecond after it transmits an interrogation pulse. The time 0.537 millisecond corresponds to the transmission time of a reply or an interrogation pulse over a 100-mile range. By stopping the transmission of reply pulses after 0.537 millisecond, a station cannot respond to the interrogation pulse of another station more than 100 miles away. It follows, if the synchronization transmission positions are spaced $2r_h+p_{max}/c$ seconds apart (3.04+0.537=3.577 milliseconds apart in the example described) then a reply pulse transmitted by a first station in response to a received interrogation pulse transmitted at one position by another station cannot be received by the other station in the line of sight of the first during the interval following the next position. This is so because any reply pulse from the first station must have been transmitted before $p_{max}/c$ seconds (0.537 millisecond) and the line of sight time of $2r_h/c$ seconds (3.04 milliseconds) assures that the pulse is received during the same interval by a station in the line of sight of the first. An aircraft beyond line of sight, beyond the horizon, will have the reply pulse interrupted and attenuated by the earth's surface. While the example has been described with respect to aircraft having maximum altitudes of 40,000 feet, it should be recognized that this general approach holds for aircraft flying at any altitude. For example, if the maximum aircraft altitude $h$ is 50,000 feet, then the line of sight range increases and the time between transmission positions must be increased in proportion to $\sqrt{h}$ to prevent confusion. (See Equations 2 and 3 above.) Similarly, the time between transmission positions could be decreased if the maximum aircraft altitudes are decreased.

It should be considered that a spacing in time of 3.577 milliseconds between transmission positions corresponds to an allowable transmission rate of only 280 positions per second for data and synchronization purposes. This is approximately one-half the total number of positions referred to with respect to FIGURE 1, leaving only about 80 positions available for synchronization. However, the number of positions can be doubled to equal the number discussed with respect to FIGURE 1 in the following manner. The interrogation and reply pulses in the preferred embodiment of the invention are actually pairs of pulses which are used for discrimination against noise, as in a conventional TACAN system. By systematically assigning different spacings between the pairs of pulses, various pulses can be distinguished in different positions. For example, one spacing can be assigned to each pair in the even numbered positions (#200, 202, etc.) and a different spacing to the pulse pairs in the odd positions (#201, 203, etc.). Then at a particular station during any one transmission interval, odd or even, the confusing pulse (pair) of the immediately preceding interval will have the wrong code and therefore can be disregarded. For example, if Station A is trying to synchronize at an even numbered position, and receives interrogation and/or reply pulses which were transmitted during the preceding odd numbered position, these will have the wrong pulse spacing code and can be rejected by Station A. The pulses from two positions previous, an even position, will be transmitted by a station so far away that they will be of insufficient amplitude at the receiving station to be detected. Therefore, by using the coding technique the number of positions can be doubled, giving a total of 560 in the example described.

The above discussion relating to the generation of confusing interrogation and reply pulses is not affected by the presence of an unsynchronized station in the field. As pointed out before, if there are more than a few stations, such as aircraft, within line of sight of each other, the aircraft station will be synchronized before it leaves the ground. Using the illustration of the system discussed above, when the unsynchronized station is at a very low altitude or on the ground, its signals cannot be received by any other station beyond 300 miles away (if these stations are not at altitudes greater than 40,000 ft.). The distance of 300 miles corresponds to a synchronization error at the unsynchronized station's oscillator of approximately 180°. This means that such an unsynchronized station would have to transmit its interrogation pulse late, by half the interval between positions, in order for its pulse to arrive after the next position started at another station 300 miles away. As previously discussed, errors of this magnitude are eliminated by the use of coarse synchronization technique which precedes transmission of any pulses by the unsynchronized station.

Figure 8:
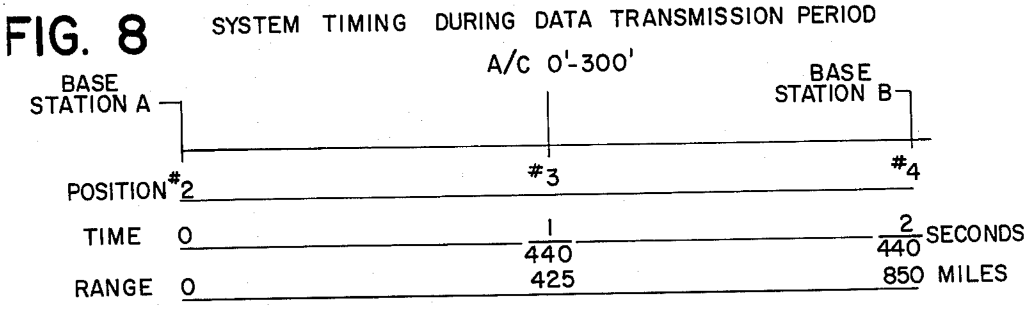
FIGURE 8 is a timing diagram illustrating certain operating principles of the invention.

Having considered some of the criteria which determine the selection of the position transmission rate to prevent confusion between the interrogation and reply pulses, the next area to be considered is the possibility of confusion that exists due to the information signals transmitted by synchronized base (ground) and movable stations (aircraft). As explained with respect to FIGURE 1 and as also shown in FIGURE 8, the use of the information signal transmission positions is alternated between base stations (even positions) and aircraft (odd positions). In order for the system to operate accurately, it is essential that each ground or aircraft station be able to identify any and every pulse received with respect to its origin in space (from an aircraft or ground station), and in time (the position or interval in which it was transmitted). The first point to analyze is the confusion that may exist at aircraft stations between information pulses received from ground stations and information pulses received from aircraft that transmitted at the previous position. This is explained by referring to FIGURE 8. In FIGURE 8, position #3 represents an aircraft transmission position for an aircraft at some predetermined altitude and position #4 represents base station B information transmission position. If at a time following position #4, a first aircraft can receive information pulses transmitted by other synchronized aircraft at position #3, the information pulses received by the first aircraft can cause confusion. The possibility of confusion occurring is again determined by the altitude of the aircraft stations, the time between transmission positions and the range between the stations.

Using again the illustrative example wherein the first aircraft station at which confusion may occur is at an altitude of 40,000 feet, this station is at a distance to the radio horizon of 283 miles. For the purposes of explanation it will also be assumed that the transmission positions now occur at a 440 c.p.s. rate. This means that the time $t_1$ between these positions is 2.27 milliseconds, during which time a signal will travel a distance $d$ of 425 miles. In order for an information pulse transmitted by another offending aircraft at position #3 to arrive at the aircraft being considered after the time of position #4 and cause confusion, the separation of the two stations must be at least the distance travelled by a pulse in the time between two transmission positions. This is illustratively 425 miles. Therefore, an offending station which can cause confusion must be at least $d-r_h$ miles (or 425−283=142 miles in the present example) beyond the radio horizon of the first station. In order for line of sight propagation to exist between the two aircraft stations the offending aircraft must be at an altitude of at least 10,000 feet in the example being considered. Thus, at all those information transmission positions and following intervals assigned to potential offending aircraft at altitudes less than 10,000 feet, no interference or confusion will occur at the first station since the information pulses from the potential offending stations will be interrupted by the earth's surface. If the potential offending aircraft is at an altitude greater than that needed for line of sight propagation and able to cause confusion, for example at 22,500 feet in the example being described, then the possibility exists that interference will occur at the first station during the interval following that restricted to information transmission for aircraft at 22,500 feet altitude.

The general rule is that no interference of confusion can occur due to the information pulses of two aircraft if the sum of the distances of the two stations to the radio horizon is less than the distance a pulse can travel in the time between two transmission positions. This is so because an information pulse will be received during the correct interval if the distance between the stations is less than the distance the pulse can travel between two transmission positions. When this condition is not satisfied, which will occur only in some small fraction of all cases in which both stations are at relatively high altitude and have a large line of sight propagation distance, pulse coding can be relied upon to distinguish information pulses transmitted by aircraft from those transmitted by ground stations. In this case the odd and even transmission positions for the aircraft and base stations are assigned different pulse codes. This can be done on the basis of pulse spacing as explained above. Therefore, an aircraft can determine in any odd or even position whether or not the received information pulse comes from a station transmitting at an odd or even position. If the code corresponds to the current transmission position then the pulse is accepted. However, if the pulse has the code for the preceding position, it is rejected. The strategy used here is one of keeping the expected number of potential interfering information pulses at a station so small that the chance matching of the ground station pulse spacing by two pairs of aircraft pulses is extremely small.

Another operating factor which can be used to eliminate the few aircraft information pulses from preceding intervals which can interfere and cause confusion with the received ground information pulses is the relative intensity differences of the pulses received at an aircraft station due to the distances between stations. Consider the worst possible case where the first aircraft under consideration and the potential offending aircraft are both at their maximum altitudes. Here, the distance between the two aircraft is such that at the first aircraft station under consideration the ratio of the intensity of the ground station signal transmitted during the interval under consideration to that of the information pulse transmitted from the offending aircraft during the preceding interval and received during the interval under consideration at the first aircraft station is minimum. This ratio is found as follows. Let the distance between the receiving first aircraft station and the ground station be $r$ miles and the distance a signal travels during the time between two transmission positions equal to $d$ miles. Then, if the 2.27 milliseconds spacing between positions are used as an example, the effective distance to the offending aircraft must be $d+r$ or $425+r$ miles for the interfering aircraft information pulse transmitted during the preceding interval to arrive at the same time as the information pulse from the ground station. The ratio of the intensities of the two signals is $$\left(\frac{r}{425+r}\right)^2 \text{ or } \left(\frac{r}{d+r}\right)^2$$

This ratio increases the greater $r$. However, if both aircraft are at 40,000 feet, the range $2r_h$ between the aircraft is a maximum of 566 miles (due to the horizon) so that $r_h-d$ gives the maximum $r$, called $r_{max}$ which here is 141 miles. The smallest ratio of the signal intensities is therefore $$\left(\frac{r_{max}}{d+r_{max}}\right)$$

which in the example being described is $(141/566)^2$ or approximately −12 db. At ranges from the aircraft to the ground station of less than 50 miles there will be a −20 db signal differential, and beyond $r_{max}$ (141 miles) from the ground station there will be essentially no interfering signals at all. By setting the gain of the receiver at an aircraft station to discriminate against all signals of lesser amplitude than the smallest signal ratio (−12 db), all signals transmitted from greater than $d$ (425) miles away can be discriminated against and eliminated solely on the basis of their amplitudes. The above description, of course, assumes equal power output from aircraft and ground stations. While the latter may use higher power to ensure high signal-to-noise ratios at extreme ranges for navigation purposes, this will make the signal differentials even more favorable to allow for discrimination on the basis of signal amplitude. It should be understood that the gain of the receiver can be automatically adjusted by a suitable automatic volume control or manually to pass signals only above a certain amplitude. This is conventional in the radio receiver art.

Consider next the possibility of interference or confusion occurring at an aircraft station between information pulses transmitted by another aircraft at the position under consideration and information pulses transmitted by ground stations in the previous position. In the example being described, since the range to the horizon of aircraft at the highest altitude (40,000 feet) is 283 miles, and the time between positions corresponds to 425 miles, such interference cannot occur because a potentially offending ground station is well beyond the horizon. Thus, this type of interference gives relatively little concern as long as $t_i$, the time between positions, is sufficient.

The problem of interference at one base station caused by signals transmitted by other base stations needs little discussion since, in general, these signals are not received because the stations are beyond line of sight. Therefore, there will be no confusion because $t_i$ will not be exceeded.

Briefly summarizing this section, the various criteria have been discussed for the selection of the transmission position rate to minimize the possibility of confusion of pulses at both base and aircraft stations due to the reception of a multiplicity of pulses. In general, the minimization of confusion is made dependent upon the interruption of signals by the earth's surface. The illustrative example described a system in which pulse coding is used for the odd and even positions as is the case in a preferred embodiment of the invention, and it was shown that for aircraft stations operating at a maximum altitude of 40,000 feet, with collision avoidance capabilities of 30 miles, that one set of optimum rates for synchronization and information pulses was 560 c.p.s. and 440 c.p.s. respectively. If the 440 c.p.s. rate is used for the system and if 200 positions are allotted for information pulses, then $^{200}/_{440}$ second is used for these pulses, leaving $^{240}/_{440}$ second for synchronizing purposes, during which 305 positions occur at the 560 c.p.s. rate. While Section II above discussed the use of 350 positions per second for synchronization, the loss of these few number of positions does not seriously detract from the synchronization capabilities of the stations.

In practice, the actual transmission position rate is selected on the basis of the various criteria discussed above and may be greater or less than 440 c.p.s. Actually, a compromise is sought wherein adequate air traffic control, collision avoidance, range and bearing measurement capabilities can be obtained with the least possibility of confusion in accordance with the maximum speed and altitude capabilities of the aircraft using the system. Also, as described above, with respect to the interrogation and reply pulses, the entrance of an unsynchronized station into the field and the transmission of information pulses by this unsynchronized station will not affect the confusion problem at the base or aircraft stations. Therefore, it should be clear that the present system will operate at any suitable rate or rates for the information and synchronization positions. While different rates can be selected for both information and synchronization purposes, it is preferred that a single rate be used to simplify the timing circuits at each station. Therefore, the 548 c.p.s. rate described with respect to FIGURE 1 can be used with a resultant slight increase in the possibility of confusion due to the reduction of $t_1$. This slight reduction can generally be tolerated.

VIII. EQUIPMENT

Figure 9:
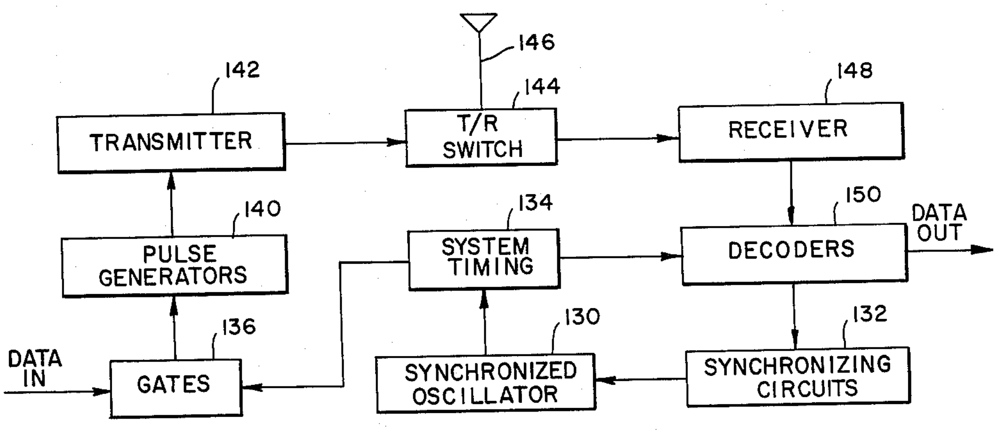
FIGURE 9 is a simplified block diagram of the system of the invention.

FIGURE 9 shows a block diagram of the components used at a station in the present invention. One such unit as that shown is located in each movable or base station which is to operate with the system. The heart of each unit is the synchronized oscillator 130 which is synchronized to and then held synchronous with similar oscillators in other stations through the action of the synchronizing circuits 132. As explained with reference to FIGURE 4, the synchronizing circuits use the interrogation pulses transmitted by the station and the interrogation and reply pulses received from other stations to achieve synchronism. These latter pulses are received by an antenna 146 and passed through a transmit-receiver (T/R) switch 144 to a receiver 148 where they are decoded by decoders 150 and then applied to the synchronizing circuits. The decoders 150 also sort out the pulses to be used for navigation and collision avoidance purposes, to measure range, etc. The synchronized oscillator 130 controls the system timing circuit 134, which sets the timing intervals between transmission positions at the selected rate corresponding to the number of transmission positions to be used during a one-second or other predetermined period.

The position pulses generated by timing circuit 134 are applied to a plurality of gate circuits 136 which also receive additional data in the form of data pulses corresponding to the station's altiude, receipt of an interrogation pulse from another station, etc. Upon simultaneous occurrence of a position pulse from circuit 134 and a data pulse, the correct pulse generator of the generators 140 is actuated to produce the signal for the station's interrogation pulse ($I_0$), altitude information pulse ($A_o$), and reply pulse ($R_o$). The subscript "*o*" designates the "own" station being described. The start pulse ($B_o$) is also produced at the beginning of each one second interval. The pulses from the generators 136 are applied to a radio transmitter 142 and then passed through the transmit-receiver (T/R) switch 144 to the antenna 146. As is described below, the gate 136 which controls transmission of the $I_o$ pulse is operated in a random manner in order to achieve the random type attempt at synchronization previously described.

Figure 10:
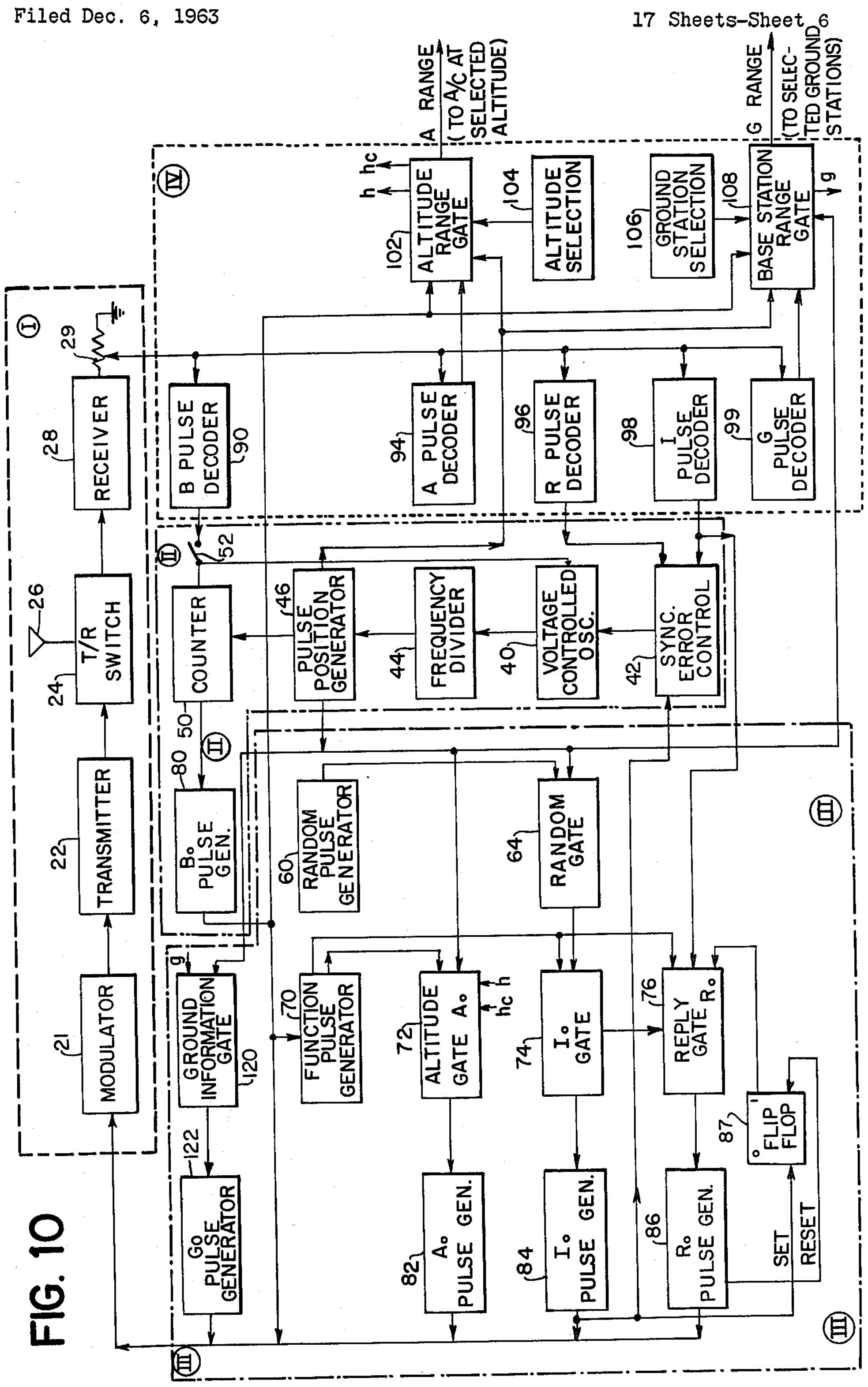
FIGURE 10 is a detailed block diagram of typical components which may be used in the system of the present invention.

FIGURE 10 is a detailed block diagram of the components used at each movable and base station. The circuits shown within the dotted lines of region I are the standard transmitter-receiver circuits; those in region II the synchronization and timing circuits; those within region III relate to the gating and pulse generation in connection with transmission of data and synchronization information; and the circuits shown within region IV are the decoding circuits which separate the data and pulses used for synchronization purposes which are received from other stations. The symbols used to identify the various types of pulses and circuits correspond to the symbols previously adopted in Section II above. The use of the subscript "*o*" again designates the own aircraft at which the components are located.

Referring first to the receiver portion of region I, the pulses transmitted by other stations are picked up by the antenna 26 and passed through a T/R switch 24 to a receiver 28. The pulses at the output of the receiver are decoded, as in a conventional TACAN system for example, and the received R and I pulses at the output of decoders 96 and 98 are applied to the synchronization error control circuit 42. A signal level control 29 is also placed at the receiver 28 output prior to the decoders in order to discriminate against and eliminate pulses of small amplitude from stations beyond the horizon which can cause confusion. This is discussed in Section VII above.

The timing and synchronization circuits located in region II include a conventional voltage-controlled oscillator 40 which is preferably a high-frequency, high-precision, crystal-controlled oscillator whose output frequency (phase) is controllable by voltage applied from the synchronization error control circuit 42. Suitable voltage-controlled oscillators are well known in the art, and no further description need be given here. The synchronization error control circuit 42 receives the I and R pulses from the decoders and the station's own interrogation pulse $I_o$ which is produced by the pulse generator 84. The time relationships between these three pulses is measured in the manner previously described with respect to FIGURE 4, and an output voltage is produced by the error control circuit 42 to control oscillator 40, so that it will be synchronized with the oscillator of the other stations in the field. As previously explained, this error voltage either advances or retards the phase of the oscillator 40 to reduce the phase error half-way toward the phase of the oscillator of the other station. Since each of the oscillators 40 is initially selected to be very stable, the amount of correction necessary to synchronize any one oscillator is relatively small.

The output of the oscillator 40 is supplied to the input of a frequency divider 44 which steps down the frequency of the oscillator output signal to a frequency equal to the number of allowed positions. For example, when 548 positions per second are used, then the oscillator 40 produces a multiple of this frequency, which would be at a fairly high frequency, so that smaller components which are easier to stabilize may be used. This higher frequency is then divided down to the required value by divider 44. The divider circuits are conventional in the art.

The output signal from the frequency divider 44 is applied to a pulse position generator 46 which produces a number of pulses per second equal to the frequency of the signal at the output of the divider 44. These pulses correspond to the transmission positions. The pulse position generator 46 may, for example, be a conventional asymmetrical multivibrator circuit which is triggered on a predetermined portion of the output signal from the frequency divider 44, such as a zero crossing of the output signal. These position pulses are preferably made of a relatively short time duration in order to precisely define the occurrence and location of each transmission position.

The output pulses from generator 46 are applied to the input of a counter circuit 50, which is pre-set to count a number of pulses equal to the number of transmission positions in the selected interval. As described with respect to FIGURE 1, this number may be 548. Of course, the number of transmission positions used depends upon the various operating criteria discussed above. The counter resets automatically at a fixed time interval after counting the number of pulses equal to the number of positions allotted during a major period or interval, which is illustratively one second. Suitable counters for counting to a preset number and then automatically resetting to zero are conventional in the digital computer art and no further description thereof is needed.

When the coarse synchronization technique is used, for example when the station first joins the field, the counter 50 is reset by start (B) pulses received from other stations and applied to the counter through the B pulse decoder 90 and the coarse-sync switch 52. When the coarse-sync switch 52 is closed, the received B pulses are also applied to the oscillator to rephase it to the phase of the B pulses. This coarsely synchronizes the oscillator to the other station with a time error which is equal to the transmission time between the two stations. As pointed out above, this is a more rapid way of bringing the station into synchronization with the field. The switch 52 is then opened after a short interval so that absolute synchronization between stations can be achieved by using the error control circuit 42.

During the time when the station is being coarsely synchronized, the subsequent positions in the major interval are synchronized to the received B pulse since the oscillator 40 is phased to this received pulse. Therefore, each subsequent transmission position and each transmitted pulse in the major interval has the same phase error with respect to the corresponding position at the station which transmitted the B pulse. The first portion of the one second interval is used for transmitting and receiving information and the second portion for obtaining and/or maintaining synchronism.

Each time that the counter 50 is reset, either automatically by a reset pulse after the proper number of counts or by the receipt of a B pulse, it triggers the $B_0$ pulse generator 80 to produce the $B_0$ pulse which marks the beginning of the major interval. The $B_0$ pulse from generator 80 is supplied to a modulator 21 where it is modulated onto a carrier wave signal and the modulated carrier wave signal is passed through a transmitter 22 and T/R switch 24 to the antenna 26. The transmitted $B_0$ pulse may be used by other stations for coarse synchronization purposes, as previously described. The $B_0$ pulse generator 80, and all the other pulse generators in the system, are any suitable circuits which produce coded pulses to indicate their respective identities. Pulse spacing for coding purposes is preferably used, although other types of coding or the basis of pulse amplitude, frequency or phase may also be utilized.

The $B_0$ pulse produced by generator 80, is also applied to a function pulse generator 70. The function pulse generator 70 produces a function signal which is applied to an altitude gate 72, an interrogation gate 74, and a reply gate 76. The signal from the function pulse generator 70 keeps altitude gate 72 open from transmission positions #1 to #200, so that the aircraft altitude information may be transmitted, and keeps the interrogation and reply gates 74 and 76 closed during this time. From positions #201 to #548, the second signal from generator 70 opens gates 74 and 76 and closes gate 72. The function pulse generator 70 is, for example, a conventional bistable multivibrator circuit which produces at one of its outputs a positive pulse of a duration from positions #1 to #200 upon receipt of the $B_0$ triggering pulse. This positive pulse is applied to and opens altitude gate 72. The negative pulse appearing at the other multivibrator output is applied to gates 74 and 76 to hold these gates closed. When the positive pulse from the generator terminates, the polarity of the pulses at the two multivibrator outputs switches so that gate 72 is closed and gates 74 and 76 are open.

The altitude gate 72 is also controlled so that it can be opened only at an odd or even transmission position, depending upon whether the station is a movable or a base station. One way of accomplishing this is to provide an additional odd-even function generator at the output of the function generator 70 which is connected to the altitude gate so that the altitude gate is opened only during the odd or even transmission positions. This odd-even function generator is triggered by the start of the pulse from generator 70 to produce a series of gating pulses of a duration equal the time between two transmission positions with the gating pulses blanketing the odd transmission positions for a movable station and blanketing the even positions for a base station. The altitude gate 72 is then arranged or biased so that the simultaneous occurrence of the function pulse and the odd-even gating pulse is needed before the gate can be conditioned to open.

In a preferred form of the invention, the odd-even transmission function is accomplished by making the altitude measuring means produce an output signal only at an odd position. In a base station the ground station information pulse generator G is actuated only at the assigned even position. This is described below.

A random pulse generator 60 is also located within region II. The random pulse generator is triggered at random, for example, by a noise source, to produce a number of pulses per second in response to noise signals from the source above a predetermined threshold level. The threshold level may be fixed, thereby keeping the $I_0$ pulse rate relatively fixed. Preferably, however, the threshold level is variable so that the pulse rate is increased as the number of stations in the field decreases. This can be done by counting the number of B pulses received during a one second period and producing a threshold level AGC voltage for the generator 60 proportional to the number of received B pulses. As the received B pulse count decreases the threshold decreases resulting in an increased $I_0$ pulse output. Each pulse produced by the generator 60 conditions a random gate circuit 64 to be held open for a time equal to slightly less than the time between two position pulses. This means that the next position pulse from generator 46 passes through the gate 64 after the random pulse is produced. The random gate circuit 64 is formed, for example, by a one shot multivibrator which produces the desired length gating pulse when triggered by the pulse from generator 60 and an AND type gate circuit. The gating pulse from the one-shot multivibrator is applied to one input of the AND type gate circuit (not shown) and the other input of the AND circuit is connected to the position pulse generator 46. Upon simultaneous occurrence of the gating pulse and a position pulse at the inputs to the AND circuit of gate 64, the position pulse is passed to one input of an interrogation pulse gate 74, which is also an AND type gate circuit. When gate 74 is receiving the proper polarity function pulse from generator 70 at its other input during positions #200 to #548, the position pulse from gate 64 is passed on to an $I_0$ pulse generator 84. Pulse generator 84 produces the station's own interrogation pulse $I_0$ in response to the position pulse. As pointed out before, the $I_0$ pulse may be a pair of pulses with a predetermined coding spacing therebetween in order to allow for decoding at another station. This is conventional in a TACAN system and the circuits for producing these pulse pairs are also conventional.

In a movable station one input of an altitude gate 72, which is an AND type gate having at least three inputs, receives the position pulses from generator 46. The other two inputs respectively receive the function signal from generator 70 and a pulse "$h$" at a time which is representative of the altitude layer in which the movable station is located. The gate 72 is conditioned to pass a position pulse by the simultaneous occurrence of the function pulse (during positions #1 to #200), the $h$ pulse and the position pulse. The pulse passed by gate 72 triggers the $A_0$ pulse generator to produce an $A_0$ pulse at the position corresponding to the altitude layer of the movable station.

Figures 11A, 11B, 11C:
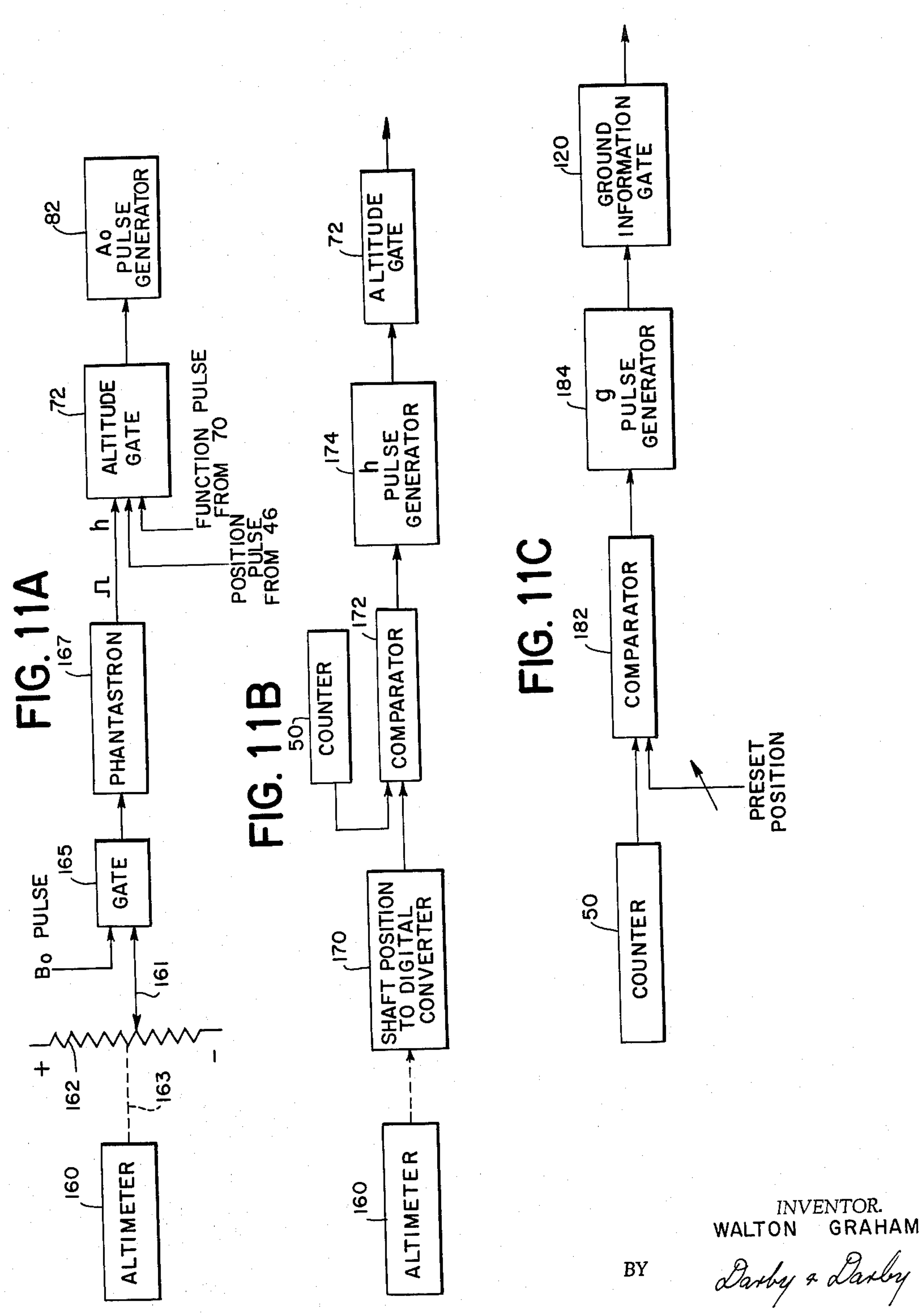
FIGURES 11A, 11B and 11C are schematic block diagrams of portions of the system of the present invention.

A circuit for producing the "$h$" pulses is shown in FIGURE 11A. The altitude of the aircraft is measured by a conventional barometric altitude sensing device 160 which drives the center arm 161 of a potentiometer 162 through a mechanical linkage 163. The voltage present on the center arm 161, whose magnitude is a function of the altitude of the aircraft, is applied to one input of a gate circuit 165 whose other input is the $B_0$ pulse produced by the generator 80. When the $B_0$ pulse is applied to the gate 165, which happens at the beginning of each one-second major interval, the voltage on the center arm 161 is applied to the control electrode of a pulse delay circuit such as a phantastron 167. The phantastron produces an output pulse ($h$) at a time dependent upon the magnitude of the input voltage applied to its control electrode. The potentiometer 162 is calibrated to produce a voltage which causes the phantastron to produce its output pulse at a time just prior to the odd position number corresponding to the altitude layer within which the aircraft is flying.

The duration of the $h$ pulse is less than the time between two positions.

The $h$ pulse at the phantastron output is applied to one input of the altitude gate 72 which also receives the function pulse from generator 70 and the position pulses from generator 46. Upon simultaneous occurrence of all three $h$, function and position pulses, the position pulse passes through the gate 72 to the $A_0$ pulse generator 82 which produces the altitude information pulse $A_0$. Pulse $A_0$ is coded, as desired, and transmitted by means of the modulator 21, transmitter 22 and antenna 26. In this manner, the $A_0$ pulse is transmitted at the proper position representative of the altitude of the station.

It should also be understood that information other than altitude can be transmitted by sending out the $A_0$ pulses at the predetermined positions. For example, the true, magnetic or relative heading of the station can also be transmitted by assigning angular bearings to each information transmission position. Where there are 100 positions available for information transmission by a movable station, each position corresponds to 3.6° out of a total of 360°. Where heading information is transmitted, a compass or other type of heading measurement instrument is substituted for the altimeter 160 to produce the $h$ gating pulse.

It should be recognized that suitable arrangements other than the phantastron may be used to produce the $h$ gating pulse at the proper time to pass the position pulse representative of the aircraft's altitude. For example, as shown in FIGURE 11B, the output shaft of the altimeter 160 is connected to a shaft position to digital converter 170. The converter produces a digital (binary) number corresponding to the even position just prior to the odd position when an $A_0$ pulse is to be transmitted representative of the altitude layer of the aircraft. The output count of the converter is compared in a binary comparator 172 with the count at the output of the position pulse counter 50. Each time the two even counts are equal, the comparator 172 produces an output signal which is applied to an $h$ pulse generator 174, which, for example, may be a multivibrator. After a slight delay, which assures that the even position pulse will not be passed, generator 174 produces the $h$ gating pulse which is applied to the altitude gate 72 to pass the next odd position pulse at the correct odd position assigned to the aircraft at its particular altitude. In this manner, the $h$ pulse is always produced so that the correct odd position pulse is passed to the generator 82 to produce the $A_0$ pulse.

Where the described system is to be used at a base station, the altitude gate 72 and the $A_0$ pulse generator 82 are not used and a ground information gate and pulse generator 120 and 122 are used for the production of $G_0$ pulses at the assigned even position for the base station. These elements are shown by the blocks 120 and 122. It should be understood that they are optional and may be used in addition to or to replace the elements 72 and 82, or the elements 72 and 82 can be used. Here, it is not necessary to provide the altimeter 160 and the other circuits to produce the equivalent of an $h$ gating pulse at a time corresponding to the altitude of the aircraft. Instead, as shown in FIGURE 11C, the odd numbered position pulse, at the output of counter 50 which is just prior to the assigned even numbered position pulse for the base station, is passed by a comparator 182 which is preset to the same odd position number. The position pulse which is passed by the comparator is delayed slightly to actuate the production of a gating pulse $g$ by a generator 184, which may be a conventional multivibrator. The $g$ gating pulse is applied to the ground information gate 120. This latter gating pulse $g$ is of sufficient duration to pass the next even position pulse from generator 46 and the even position pulse causes the $G_0$ pulse generator to produce the $G_0$ pulse. As explained before, the $G_0$ pulse may be coded as desired.

The same type of phantastron circuit as shown in FIGURE 11A can be used for producing the $g$ gating pulse by providing a variable voltage control input which triggers the phastastron at a time corresponding to the assigned even position for the base station. The preset position control for the comparator 182 is variable so that the same unit can be used if it is moved to a different base station location having a different assigned even position.

The $R_0$ reply pulses are produced by a generator 86 which is controlled by the reply gate 76. The reply gate 76 receives the function pulse from generator 70 so that it is opened only from positions #200 to #548. The received interrogation pulses from an I pulse decoder 98 are also applied to the gate 76 and it is these I pulses which actuate the pulse generator 76 when they are applied thereto. In order to minimize the possibility of confusion between the received interrogation pulses from decoder 98, as explained in Section VII above, the reply gate 76 is conditioned to open only after the station has transmitted an interrogation pulse $I_0$. The first interrogation pulse from decoder 98 then passes through reply gate 76 to actuate the reply pulse generator 86 to produce the $R_0$ pulse for transmission. The $R_0$ pulse is applied back to the gate 76 to close it until it is opened again upon the next transmission of an $I_0$ pulse. This is accomplished by providing a suitable device, such as a bistable multivibrator 87 (FLIP-FLOP) to produce the reply gating pulse. The $I_0$ generator 84 is connected to the "on" (or SET) input of the multivibrator and the $R_0$ generator 86 to the "off" (or RESET) input, with the multivibrator output being connected to the reply gate 76. An $I_0$ pulse turns the multivibrator "on" and conditions the reply gate 76 to pass the next I pulse to the pulse generator 76, providing the function pulse is present. The $R_0$ pulse switches the multivibrator "off" so that the gate 76 is closed until production of the next $I_0$ pulse.

Therefore, it can be seen that the respective synchronizing and information pulses are transmitted by the station at the proper time. The $B_0$, $I_0$ and $A_0$ pulses are, under the direct control of the pulse position generator 46, so that they are synchronized for production at a particular position, while the $R_0$ pulse is produced in response to the first I pulse received after transmission of an $I_0$ pulse. Further, the $A_0$ information pulse is produced at the position corresponding to the altitude of the aircraft while the $G_0$ pulse is produced at the assigned position for the base station. It should also be apparent that while the $I_0$ pulses are synchronized, they are also transmitted at random positions because of the random pulse generator 60 and gate 64. The average rate of $I_0$ pulse transmissions can be varied by changing the number of pulses out of the generator 60. This is accomplished, for example, by changing the triggering threshold of the generator 60 in response to the random noise source. The triggering threshold may also be varied automatically in response to the average number of interrogation pulses received thereby automatically adjusting the system for optimum $I_0$ transmission rate.

Region IV of the diagram contains the various decoding and information circuits, some of the former having been discussed already. The output of the receiver 28 is applied to each of the B, A, R, I and G pulse decoders 90, 94, 96, 98 and 99, through the variable level control 29. Of course, a separate level or threshold control may be provided at the input of each decoder so that pulses below a certain amplitude will not be utilized. This, as previously explained, helps to minimize the possibility of confusion from distant stations. As discussed previously, each of these decoders sorts out the received pulses on the basis of a coding scheme, such as pulse pair spacing, amplitude, frequency or phase of the respective received pulses.

As previously mentioned all stations can transmit at the same frequency, this greatly simplifies the receiver 28 and transmitter 22 at each station.

The first received B pulse decoded by decoder 90 is used to reset the counter 50 and phase oscillator 40 when the coarse synchronization technique is being used. The coarse synchronization is only used for a relatively short time after the station joins the field, so that the switch 52 is opened after a short interval and the station is permitted to absolutely synchronize to the received interrogation pulses. A circuit (not shown) similar to 87 and formed by a monostable multivibrator is preferably used with the B pulse decoder to close its output for a time, approximately the duration of a major interval after the first B pulse is received. Alternatively or additionally, an amplitude discriminating circuit can be provided ahead of the B pulse decoder to select only the maximum amplitude pulse received during a major interval, this pulse normally originating from the closest station. Neither of these arrangements are shown since they would unduly complicate the drawing.

The outputs of the R and I pulse decoders 96 and 98 are applied to the input of the synchronization error control circuit 42 which produces the error voltage to control oscillator 40. This is described with respect to FIGURE 4. The I pulses from decoder 96 are also applied to the reply gate 76 to initiate the production of the $R_o$ pulses at the proper time. This feature was also described previously.

The outputs of the A and G pulse decoders 94 and 99, which respectively decode the A pulses from aircraft and the G pulses from base stations, are used to measure the respective range of the station to the other aircraft and/or ground stations. The decoded received A pulses are applied to an altitude range gate 102 while the decoded G pulses are applied to a ground or base station range gate 108. In general, the own station is only concerned with other aircraft located in its same altitude layer or with a particular ground station to which it wants to determine range and/or bearing. Therefore, the altitude and ground station selection circuits 104 and 106 are provided. These circuits control the range measuring gates 102 and 108 to measure the range only to the desired stations.

Figure 12B:
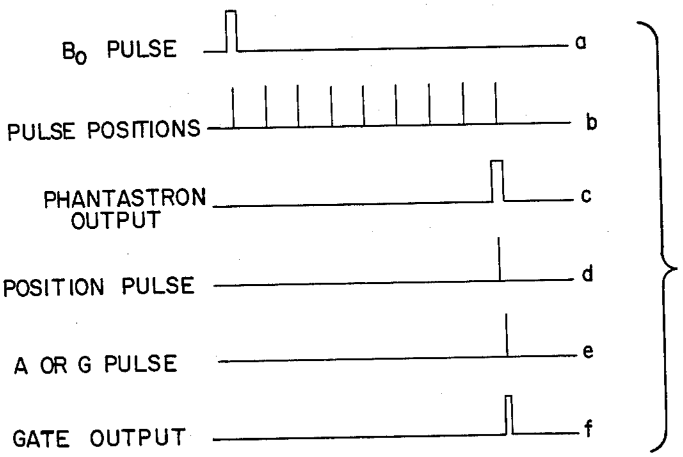
FIGURE 12B is a timing diagram showing the operation of the altitude gating circuits.
Figure 12A:
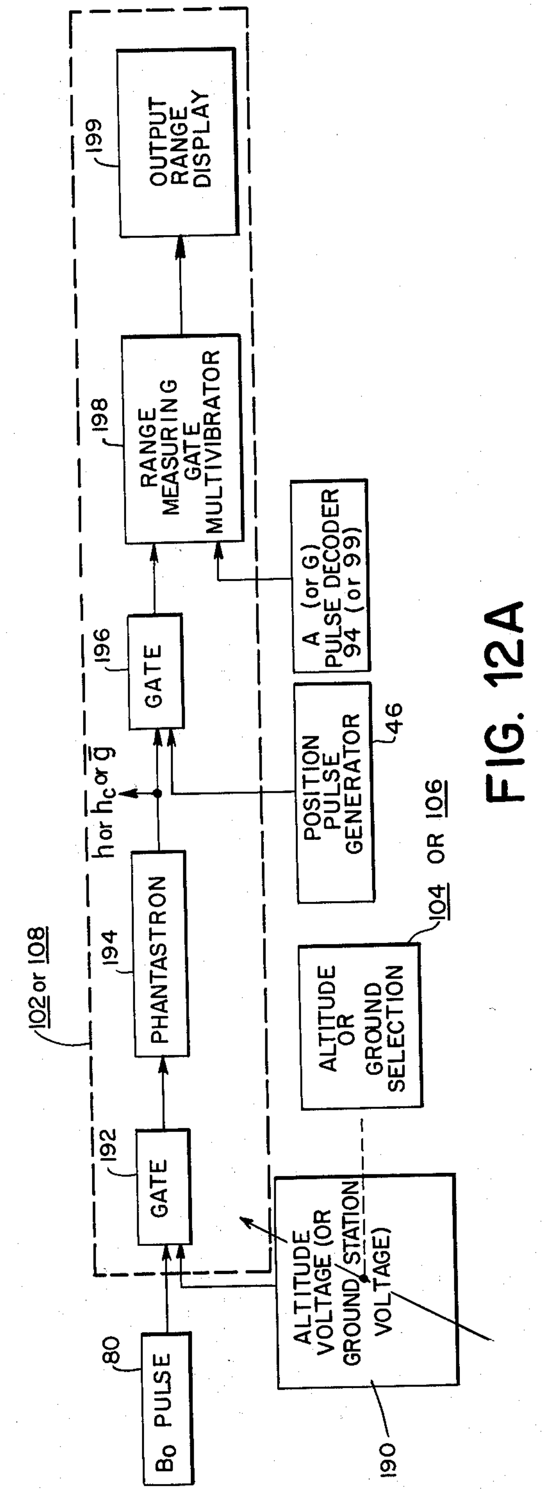
FIGURE 12A is a schematic block diagram of the altitude gating circuit.

A circuit for making the range measurement on both predetermined aircraft and ground stations is shown in FIGURE 12A, while FIGURE 12B shows the various output waveforms of this circuit. The production of a $B_o$ pulse by generator 80 (line *a* of FIGURE 12B) allows the voltage representative of an altitude or aircraft position transducer 190 to be applied through a gate 192 to a phantastron 194. The transducer 190 may be the altimeter and potentiometer arrangement discussed with respect to FIGURE 11A, where the circuit is used to measure the range to another aircraft in the same altitude layer. Where the circuit is used to measure the range to a ground station, the transducer 190 is a device which produces a voltage which causes production of a pulse by the phantastron at the time corresponding to the pertinent ground station's even transmission position. This latter device can also be a potentiometer.

The phantastron 194 produces a gating pulse (line *c*) of a duration less than the time between two transmission positions, which is applied to one input of a gate 196. The phantastron pulse is produced at a time (position) determined by the applied voltage from the transducer 190 so that the correct position pulse from the generator 46 (line *b*) is passed through gate 196 (line *d*). The position pulse passing through gate 196 is applied to one input of a bistable multivibrator or other suitable time (range) measuring device 198 to start the beginning of the range measuring cycle. The decoded A or G pulse received during the interval after the position pulse starts the range measuring cycle is applied to the other input of the multivibrator to terminate the range measuring cycle (line *e*). The output of multivibrator is a pulse of a width (time) corresponding to the range between the own station and the station whose A or G pulse was received (line *f*). This is true because the A or G pulse was transmitted by the station at the same time that the position pulse (line *d*) was passed to the circuit 102 or 108, since the stations are all synchronized. Thus, the width of the output pulse (line *f*) corresponds to the range between the two stations. The output of the range gates are used to control any suitable analog or digital range display device 280 such as a voltage driven analog or digital meter calibrated in yards, miles, etc.

In many cases, an aircraft may want to determine the presence of and range to other aircraft in an altitude layer into which the first aircraft wants to ascend or descend. Information of this type is extremely desirable to prevent collisions between aircraft which are changing their altitude. In order to provide this capability, the transducer 190 of FIGURE 12A is made variable, such as by the altitude selection circuit 104, in order to produce a voltage which triggers the phantastron to produce another altitude gate similar to the *h* gate and called the $h_c$ gate. The transducer 190, operated by selection circuit 104, is set so that the $h_c$ gate corresponds to the changed altitude layer into which the aircraft is to ascend or descend. Therefore, the A pulses transmitted from other aircraft in the correct transmission position for the changed altitude layer and corresponding to the time of production of the $h_c$ gate are passed to the range measuring gate 102 so that the ranges to these aircraft can be determined. It then can be ascertained if it is safe to ascend or descend into the $h_c$ altitude layer.

The $h_c$ gate signal is also applied to the altitude gate 72 of FIGURE 10 in order to permit the aircraft which is going to change its altitude layer to inform other aircraft of this change. When the $h_c$ gate is applied to gate 72, the station transmits an information ($A_o$) pulse at the transmission position corresponding to the altitude layer $h_c$ into which it is going to move. In a preferred embodiment of the invention, the aircraft stations are provided with circuits for producing both the *h* and $h_c$ gates during each interval. Therefore, each aircraft can measure and transmit the desired information both in its own altitude layer and in the layer to which it is to move.

If desired, the variable adjustment on the transducer 190 can be geared to the altimeter and set to produce a voltage which will produce a gate to pass the position pulse corresponding to one position ahead or behind the actual aircraft altitude. Therefore, the $h_c$ gate is produced as a function of the changing altitude of the aircraft to indicate to other aircraft whether own aircraft is climbing or descending and also to measure the range to these other aircraft at an altitude layer above or below the own aircraft. It should be understood that as own aircraft climbs or descents into a different layer, the production of the normal *h* gate pulse changes automatically. This makes other stations in the new layer aware of own aircraft and also permits own aircraft to measure the range to these other stations.

In a similar manner the circuit of FIGURE 12A can be used to measure range to any ground station transmitting at a predetermined position. Now the selection circuit 106 would be set to produce a pulse, called $\overline{g}$, at the output of phantastron 194 which would gate through a position pulse corresponding to the base station to which own station is to measure range. Range measurement is made in the manner previously described except that now the G pulse transmitted from the selection station and decoded by own station decoder 99 is used to terminate the on period of multivibrator 198. The range is given by the display device 199.

IX DETAILED CIRCUIT DESCRIPTIONS

To further describe circuits used at a station operating in accordance with the present system, reference is made to FIGURES 13 to 25. The circuits shown in these various FIGURES 14 to 25 may be used in place of the components of FIGURE 10 and these additional circuits are particularly described with respect to a technique for producing synchronization which utilizes counting of pulses from a high frequency clock.

A. *Synchronizing circuits*

As described above, the present system depends on the precise time synchronization of position pulses at all of the operating stations. The basic operational requirements for the synchronization circuits at each (own) station are twofold. First, the timing of "own" interrogation $I_0$ pulses, which occure coincidentally with the own station's position pulses, must be controleld so that a single "other" received interrogation pulse I occurs midway between the "own" interrogation pulse and the received reply pulse R (green condition). A complete correction must be made with just one group of $I_0$, I and R pulses. Secondly, it was shown above that if only one "other" interrogation pulse exists between the "own" interrogation pulse and the first received reply R pulse, then the "other" interrogation pulse and the reply pulse must have come from the same station. However, if more than one "other" interrogation pulse occurs in this interval, confusion can occur. In this case, no correction of the timing pulses is to be made (red condition).

Figure 13A:
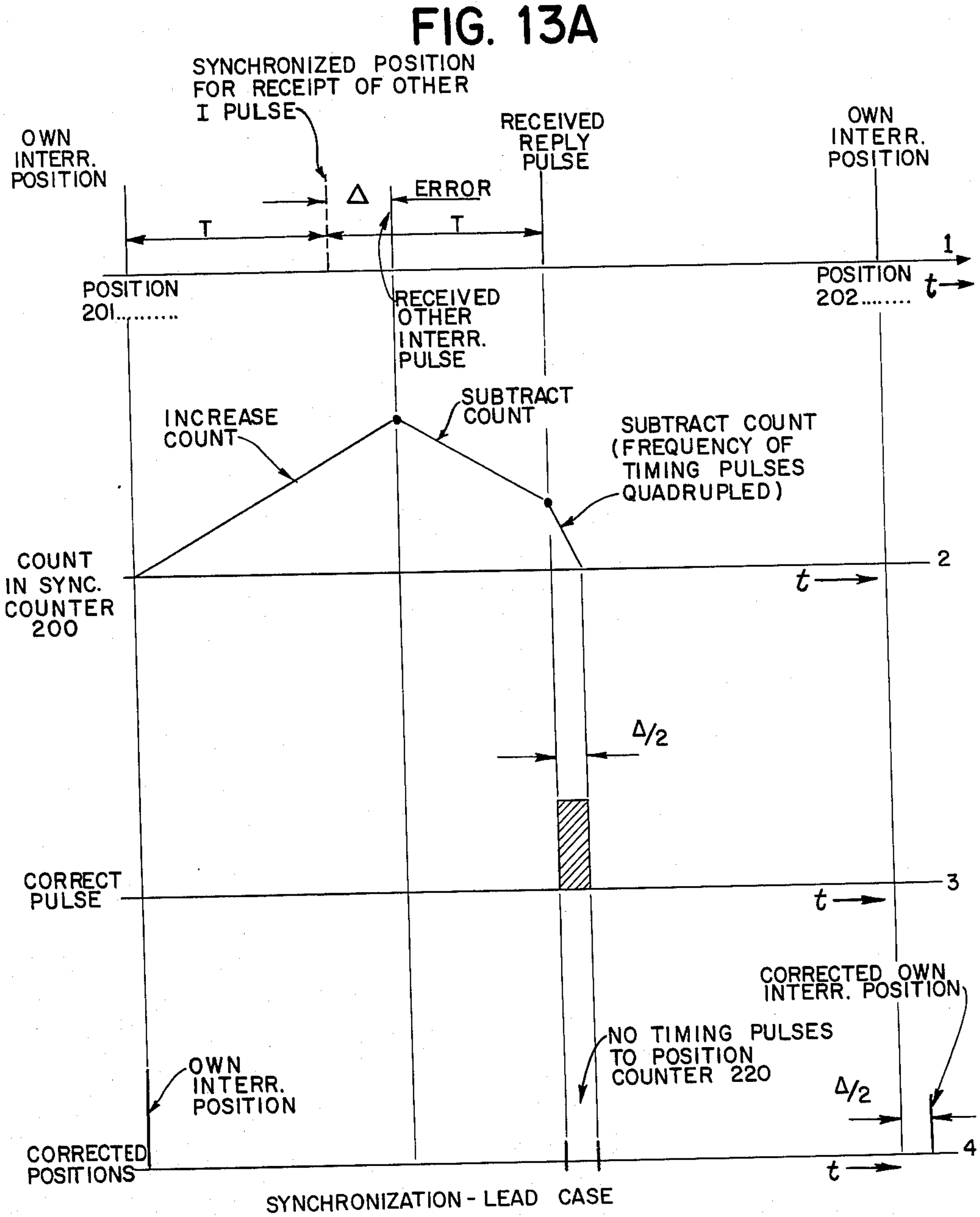
FIGURES 13A and 13B are timing diagrams showing correction for synchronization using a pulse counting technique.
Figure 13B:
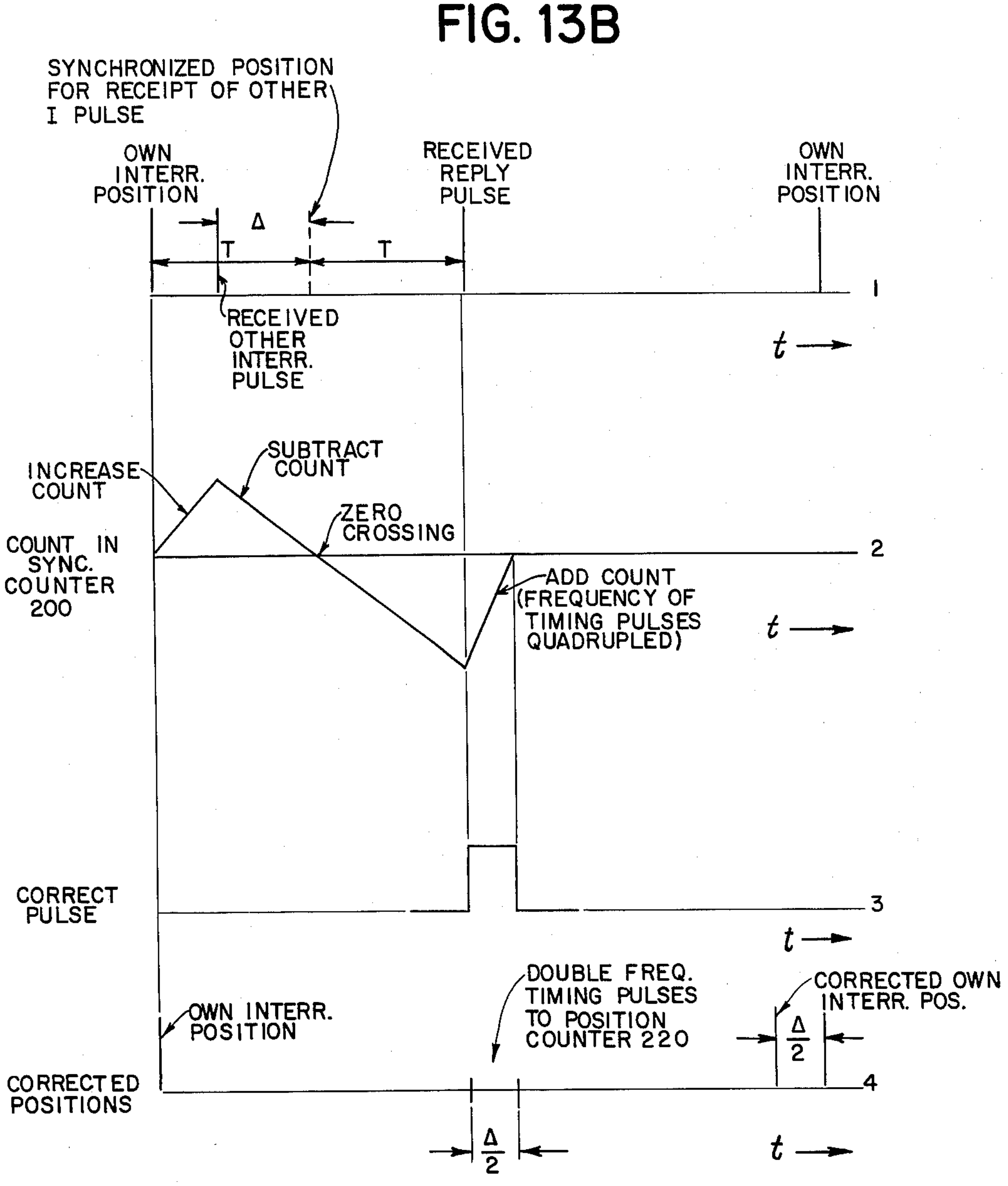
Figure 14:
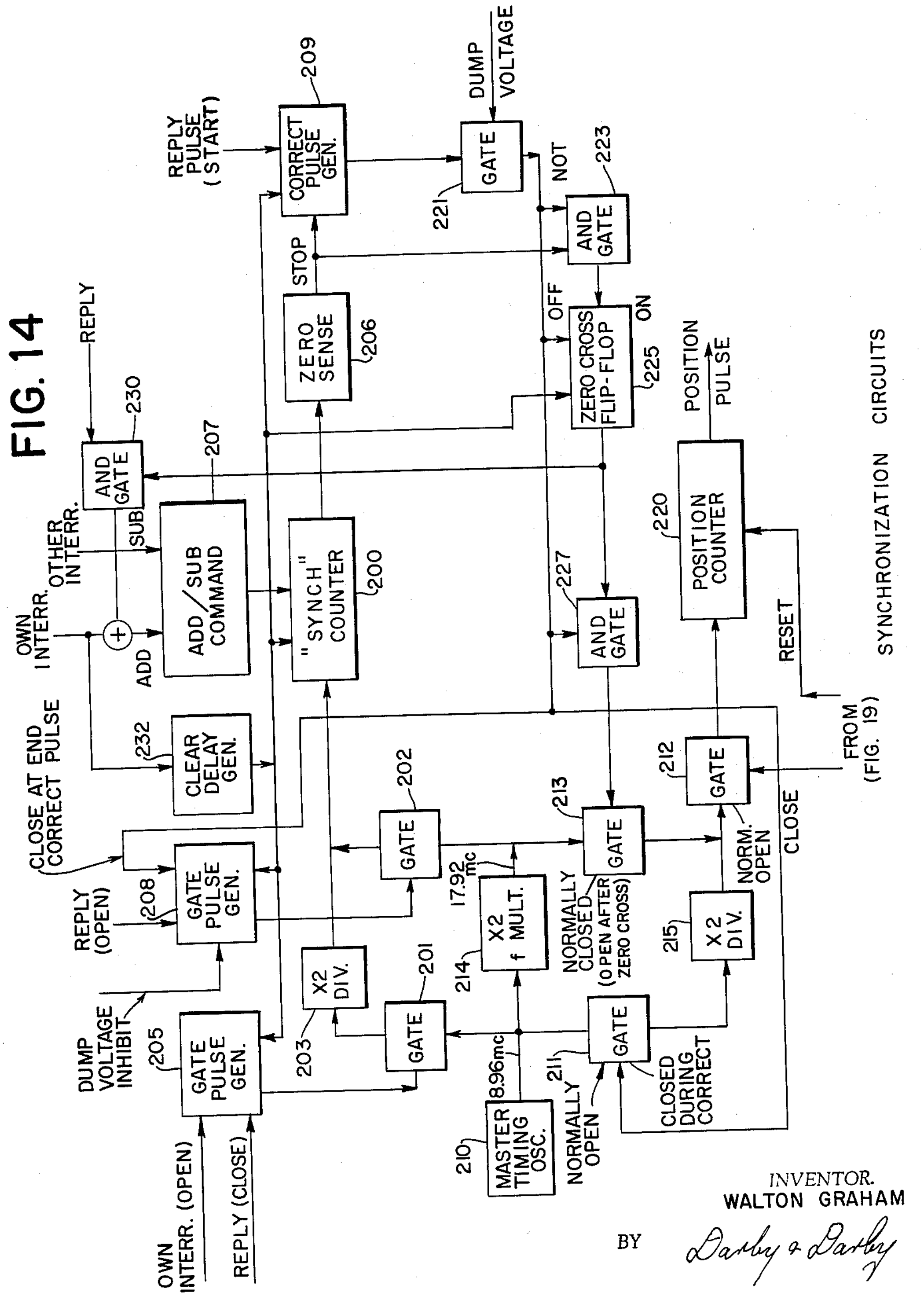
FIGURE 14 is a block diagram of the equipment at a station for producing synchronization using pulse counting.

The achievement of synchronization of the position pulses using the pulse counting technique are described with the aid of FIGURES 13A, 13B and 14. FIGURE 13A shows the condition where the "own" interrogation pulse leads the production of the "other" interrogation pulse at the other station by a time Δ. This means that the position pulses at the own and the other station are unsynchronized and it is desired to bring the own station position pulses into synchronism with those of the other station. On line 1 of FIGURE 13A is shown an "own" interrogation pulse position occurring at one of the positions after #201, a received "other" interrogation pulse, and a received reply pulse transmitted by the other station in response to the "own" interrogation pulse. The "own" interrogation pulse, when it occurs, is coincident in time with the own station's position pulses, which occur at the assumed rate of 548 p.p.s. and which may lead or lag the position pulses of other stations. A synchronization time error of Δ is shown, this being the error interval between the midway, or synchronized, position and the receipt of the "other" interrogation pulse.

A synchronization counter 200 (FIGURE 14) is used to measure the time error Δ, in the manner shown on line 2 of FIGURE 13A. High frequency timing or clock pulses, for example on the order of 4.48 megacycles are applied from a master tuning oscillator or a clock 210 to the counter 200 beginning at the occurrence of "own" interrogation pulse which is transmitted at one of the positions. The count in the counter 200 increases until the "other" interrogation pulse is received. From this time on, timing pulse occurrences are subtracted from the total count until the reply pulse is received. At this time, the count stored in the synchronization counter 200 is proportional to the time error Δ.

In the case shown in FIGURE 13A, the "own" interrogation pulse $I_0$ leads the position it should have to be synchronized. As described above in Section IV, only one-half of the time correction for the master oscillator 210 is made at each station following a "green" comparison. Therefore, the measurement in line 2 must result in the Δ/2 time correction shown in line 4 to move the own station's position pulses halfway towards the synchronized position.

The position pulses at the 548 p.p.s. rate are generated by electronically counting the output pulses from oscillator 210 in a position pulse counter 220. The counter 220 generates 548 position pulses per second. A larger number of pulses produced by oscillator 210, say 1635 pulses, are needed to produce each position pulse. The counter 220 counts to the predetermined number, say 1635 and produces an output pulse. This occurs 548 times per second when the station is synchronized. After producing the 548 position pulses the counter automatically resets itself to start over again, unless it is reset sooner by some other signal. Counting circuits for doing this are conventional in the art.

To make the Δ/2 time correction required in FIGURE 13A, the high frequency timing pulses are interrupted for a Δ/2 time interval so that no timing pulses are applied to the position pulse counter 220. All of the circuits in the counter 220 are bistable, so that none of the circuit states in the counter change until the count is resumed. As a result, the next position pulse, and those thereafter are delayed by Δ/2.

The Δ/2 time interval is generated following receipt of the reply pulse by driving the synchronizing counter 200 with timing pulses, the repetition rate of which has been multiplied by four times the normal rate applied to this counter and subtracting these from the total count. When the total count in the counter 200 becomes zero, the elapsed time from the beginning of the accelerated timing sequence is just Δ/2. This is explained as follows. The count in the synchronizing counter 200 at the reception of the other interrogation pulse is proportional to $T+\Delta$ (line 1), and subtracted from this count by the time of the reception of the reply pulse is a count corresponding to $T-\Delta$. Therefore, at the reception of the reply pulse, the total count in the synchronizing counter 200 is proportional to 2Δ. If the same repetition rate is used for the timing pulses in driving the synchronizing counter 200 to zero count, a time interval of 2Δ would be generated. Consequently, the repetition rate must be quadrupled to generate Δ/2 as shown in line 2. The "correct" pulse of line 3, which exists during the production of the quadruple frequency pulses, is used to close a timing gate 211 preceding the position pulse counter 220 to effect the re-timing of the position pulses. This is described below.

In FIGURE 13B the lag case is diagramed where "own" stations position pulses lag "other" stations position pulses by a time Δ. Again, a time interval of Δ/2 is generated, but instead of interrupting the timing pulses to the position counter 220 during this interval, the repetition rate of the applied pulses is doubled. This speeds up the count and advances the next position pulse out of counter 220 and the next interrogation pulse by a time Δ/2. The count stored in the synch counter 200 is a function of time is shown on line 2 of FIGURE 13B. It should be noted that the count crosses zero during the subtraction and becomes negative. Therefore, the direction of counting during the correction pulse of line 3 is reversed from that in the lead case of FIGURE 13A, i.e., pulses are added to counter 200 to bring it back to a zero count. The direction of the timing pulse count (i.e., subtract or add) during correction as well as the nature of the position counter timing signal correction are determined by whether or not a zero crossing occurs in the synch counter 200 total count (line 2) before the reply pulse is received. No zero crossing means a lead error (FIGURE 13A) whereas a zero crossing means a lag error (FIGURE 13B). A more detailed description of the instrumentation needed for synchronization follows below.

B. *Circuit synchronizing diagram*

A block diagram of the synchronization circuits using the pulse counting technique is shown in FIGURE 14. The same basic timing signal, generated by the highly stable master timing oscillator 210 is used to drive both the synch counter 200 and the pulse position counter 220. The output of oscillator 210 is at twice the frequency (e.g., 8.96 megacycles) of the timing pulse frequency and one-half the frequency of the quadrupled pulse rate. The oscillator 210 produces the clock pulses which are used to operate the synch counter 200 and the position counter 220. Both of these counters are of conventional construction, for example ring type counters formed by a number of bistable (flip-flop) circuits. Counter 200 may illustratively have 13 bistable circuits while counter 220 has 15. Counter 200 also has the capability of subtracting (counting backward) upon command. As pointed out before, position counter 220 produces 548 output pulses per second or whatever the number of position pulses that are to be used.

A first gate 211 connected to the output of oscillator 210 and a second gate 212 connected to the output of the first gate 211 are normally open so that the timing oscillator 210 pulses are continually applied to the input of the position counter 220 after being divided in half by a frequency divider 215 down to the normal counting pulse rate. The countdown of counter 220 is such that the counter output pulses occur approximately 548 times a second, these being the position pulses required for the system.

Time synchronization of the position pulses is achieved by the proper control of gate 211 and a gate 213 which is normally closed. This latter gate 213 receives double frequency timing pulses from doubler 214 which is connected to the oscillator 210. If a lead error is to be corrected, the normal frequency timing pulses are removed from counter 220 by closing gate 211 and leaving gate 213 closed as well. A lag error is corrected by closing gate 211 and opening gate 213 (normally closed) which permits double frequency timing pulses to be applied to the position counter 220.

In a similar fashion gates 201 and 202 control the timing pulse input to the synchronizing counter 200. The output of gate 201 is divided down by two by a divider 203 while gate 202 receives the quadruple frequency timing signals from a times two frequency multiplier 214. During the count of counter 200 preceding the reply pulse, gate 201 is open. The switching action of gate 201 is controlled by a gate pulse generator 205. Generator 205 is triggered into the "on" (open) state by the "own" interrogation pulse, and into the "off" (closed) state by the received reply pulse. Timing pulses are applied to the synch counter 200 input during the "on" time of generator 205 from "own" interrogation pulse to the occurrence of the reply pulse. The "own" interrogation pulse is also applied to an add/subtract command circuit 207 to command the reversible synch counter 200 to add the timing pulses. The received "other" interrogation pulse is applied to command circuit 207 to shift the synch counter from addition to subtraction, as shown in line 2 of FIGURES 13A and 13B.

When the reply pulse is received, it closes gate pulse generator 205 and triggers a second gate pulse generator 208 into opening gate 202. This allows the frequency-quadrupled timing signals from doubler 214 to be applied to the synch counter 200. At the end of the correction period, gate generator 208 is triggered off by the termination of the correct pulse and gate 202 is closed. The correction period is defined by the rise and fall of the pulse output from a correct pulse generator 209. The correction period is initiated by the occurrence of the reply pulse and is terminated by a pulse from a synch counter zero sense circuit 206. Circuit 206 consists of a diode type AND gate having a number of input diodes sufficient to sample the states of a corresponding number of bistable circuits in the synch counter 200. In the example being described the counter 200 has thirteen bistable circuits as there are thirteen diodes. When all states of the bistable counter circuits are in the zero state, meaning that the count is zero, the AND gate 206 produces an output to turn off the correct pulse generator 209. If the zero count of counter 200 occurs before the reply pulse as in the lag error case, the zero sense circuit 206 output does not affect the correct pulse generator 209 because it is already in the off state. The correct pulse generator 209 reset (off) input is connected to AND gate 206 and the set (on) input receives the reply pulse.

The correct pulse from generator 209 is distributed to a number of different circuits which must be actuated during the correction cycle to obtain synchronization correction of the position pulses. These circuits include the following:

(1) AND gate 223—The correct pulse from generator 209 is inverted by an inverter (not shown) before being applied to this AND gate. The other input to the AND gate 223 is the zero sense output from circuit 206. The gate 223 has an output when a zero-crossing occurs before the reply pulse is received.

(2) Zero cross flip-flop 225—This bistable circuit is triggered into the "on" state by an AND gate 223 output and is triggered back into the "off" state by the trailing edge of the correct pulse. In effect, it remembers until the end of the correction period that a counting zero-crossing of counter 200 has occurred. This defines the required timing correction as being either a lead or a lag.

(3) AND gate 227—The inputs to this AND circuit are the correct pulse from generator 209 and the output of the zero cross flip-flop 225. Both inputs must exist simultaneously for an output to exist so that the AND gate 227 output pulse exists only when correction for lagging operation of the system is to be made.

(4) Gate 211—As previously explained in the operation of the timing gates, gate 211 is always closed during the correct cycle to prevent normal (single) frequency timing pulses from driving counter 220. The correct pulse from generator 209 is applied to gate 211 to achieve this operation so gate 211 is open only when no timing correction is being made.

(5) Gate pulse generator 208—This generator operates gate 202, which, when opened, applies quadrupled frequency timing pulses to the synch counter 200. The trailing edge of the correct pulse is used to close gate 202 by triggering circuit 208 back into the off state.

Another circuit is operated indirectly by the "correct" pulse, this being the AND gate 230. It will be remembered that during the correction cycle, the direction of counting in the synch counter 200 depends on the type of error lead or lag, to be corrected. Referring back to FIGURE 13A, during the correct pulse, counts must be subtracted for a lead error, while in FIGURE 13B for a lag error, counts must be added. If no zero-crossing occurs in counter 200, then a lead error is indicated. As shown in FIGURE 14, the received "other" interrogation pulse changes the add command from circuit 207 to a subtract command, as required, for both types of errors. AND gate 230 generates a pulse which is coincident with the reply pulse if a zero-crossing has occurred, (lag error). In this case the subtract command must be switched back to add when the reply pulse occurs, and this is accomplished by applying the output pulse from gate 230 to the add trigger terminal of the command circuit 207.

Other circuits in FIGURE 14 which perform a function peripheral to the synchronizing function include the following:

(1) Gate 221—This gate circuit is normally open and is controlled by the "dump" voltage, the generator of which is described below. This dump voltage exists if other than one "other" interrogation pulse is received between the "own" interrogation pulse and the first received reply pulse. The dump voltage closes gate 221. With gate 221 closed the correct pulse is not transmitted to the other circuits described above so that no time correction is made. The dump voltage is also used to inhibit gate pulse generator 208 so that gate 202 does not open. Gate 202 is closed since there is no need to apply quadrupled frequency timing correction pulses to the synch counter 200 if no correction is to be made, which is the case when other than one "other" interrogation pulse is received.

(2) Gate 212—This gate is used to provide coarse synchronization. When the coarse synchronizing circuits (described below) indicates that the position counter 220 should start counting, the start voltage applied to gate 212 drops to zero, and the gate is opened. The start voltage is also used to clear the position counter 220, so that it starts with no stored count, or with a pre-determined stored count, if this is desirable. When no coarse synchronization is being used the gate 212 is left open.

(3) Clear delay generator 232—This is a monostable pulse generator which is triggered with the "own" interrogation pulse and which relaxes back to its normal state slightly before the next "own" interrogation pulse position. The generated clear pulse is applied to circuits 200, 205, 208, 209 and 225, to insure that whatever has gone on before the bistable circuits of the various portions of the synchronizer will be reset or cleared prior to the next synchronizing attempt.

Before extending the discussion any further, the sequence of events is traced for both lead error and lag error conditions.

LEAD ERROR (FIGURE 13A)

With the occurrence of the "own" interrogation pulse produced at the station, gate 201 is opened by pulse gate generator 205 and the synch counter 200 begins to count single frequency timing pulses from divider 203 in the add mode. When an "other" interrogation pulse is received it is applied to the command circuit 207 to change the add command to a subtract command. With a lead error, there is no zero crossing (zero count) before the reply pulse is received. Thus, the zero sense circuit 206 is not actuated. When the reply pulse is received and applied to pulse gate generator 205, the generator closes gate 201. The reply pulse turns gate pulse generator 208 on to open gate 202 thereby allowing the higher frequency (quadrupled frequency) timing pulses to flow into the synch counter 200, which is still in the subtract mode. The reply pulse also initiates the production of the correct pulse by generator 209 which, in turn, closes gate 211, through the dump voltage gate 221. Closing of gate 211 starts the lead error correction. No timing pulses flow into the position counter 220 for the duration of the correction. The correction cycle is terminated when a zero count of the synch counter is sensed by circuit 206. This turns off or stops the correct pulse produced by generator 209. Termination of the correct pulse turns off gate pulse generator 208 and closes gate 202 preventing any further counting by synch counter 200 until the next "own" interrogation pulse opens gate 201. Gate 211 is also reopened by the termination of the correct pulse and the time correction is thereby terminated.

LAG ERROR (FIGURE 13B)

In the lag error case, the circuit operation is identical to that in the lead case, until a synch counter zero crossing occurs. When this happens, the zero sense pulse produced by circuit 206 is passed through AND gate 223 and triggers the zero cross flip-flop 225 into its on state. The zero cross on voltage produced by flip-flop 225 is sent to AND gates 227 and 230. When the reply pulse occurs it passes through gate 230 and switches the command circuit 207 from subtract back to add. The reply pulse also starts production of the correct pulse by generator 209 which closes gate 211. However, the correct pulse can now also pass through AND gate 227 to open gate 213. This permits double frequency timing pulses to enter the position counter 220, and make the timing correction. As with the lead error case, when the quadrupled frequency pulses produces a zero count at counter 200 this is sensed by zero cross circuit 206 during the correction to stop the correct pulse produced by pulse generator 209 and to thereby close gate 213. This terminates application of the double frequency pulses to counter 220. The correction is complete and gate 211 is reopened.

*C. Binary adder/subtracter synch counter 200*

As explained above, synchronization is achieved by addition and subtraction in the synch counter 200. Binary counting can be achieved in this counter with bistable circuits having the proper coupling between circuits as shown, for example, in the block diagram of FIGURE 15A. In between flip-flops 250 of the counter the output waveform is differentiated by circuit 252 so that a change in state of a flip-flop becomes a spike pulse, the polarity of which depends on the direction of change. This achieves a scale-of-two countdown if the pulses of one polarity are gated out by a selectively controlled + or − OR gate 254 and the flip-flop 250–1 that follows changes state in response to each trigger pulse of the other polarity that is passed. The choice of addition or subtraction is made by choosing the polarity of the trigger pulses transmitted between flip-flops which is done by the add/subtract control 207 making the OR circuits 254 responsive to pass positive or negative pulses.

Figures 15A, 15B, 15C:
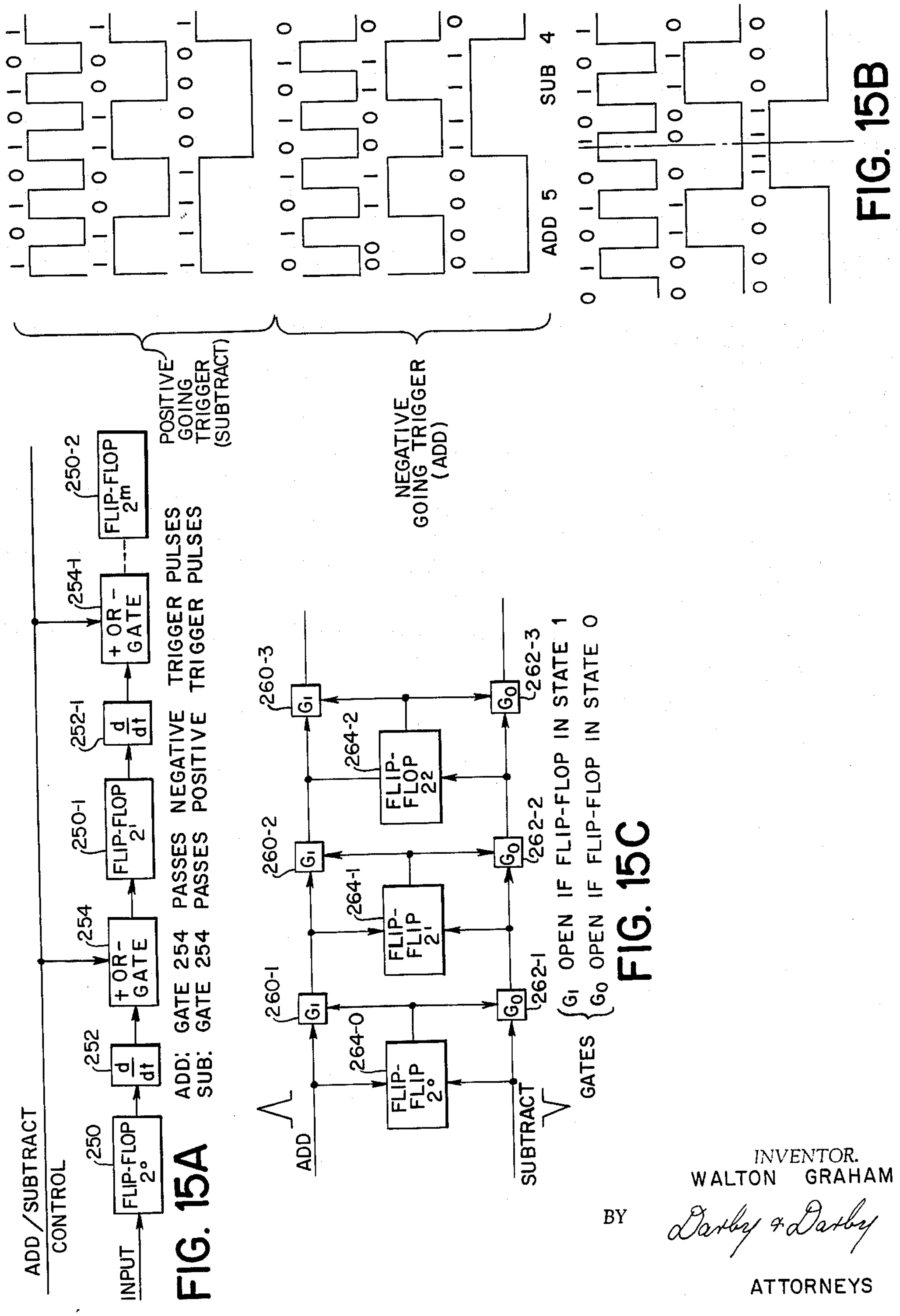

FIGURE 15B shows a series of waveforms for a $2^3$ reversible counter. The top group consists of waveforms that change state with positive going changes of state in the prior waveform. The middle group of waveforms change state for negative-going changes-of-state, and it can be seen that the middle group of waveforms is the top group inverted. Also, if a number in the middle group is added to the corresponding number in the upper group, the binary sum is always 1, 1, 1. Therefore, if the count represented by middle group steadily increases in going left to right across the diagram, the count in the upper group of waveforms must be steadily decreasing. In other words, counts are being subtracted in the upper waveforms group, whereas they are being added in the middle group. The lower group of waveforms is an example of adding 5 counts and subtracting 4 counts, starting from 0, 0, 0.

The counter of FIGURE 15A has a propagation time through the flip-flop chain, which is roughly the sum of the rise times of the flip-flops up to the last digit being changed. This propagation time can be reduced to nearly one rise time by using the adder/subtracter (counter) circuit shown in FIGURE 15C. In this counter the trigger pulse propagation is not through the flip-flops, but through positive trigger diode gates 260–1, 260–2, 260–3 . . . and through negative diode trigger gates 262–1, 262–2, 262–3 . . ., the rise time of which can be made very short. The trigger pulses are produced by differentiating the output pulses of the single frequency timing pulses. The add/subtract command circuit 207 determines whether the trigger pulses are to be applied to the respective gates. Gates 260–1, 260–2 and 260–3 are opened when the output of the respectively connected flip-flop 264–0, 264–1 and 264–2 is in state 1 (flip-flop "set") while gates 262–1, 262–2 and 262–3 are opened when the respectively connected flip-flops are in the reset state. The speed of operation of the circuit of FIGURE 15C is limited to one flip-flop risetime, since the flip-flops to be changed will be triggered almost simultaneously. The counter chain can be extended for as many stages as desired.

The operation of the counter of FIGURE 15C can be understood by considering sample binary numbers, and numbers 1 count large and smaller:

| | Addition | Subtraction |
|---|---|---|
| +1 count | 101000 | |
| Sample binary No. | 100111 | 101100 |
| −1 count | | 101011 |

It can be noted that in addition, starting from the right, adding 1 count implies that all of the flip-flop states up to and including the first 0 must be changed. Subtraction implies that all of the flip-flop states up to and including the first 1 must be changed. Different sample numbers are used to better demonstrate the carry operation required. In FIGURE 15C, the add/subtract trigger pulse commands travel through the gates 260 and 262 until they enter the last flip-flop stage to be changed. This flip-flop, being in a different state from all those preceding it, has closed the gate circuit following it thereby terminating the propagation of the trigger pulse. As this last flip-flop changes state it opens the closed gate; however, enough delay is inserted in the control voltage so that the gate does not open before the trigger ceases to exist. For fast trigger pulses, the rise time of the flip-flop is sufficient for this purpose.

D. *Dump voltage circuitry*

Figure 16:
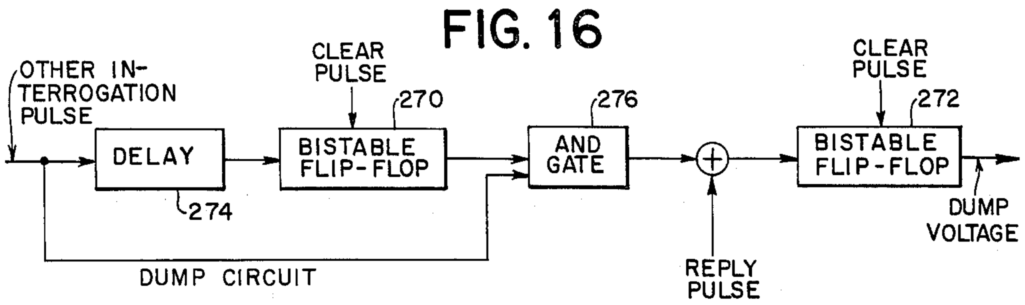
FIGURE 16 is a block diagram of a circuit for producing the "dump" voltage.

As explained above, the purpose of the dump voltage is to prevent a timing correction from being made at the station of 0, 2, 3, 4 . . . ∞ "other" interrogation pulses appear in the time interval between "own" interrogation pulse and the reception of the reply pulse. A timing correction should be made only when one "other" interrogation pulse appears in this interval. FIGURE 16 is a block diagram of a circuit for producing the dump voltage. Initially both flip-flops 270 and 272 are in the off or reset state. When an "other" interrogation pulse is received, flip-flop 270 is triggered on after a small delay interposed by delay circuit 274. The "other" interrogation pulse is also applied to an AND gate 276 but does not pass through this gate because no voltage is present at the other AND input terminal. A received second "other" interrogation pulse can now pass through AND gate 276 because flip-flop 270 is in the on state. The other interrogation pulse triggers flip-flop 272 to the on state to generate the dump voltage. This voltage is applied to gate 221 of FIGURE 14 to close the gate and prevent the correct pulse from being transmitted to the remainder of the synch circuitry. When there is no correction pulse there is no correction of the position counter 220.

If no "other" interrogation pulses are received then the first received reply pulse triggers flip-flop 272 to close gate 221 (FIGURE 14) so that interrogation pulses received outside the proper interval cannot cause a correction. Referring to FIGURE 14, if neither "other" interrogation nor reply pulses occur during the interval then the clear monostable generator 232 automatically stops the counting process in counter 200. Since no zero occurs in the synch counter 200, then no correct pulse is generated by circuit 209 and no time correction is made.

E. *Pulse position selection for B, A and G positions*

As explained above with reference to FIGURE 10, the own station transmits a start $B_0$ pulse and an altitude information pulse $A_0$ or ground information pulse $G_0$, depending upon whether it is an aircraft or ground station. Each station must also know whether the interval following each position pulse is for aircraft or ground station information purposes. The timing sequence of the system repeats approximately once a second and it commences with a start $B_0$ pulse followed by the alternation of altitude information intervals with ground station intervals; the start of each interval being defined by a position pulse. This is shown in FIGURE 1. Approximately halfway through the one second sequence period, from position #201 on, the alternating part of the sequence terminates, and the remaining time is used for the purposes of synchronization.

Figure 17:
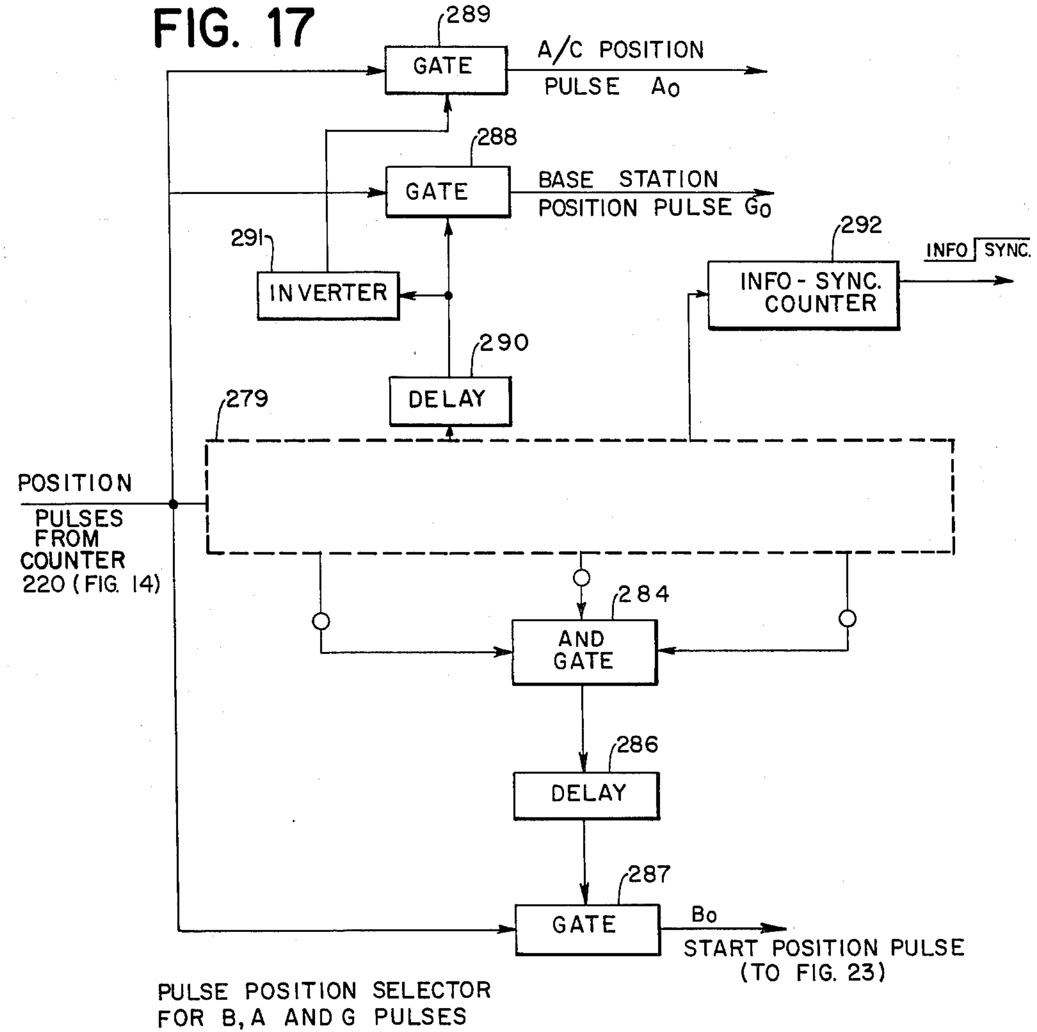
FIGURE 17 is a block diagram of a circuit for selecting the position pulses for the $B_o$, $A_o$ and $G_o$ pulses.

FIGURE 17 shows a block diagram of a circuit for taking the position pulses at the output of counter 220 and using these position pulses to produce the $B_0$, $A_0$ and/or $G_0$ pulses during the first half of the sequence. In FIGURE 17 the sequence is created by continuing the countdown from the position pulse output of the counting circuit 220. A countdown of 548 is produced by a counter or divider 279 which has respective flip-flop countdown stages. The divider 279 generates the start pulses B with these B pulses occurring at a frequency 1/548 of the input, or 1 p.p.s. The start pulse B is generated when the stored count in the counter 279 reaches 548. This count is sensed by AND gate 284 connected to the flip-flops in the counter. So long as the 548 count exists the AND gate has a 1 output. The gate has a 0 output for any other count. The AND gate 1 output pulse is delayed slightly in an RC delay network 286 and applied to another gate 287, the input of which is the train of position pulses from counter 220. The delay keeps this gate open during the divider input transition from 548 to 1, so that the next position pulse corresponding to the start B pulse is passed through the gate 287 with very little propagation delay. This passed pulse corresponds to the start $B_0$ pulse and is used to generate the same.

The aircraft position pulses A and the ground station position pulses G are generated in the similar manner. These alternate in time, so that a pair of gates 288 and 289 are alternately opened and closed. After a 2:1 countdown of the 548 p.p.s. position pulses by divider 280, the counting square wave is delayed by delay circuit 290 and applied to gate 288. The other gate 289 is operated with an inverted 291. The position pulse outputs of the gates 288 and 289 then alternate in time, with those from gate 288 being the aircraft information pulse train A and those from the other gate 289 being the ground station information pulse train G.

Identification of the particular aircraft or ground station position pulse to be used for $A_0$ or $G_0$ pulse transmission to identify the station is accomplished by determining the states of the flip-flops in the divider at the time that the pulse occurs. This is considered in greater detail below. Also connected to the dividers 281 and 282 is an information-synchronization gating pulse generator 292. This circuit senses the count of counter 279 and when it is below 201, indicating that the station should be transmitting and receiving inforamtion (B, A, G) pulses, the circuit produces an information gating pulse of one polarity. When the count is greater than 201, the circuit switches to the production of a synchronizing gating pulse to allow the transmission and reception of I and R pulses.

F. *"Own" interrogation pulse generation*

Figures 18, 19:
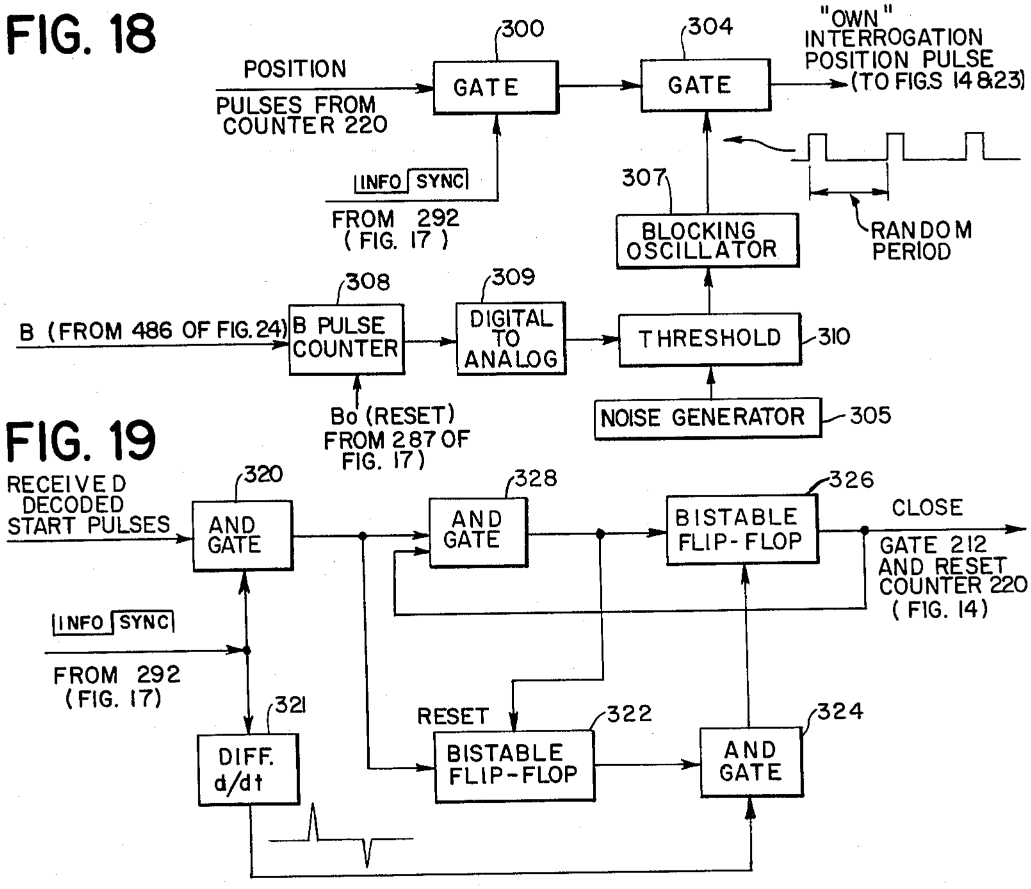
FIGURE 18 is a block diagram of a circuit for selection of position pulses for the $I_o$ pulses.
FIGURE 19 is a block diagram of a circuit for producing coarse synchronization of the start pulses.

The "own" interrogation pulses are generated by the circuit shown in FIGURE 18. This circuit corresponds to the random gate generator 60 and random gate 64 of FIG. 10. The position pulses from counter 220 are passed through a gate 300, by the output synchronizing gating wave from circuit 292. This prevents the "own" interrogation pulse from occurring during the information half of the timing sequence. The position pulses at the output of gate 300 are further gated in a gate 304 by a waveform having a randomly occurring interpulse period and a pulse length fixed at slightly less than the time between two position pulses. The random gating pulse is produced by a noise generator 305 whose output pulses above a threshold level trigger a mono-stable blocking oscillator. When the gate pulse occurs at gate 304 one and only one position pulse will almost certainly occur (unless gated out by the previous gate 300) during the gate pulse and be passed. The average frequency of the gate pulses from 304 is adjustable by adjusting the triggering threshold of blocking oscillator 307 and is, for example, kept in the 10–20 p.p.s. range. This is accomplished by a counter 308 which counts the received B pulses from the B pulse decoder 486, which is described below. Counter 308 is reset every second by the $B_0$ pulse from generator 287. The counter 308 supplies its output to a digital to analog converter 309 which converts the count into an output voltage proportional to the count. Converters of this type are conventional in the art. This analog voltage is held for the one-second period in a threshold circuit 310 which varies the level at which pulses from the noise generator are passed to oscillator 310. As the number of received B pulses decreases the threshold voltage is decreased resulting in an increased triggering of oscillator 307 and an increase in the $I_0$ pulse output.

G. *Start pulse (B) synchronization*

Where coarse synchronization is to be used, the own start pulse $B_0$ is to be synchronized to the first received start pulse from another station prior to activating the transmitter at the own station. Therefore, the first received start pulse must always cause a correction if it is received before "own" start pulse is produced. FIGURE 19 is a block diagram of a preferred start pulse synchronization circuit. At the left, the decoded start pulses received from other stations and the information-synchronization timing wave from circuit 292 of FIGURE 17 are applied to an AND gate 320 so that the received start pulses are passed by gate 320 only during the synchronizing portion of the timing sequence. These are the start pulses that are received prior to the production of own start pulse $B_0$. If a start pulse is passed by gate 320 it triggers a flip-flop 322 thereby opening an AND gate 324 for any pulse that might appear at its other input. The information-synchronization timing wave is differentiated by circuit 321 to produce the spike pulses corresponding to the rise and fall of the wave. At the other input of AND gate 324 the differentiated version of the information-synchronization timing counter wave is applied, with a positive pulse indicating the beginning of the synchronization period and a negative pulse at the end. When the next positive differentiated pulse appears at AND gate 324 input (beginning of next synch period one second later), it passes through the gate 324 and triggers a second flip-flop 326. The output of flip-flop 326 is used to close gate 212 (FIGURE 14) and reset counter 220. Thus, the position counter 220 is ready to be synchronized.

Since flip-flop 326 is triggered at the beginning of the synchronization period following the period in which the first start pulse is detected, the first start pulse in the second period passes through AND gate 320 and AND gate 328 which is opened by the setting of flip-flop 326. This start pulse triggers flip-flop 322 and 326 back into their normal state. This causes gate 212 to reopen and the count is begun again in the position counter 220. The required coarse synchronization is achieved because the position count in counter 220 is begun when the first start pulse is received in the second synchronization period.

If coarse synchronization is not to be attempted on one isolated start pulse but on a group of pulses, then flip-flop 320 may be replaced with a conventional staircase generator. When the required number of start pulses have been received, the staircase generator output would exceed a critical voltage and AND gate 324 would be opened. From this point on, the circuit operation is the same, as described above. Such a circuit might be needed, if extraneous pulses occur in the start pulse decoding.

H. *Master oscillator (210) frequency control*

Figure 20:
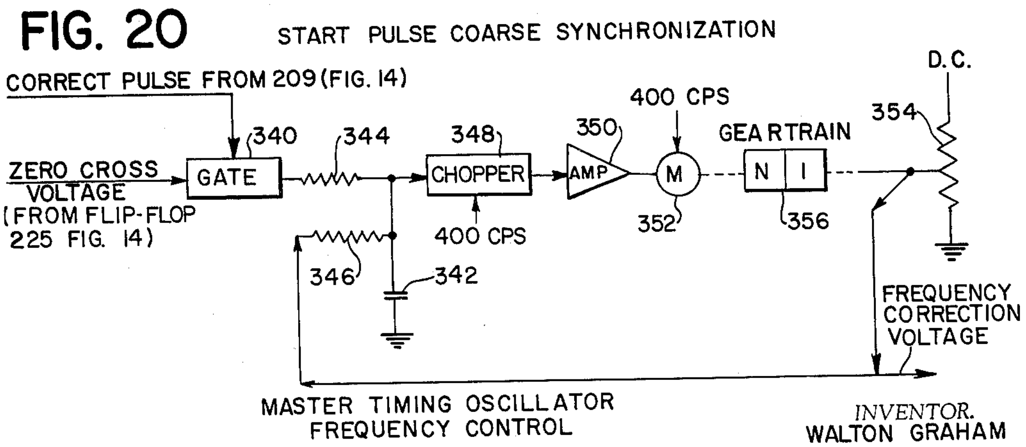
FIGURE 20 is a frequency control circuit for the master timing oscillator of FIGURE 14.

It is possible to control the frequency of the master timing oscillator 210 so that corrections consistently in the same direction can be minimized. This reduces the possibility of losing synchronization due to drifting of the master oscillator. One arrangement for doing this is shown in FIGURE 20. Here, the correct pulse from generator 209 of FIGURE 14 is used to control the oscillator frequency. In this scheme, the correct pulse from generator 209 (FIGURE 14) gates the zero-cross voltage produced by the zero-cross flip-flop 225 through a gate 340. The polarity of the zero-cross voltage is determined by the direction of the correction, either lead or lag, since the zero-cross flip-flop is either off or on respectively. Bipolar pulses appear at the output of gate 340 of a duration corresponding to the duration of the correction cycle used in FIGURE 14. If the lead and lag corrections over a period of time are equal, then the average or D.C. component in the gate 340 output approaches zero. On the other hand, if one type of lead or lag correction predominates, then the D.C. component will not be zero but its polarity will depend on the type of error.

In FIGURE 20 the D.C. voltage is used to control an electromechanical servo system to produce oscillator frequency correction. When the gate 340 is opened a capacitor 342 is charged by the gated voltage through a resistor 344. This partially charges capacitor 342. Closure of gate 340 stops the charging process and the capacitor starts to discharge. The discharge is much slower, since resistor 344 is not grounded during the closed period and a second resistor 346 connected to the capacitor has a value much greater than that of resistor 344. The D.C. error voltage on the capacitor is chopped, for example, at 400 c.p.s., by a chopper 348, then amplified by an amplifier 350 and applied to a servomotor 352. A linear potentiometer 354 with D.C. excitation is driven by the motor through a gear train 356. The gear train ratio is such that it takes a relatively long time, approximately from 30 seconds to 60 seconds in the illustrative system being described, to traverse the entire potentiometer range. The potentiometer wiper voltage is applied to a voltage sensitive variable capacitor (not shown) in the timing oscillator 210 to control the oscillator frequency over a limited range. This type of variable frequency control is conventional in the art.

If no D.C. error exists, the motor has no drive, so that no frequency correction would be made. When a D.C. error does appear, the motor 352 drives the potentiometer 354 in the proper direction to reduce the error by applying the correction voltage back to the capacitor over resistor 346. Since the correct pulses occur at roughly the rate of two per second, the time constant of capacitor 342 and resistor 346 must be long enough to permit some smoothing, say 2 or 3 seconds. This time constant, however, must not be so large as to cause loop instability, when the loop is closed around the timing oscillator. Also, the integration from the frequency correction voltage on the right to the effective phase error that appears on the left must be taken into account in the loop stability considerations. Position feedback is used around the motor-amplifier combination to prevent double integration from occurring around the loop. Enough D.C. gain in the servo amplifier is also included to keep the error small even at the extremes of the potentiometer. All of these techniques are conventional. Because of the small sensitivity of the timing oscillator the single integration and the lag due to the RC filter are generally not enough to cause loop instability.

It should be understood that the output frequency of the master timing oscillator 210 can be regulated in other ways, for example by providing ovens, temperature sensing circuits and by using other similar techniques which are conventional in the art. These techniques may be used alone or in conjunction with the one shown in FIGURE 20.

I. *Aircraft information pulse (A) generation*

Figure 21:
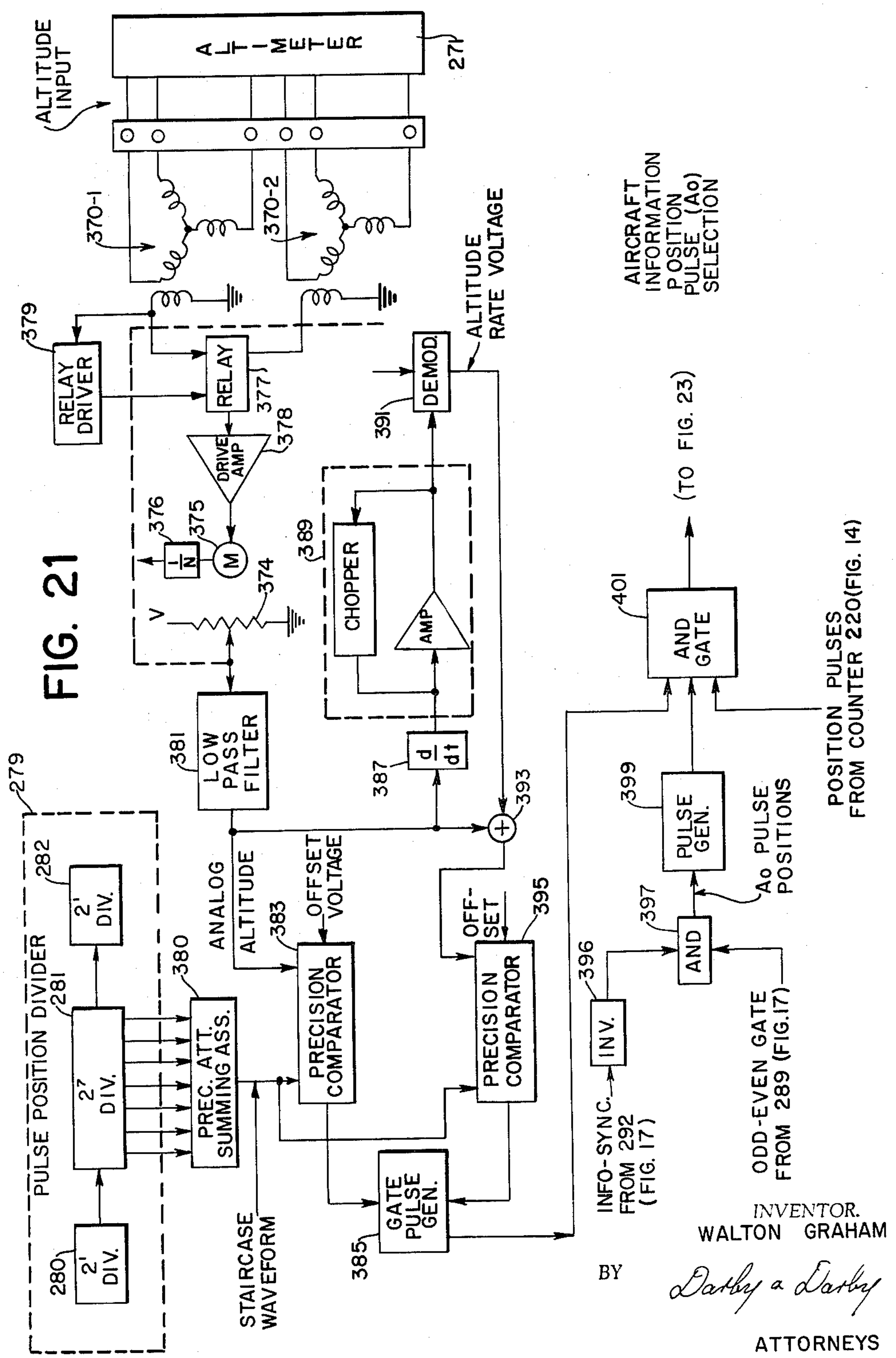
FIGURE 21 is a block diagram of a circuit for selecting position pulses to produce the $A_o$ pulses.

Once synchronization has been achieved, the aircraft information pulses are transmitted, according to the altitude layer in which the station is present. In FIGURE 21 the aircraft altitude information is brought in on a two speed, three wire synchro 370–1 and 370–2 from an altimeter 271, for example, such as the Kollsman type No. 1686–05. Synchro 370–2 runs at a faster speed to produce more precise measurements of the altitude. The altitude information from the two synchros is repeated as an analog D.C. voltage on a potentiometer 374 driven by a repeater servo motor 375 through a gear train 376. Most of the angle tracking is done in the servo 375 by the high speed synchro 370–2 signal which is applied through a relay 377 and a drive amplifier 378. If a high-speed cycle is slipped then, when the low speed servo 370–1 error output exceeds a predetermined critical threshold, a relay driver 379 is activated to change the condition of the relay. The relay 376 picks up and connects the low speed synchro 370–1 to the servo 375 to drive the synchro error to zero. When this occurs, the control is returned to the high speed synchro 370–2 by having relay 376 drop out.

The time of transmission of the aircraft information pulses ($A_0$) relative to the start pulses $B_0$ is programmed according to own aircraft altitude. As previously discussed, the synchronized position pulses are generated at the rate of 548 p.p.s. Any aircraft information pulses that are transmitted must be time-coincident with these position pulses. To be specific, only one $A_0$ information pulse is transmitted in the interval between any two start $B_0$ pulses and this $A_0$ pulse is generated by selecting one of the odd numbered position pulses that occur in the interval between positions #3 to #199 (see FIGURE 1). At the upper left of FIGURE 21, the pulse position selector divider 279 (FIGURE 17) is shown, with the outputs of the seven flip-flops of the middle divider 281 going to a precision attenuator summing assembly 380. In going from the outputs of the high frequency end of the middle divider 281 to the low frequency end (left to right), the attenuation factor of the attenuator 370 decreases by a factor of two for each step of division. The attenuator outputs are added directly, and the output is a staircase waveform starting at zero at the start pulse.

The analog altitude voltage from potentiometer 374 is applied through a low pass filter 381 to one input of a precision comparator 383. The other input to the comparator is the staircase waveform from the attenuator 380. When the two applied voltages are equal, the comparator 383 generates a pulse which is applied to a gate pulse generator 385 to trigger gate pulse generator 385 either "on" or "off," depending on the magnitude and polarity of an altitude anticipation voltage.

If the aircraft is ascending or descending, it is desirable to transmit information pulses in altitude layers ahead of the own aircraft's actual altitude layer. A proportional control is provided in which the number of altitude layers in which there is $A_0$ pulse transmissions depends on the rate of change of aircraft altitude. Altitude rate is obtained by differentiating the analog altitude voltage at the output of filter 381 in a differentiating network 387. Since the rate voltage at the output of network 387 is normally very small it is amplified in a conventional chopper feedback stabilized amplifier 389 demodulated in circuit 391, and then added to the analog altitude voltage in the combining circuit 393. The sum voltage at the output of circuit 393 is applied to a separate voltage comparator 395 which generates a pulse either before or after the output pulse of the other comparator. The time of generation of the pulse from the second comparator 395 depends upon the rate of change of aircraft altitude and whether the aircraft is ascending or descending. The latter determines whether the rate voltage is additive or subtractive to the analog voltage. The first pulse from either comparator 383 or 395 triggers the gate generator 385 to the on state (produce gate pulse) while the second pulse from the other comparator returns the generator to the off state. The interval defined by this gate pulse is the altitude-coded time of transmission for the aircraft information pulses.

Transmission of the information pulses is accomplished as follows. The information-synchronization gating pulse from counter 292 (FIGURE 17) inverted by an inverter 396, and the odd position gating pulse from gate 289 (FIGURE 17) are applied to the inputs of an AND gate 397. The AND gate 397 has an output only for the odd numbered positions occurring during the information period. AND gating pulses are applied to a pulse generator 399 to shape the pulses if necessary, and the shaped pulses are applied to a second AND gate 401. AND gate 401 also receives the altitude gate pulse from generator 385 and the position pulses from counter 220 (FIGURE 14). Therefore, a position pulse passes through the AND gate 401 only during the altitude gate pulse and at an odd position. These position pulses control the $A_0$ information pulses to be transmitted.

The offset voltages from a suitable source (not shown) are applied to comparators 383 and 395 to control the production of the altitude gating pulse manually for a desired altitude layer or layers. The offset voltages are set to control the time of pulse production of each comparator.

Figures 22, 23, 24:
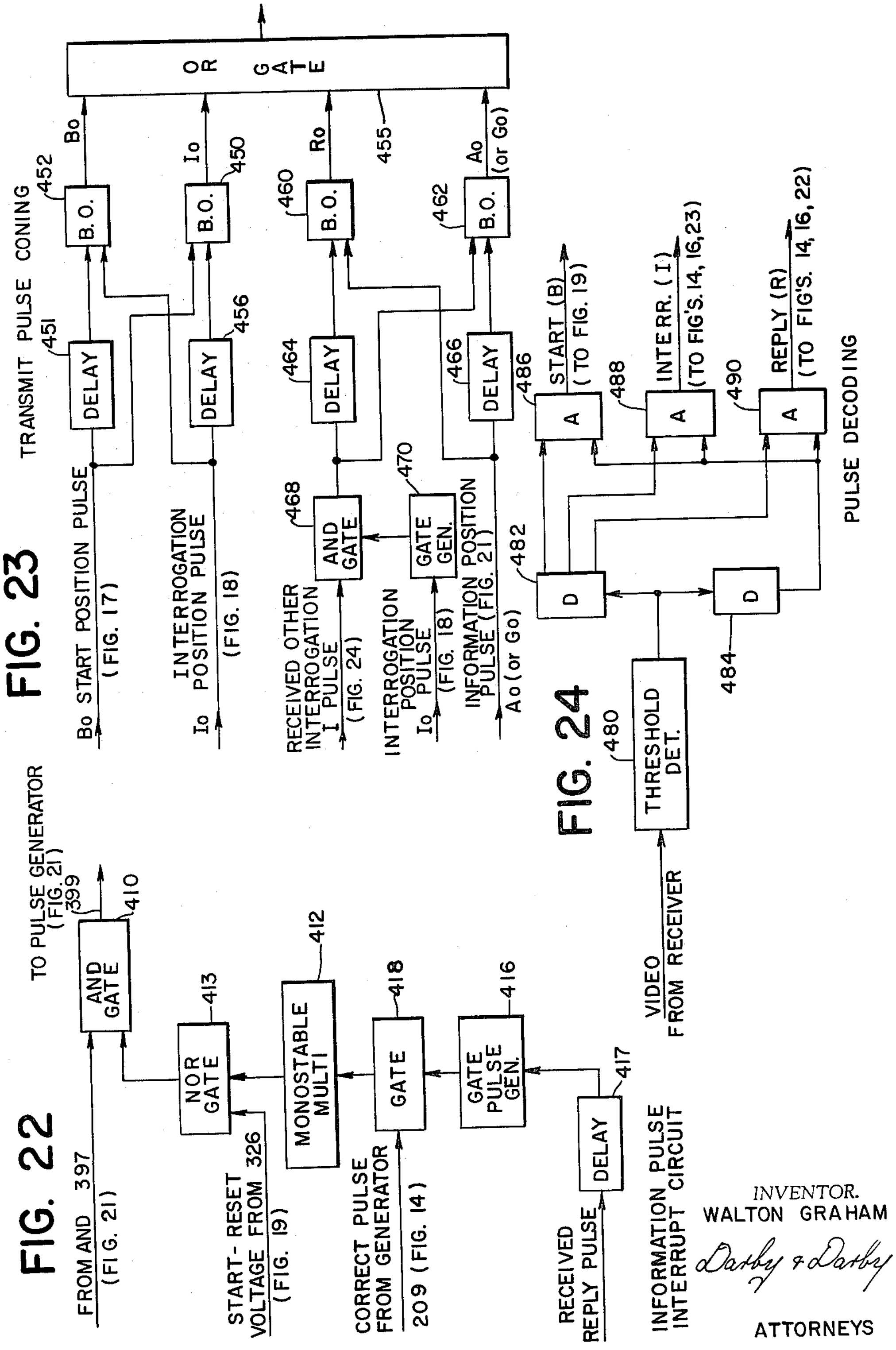
FIGURE 22 is a block diagram of a circuit used to prevent production of information pulses when the station is unsynchronized.
FIGURES 23 and 24 are block diagrams of a pulse coder and decoder, respectively.

It is not desirable that the aircraft information pulses $A_0$ be transmitted if the own station is not completely synchronized with the other stations in the system. Referring to FIGURE 21. $A_0$ pulse transmission can be prevented by interrupting the signal to the pulse generator 399 so that it never reaches the AND gate 401. An $A_0$ information pulse interrupt circuit is shown in FIGURE 22. The gating voltage waveform from AND circuit 397 is applied to an AND gate 410. If the other input to the AND gate 410 does not exist then the gating waveform cannot pass through. As shown, this condition can exist if the start reset voltage from flip-flop 326 (FIGURE 19) or a voltage from a monostable multivibrator 412 is present at the input of a NOR circuit 413. The NOR circuit is an OR circuit with one stage of inversion. Therefore it has no output if there are one or more input signals. The start-reset voltage exists at one input of the NOR 413 if coarse synchronization is taking place. Since it is desirable that the information pulses not be transmitted during this time, the presence of the start-reset voltage blocks AND 410 from being conditioned. Transmission of an $A_0$ pulse is also preferably prevented if the fine synchronization corrections to be made by the station are too large. This prevents false information from being transmitted. Here, the received reply pulse is delayed and is used to trigger a gate pulse generator 416 through a delay circuit 417. The time of the delay is the maximum synchronization error that can be tolerated and this time is preset. If the correct pulse from generator 209 (FIGURE 14), which is initiated by the reply pulse still exists when the gate pulse from generator 416 occurs, a gate 418 is opened and the monostable multivibrator 412 is triggered to open AND 410 and to prevent the $A_0$ information pulse production. It should be understood that the AND gate 410 of FIGURE 22 also can be placed at either the input or output of AND gate 401 of FIGURE 21 or at any other suitable place to prevent production and/or transmission of the $A_0$ pulses.

It should also be clear that where the own station is a ground station that the altitude coding arrangement of FIGURE 2 is not necessary. Instead, the gate pulse from generator 385 is preset to trigger at a predetermined time to pass the position pulse at an even position corresponding to the ground information position of the station. Here, the odd-even gate to AND 397 would come from the even gate generator 288 of FIGURE 17. If desired, the same interrupt circuit shown in FIGURE 22 can be used to prevent transmission of the $G_0$ pulses when the own station is not synchronized.

J. *Pulse coding and decoding*

To provide for identifying the various types of pulses transmitted in the system, pulse coding is preferably used. A pulse pair is actually transmitted for every single start (B), interrogation (I), reply (R), and information pulse (A or G), with the delay between the transmitted pulses of each pair being predetermined by the pulse type. A block diagram of a pulse coder for a single station is given in FIGURE 23. Pulse pairs for each pulse type are formed by two blocking oscillators, with one oscillator being triggered by a delayed version of the first oscillator's trigger pulse. The same blocking oscillator is not used for both pulses because of its relatively slow recovery characteristics.

As shown in FIGURE 23, the position pulse passed by the circuit of FIGURE 17 at the correct time for the production of the $B_0$ pulse is applied directly to trigger a first blocking oscillator 450 and through a delay circuit 451 to trigger a second blocking oscillator 452. The position pulses may be sharpened, if desired, before application to the various oscillators. Both blocking oscillators produce single pulses of a predetermined duration. Delay circuit 451 sets the coding delay for a B pulse so that two pulses are produced by the oscillators 450 and 452 with a predetermined delay therebetween. The two pulses are applied through an OR gate 455 to the modulator of the transmitter. Similarly, the position pulse corresponding to the $I_0$ transmission position is passed from the circuit of FIGURE 18 directly to trigger oscillator 452 and through a delay 456 to trigger oscillator 450. The delay of circuit 456 is different from that of circuit 451 to establish the I pulse coding. The $I_0$ pulse pair is also passed through the OR gate 455 to the transmitter modulator.

A different set of blocking oscillators 460 and 462 is used to produce the coded pulse pairs for the $R_0$ and $A_0$ (or $G_0$) pulses. These oscillators are respectively preceded by an $R_0$ delay circuit 464 and an $A_0$ delay circuit 466 each of which establishes a predetermined time delay for the pulse pair. The trigger for the own reply pulse ($R_0$) pair is from the received other interrogation pulse applied through an AND gate 468. A gating pulse from a monostable gate generator 470 opens AND gate 468 when the own interrogation pulse $I_0$ occurs and allows the other interrogation pulse to pass through, if it occurs. This limits the transmitted replies $R_0$ to only those periods initiated by an own interrogation pulse transmission. The trigger for the $A_0$ (or $G_0$) pulse pair is the information position pulse passed by the circuit of FIGURE 21.

Pulse decoding is accomplished at the output of the station's receiver by the circuit of FIGURE 24. The video signal from the receiver is applied to a threshold detector 480 which changes state when the video voltage exceeds a critical magnitude. Received pulses below a predetermined threshold are blocked to minimize the possibility of confusion, as explained previously. From the threshold detector, the received signal is sent to two delay lines 482 and 484, with line 484 being tapped at points corresponding to the delay of B, I and R pulse pairs. Three AND gates 486, 488 and 490 are used to detect coincidence between pulses from the two delay lines. Considering any one of the AND gates, the difference in time delay between the two inputs is equal to the time delay between the pulse pair to be detected. The first and last pulses then coincide and a single pulse appears at each AND gate output. Two delay lines were used instead of one, to keep the decoding delay constant regardless of the type of pulse being decoded.

K. *Receiver-transmitter*

Figure 25:
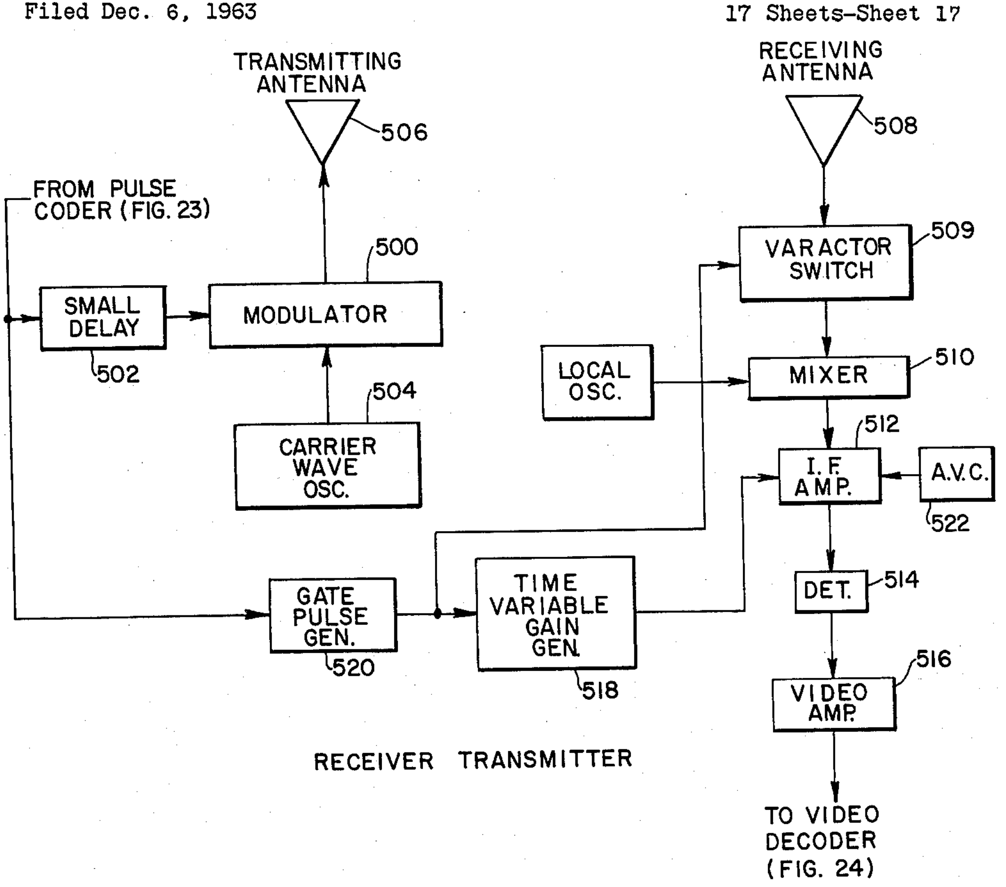
FIGURE 25 is a block diagram of a receiver-transmitter for use with the system.

In the system of the present invention, all transmissions are accomplished on a single channel. This greatly simplifies the design of both the transmitter and receiver. The receiver-transmitter used in the present invention is of conventional construction and the block diagram is shown in FIGURE 25. The coded pulses from FIGURE 23 are applied through a delay circuit 502, having a small delay, to a modulator 500. The coded pulses are modulated onto a carrier wave produced by a carrier wave oscillator 504 and the composite wave is transmitted over antenna 506.

The transmitting and receiving antennas 506 and 508 preferably have different locations on the aircraft, say probably the top and bottom of the fuselage. A certain amount of isolation results therebetween. However, to adequately protect first mixer 510 in the superheterodyne receiver, a varactor switch 509 is included between the receiving antenna 508 and the first mixer 510 to introduce additional attenuation during the transmitted pulse. This switch is operated by a pulse from a gate pulse generator 520 which is triggered by the pulses from the pulse coder. The small delay introduced by circuit 502 in the modulator input permits the switch 510 to gate the receiver off before the transmitter is turned on.

Following the first mixer 510 the received signals are amplified in a wide-band IF amplifier 512, detected by detector 514, and amplified in video amplifier 516. The gain of the IF amplifier 512 is time-varied by a time variable gain signal generator 518 from zero during the occurrence of the transmitter pulse to maximum at the time of receiving pulses from maximum range stations so that the received pulses are all roughly the same amplitude at the detector 516. IF gain is varied by changing the DC bias on the IF amplifier stages, with the gain-waveform of generator 518 being initiated by the gate pulse generator 520. An automatic volume control (AVC) is also provided to take care of average or slow occurring gain variations.

XI. CONCLUSION

By using the system of the present invention, a number of stations either fixed or movable which are initially unsynchronized, can obtain synchronism between their oscillators (clocks). This is done without the need for any master synchronization apparatus, such as an atomic clock, to which all stations must synchronize. Instead, the various stations operating in a field effectively synchronize to each other until a common synchronism is achieved. Once this is done, each station can measure the range to other synchronized stations with a high degree of accuracy. It should also be understood that the system can operate without any fixed station at all.

The present system further permits all stations, either fixed or movable, to transmit and receive at the same radio frequency. This results in efficient use of the available radio frequency spectrum, simplicity of equipment, maximum receiver sensitivity, and minimum transmitter power.

While preferred embodiments of the invention have been described above, it will be understood that these are illustrative only, and the invention is limited solely by the appended claims.

I claim:

1. A system for synchronizing the production of first signals at two stations comprising at each station,
- means for producing said first signals,
- means for measuring the difference in time between the production of said first signals at each station,
- and means responsive to a measured difference in time for changing the time of production of said first signals to a time approximately half way between the time difference measured.

2. A system for synchronizing the production of first signals at two stations comprising at each station,
- means for producing said first signals,
- means for transmitting said first signals,
- means for receiving said first signals transmitted by the other station,
- means responsive to the transmission and reception of said first signals for measuring the time difference between the production of said first signals at the two stations,
- and means responsive to a measured time difference for changing the time of production of said first signals to a time approximately half way between the time difference measured.

3. A system as set forth in claim 2 wherein each station is provided with means for transmitting said first signals on a random basis, and means are provided for controlling the means for changing of the time of production of said first signals to be effective only when a first signal is received after transmission of a first signal.

4. A system for synchronizing the production of first signals at two stations comprising at each station, means for producing said first signals,
means for transmitting said first signals,
means for receiving said first signals, transmitted by the other station,
means responsive to the reception of a first signal for transmitting a second signal,
means for receiving the transmitted second signal,
means responsive to the transmission of a first signal and the reception of first and second signals for measuring the time difference between the production of said first signals at the two stations,
and means responsive to a measured time difference for changing the time of production of said first signals to a time approximately half way between the time difference measured.

5. A system as set forth in claim 4 wherein the means at one of said two stations for changing the time of production of said first signals respectively advances the time of production of said first signals and the means at the other station retards the production by a time equal to approximately one-half the measured time difference.

6. A system as set forth in claim 4 wherein each station is provided with means for transmitting said first signals on a random basis, and means are also provided for controlling the means for changing the time of production of the first signals to be effective only when a first signal is received from the other station and a second signal is received in response to the transmitted first signal.

7. A system for synchronizing the production of first signals at two stations comprising at each station,
means for producing said first signals,
means for transmitting synchronizing signals,
means for receiving said transmitted synchronizing signals,
means responsive to the received synchronizing signals for measuring the time difference between the production of said first signals at the two stations,
and means responsive to a measured time difference for changing the time of production of said first signals to a time approximately half way between the time difference measured.

8. A system for synchronizing the production of first signals at two stations comprising at each station,
means for producing said first signals,
means for transmitting synchronizing signals,
means for receiving said transmitted synchronizing signals,
means responsive to the received synchronizing signals for measuring the time difference between the production of said first signals at the two stations,
means at the one of said two stations producing said first signals the earliest and responsive to the measured time difference for retarding the time of production of said first signals by a time equal to approximately one half of the time difference measured,
and means at the one of said two stations producing said first signals the latest and responsive to the measured time difference for advancing the time of production of said first signals by a time equal to approximately one half the time difference measured.

9. A system for synchronizing the production of first signals at two stations comprising at each station,
means for producing said first signals,
means for transmitting said first signals,
means for receiving said first signals, transmitted by the other station,
means responsive to the transmission and reception of said first signals for measuring the time difference between the production of said first signals at the two stations,
means at the one of said two stations producing said first signals the earliest and responsive to the measured time difference for retarding the time of production of said first signals by a time equal to approximately one half of the time difference measured,
and means at the one of said two stations producing said first signals the latest and responsive to the measured time difference for advancing the time of production of said first signals by a time equal to approximately one half the time difference measured.

10. A system for synchronizing the production of first signals at two stations comprising at each station,
means for producing said first signals,
means for transmitting said first signals,
means for receiving said first signals, transmitted by the other station,
means responsive to the reception of a first signal for transmitting a second signal,
means for receiving the transmitted second signal,
means responsive to the transmission of a first signal and the reception of first and second signals for measuring the time difference between the production of said first signals at the two stations,
means at the one of said two stations producing said first signals the earliest and responsive to the measured time difference for retarding the time of production of said first signals by a time equal to approximately one half of the time difference measured,
and means at the one of said two stations producing said first signals the latest and responsive to the measured time difference for advancing the time of production of said first signals by a time equal to approximately one half the time difference measured.

11. A system for synchronizing the signal transmissions of two stations comprising at each station,
means for transmitting a first signal,
means for receiving the first signal transmitted by the other station,
means for transmitting a second signal in response to a received first signal,
means for receiving the second signal transmitted in response to a first signal,
means responsive to the transmitted first signal and to the received first and second signals for adjusting the time of transmission of the next first signal to make the next received first signal occur at a time halfway between the next transmitted first signal of a station and the second signal received in reply to the next first signal.

12. A system for synchronizing the signal transmissions of two stations comprising at each station,
means for transmitting a first signal,
means for receiving the first signal transmitted by the other station,
means for transmitting a second signal in response to a received first signal,
means for receiving the second signal transmitted in response to a first signal,
means at the station transmitting the first signal earlier and responsive to the said received first and second signals for retarding the time of transmission of the next first signal of that station to make the next received first signal from the other station occur at a time which is closer to a time halfway between the next transmitted first signal of that station and the second signal received from the other station in reply to the transmitted next first signal.

13. A system for synchronizing the signal transmissions of two stations comprising at each station,
means for transmitting a first signal,
means for receiving the first signal transmitted by the other station,
means for transmitting a second signal in response to a received first signal,
means for receiving the second signal transmitted in response to a first signal,
means at the station transmitting the first signal later and responsive to the said received first and second signals for advancing the time of transmission of the next first signal of that station to make the next received first signal from the other station occur at a time which is closer to a time halfway between the next transmitted first signal of that station and the second signal received from the other station in reply to the transmitted next first signal.

14. A system for synchronizing the signal transmissions of the various stations of a group of stations comprising at each station in the group, means for transmitting first signals at random times, means for receiving the transmitted first signals from other stations, means for transmitting a second signal in response to a received first signal, means for receiving the second signal transmitted in response to the transmitted first signal of that station, means responsive to the transmitted first signal and to the received first and second signals for adjusting the time of transmission of the next first signal to be more closely in synchronism to that of the first signal of the station transmitting the second signal received in response to the transmitted first signal.

15. A system for synchronizing the signal transmission of the various stations of a group of stations comprising at each station in the group, means for randomly transmitting first signals at periodically occurring time intervals, means for receiving the transmitted first signals from other stations, means for transmitting a second signal in response to the first signal received from another station after the periodic time interval at which a first signal is transmitted, means for receiving the second signal transmitted from the other station in response to the transmitted first signal, and means responsive to the transmitted first signal and the first received first signal and the received second signal from the other station for measuring the time difference between the occurrence of the transmission of the first signals at a respective station and at the other station from which the second signal was received.

16. A system for synchronizing the signal transmission of the various stations of a group of stations comprising at each station in the group, means for randomly transmitting first signals at periodically occurring time intervals, means for receiving the transmitted first signals from other stations, means for transmitting a second signal in response to the first first signal received from another station after the periodic time interval at which a first signal is transmitted, means for receiving the second signal transmitted from the other station in response to the transmitted first signal, means responsive to the transmitted first signal and the first received first signal and the received second signal from the other station for measuring the time difference between the occurrence of the transmission of the first signals at a respective station and at the other station from which the second signal was received, and means responsive to a measured time difference for adjusting the time of transmission of the next first signal.

17. A system for synchronizing the signal transmissions of first signals from two stations in a group of stations comprising at each station in the group means for transmitting first signals at random times, means for receiving the first signals transmitted by other stations, means for transmitting a second signal in response to the first first signal, received after transmission of a first signal, means for receiving the second signal transmitted in response to the transmitted first signal of the station, means responsive to the transmitted first signal, to the first received first signal and to the second signal received in response to the transmitted first signal for adjusting the time of transmission of the next first signals to a time closer to the time of transmission of the next first signal of the station from which the second signal was received.

18. A system for synchronizing the transmissions of first signals of stations in a group of stations comprising at each station in the group means for producing periodic position signals, means for transmitting a first signal at a time coincident with one of said position signals, means for receiving the first signals transmitted by other stations, means for transmitting a second signal in response to the first first signal received from another station after the time of occurrence of the position signal at which the first signal was transmitted and before the occurrence of the next position signal.

means for receiving the second signal transmitted in response to a first signal, means responsive to the received first and second signals for adjusting the time of production of said position signals to make the next received first signal from another station occur at a time which is approximately half way between the time of the next transmitted first signal and the second signal received in reply to this next first signal.

19. A system as set forth in claim 18 wherein means are provided at each station for transmitting said first signals coincident with randomly occurring ones of said first signals coincident with randomly occurring ones of said position signals.

20. A system for synchronizing the transmissions of first signals of stations in a group of stations comprising at each station in the group means for producing periodic position signals, means for transmitting a first signal at a random time coincident with one of said position signals, means for receiving the first signals transmitted by other stations, means for transmitting a second signal in response to the first first signal received from another station after the time of occurrence of the position signal at which the first signal was transmitted and before the occurrence of the next position signal, means for receiving the second signal transmitted in response to a first signal, means responsive to the received first and second signals for adjusting the time of production of said position signals to be more nearly coincident in time with the position signals produced at the station from which the second signal was received.

21. A system for synchronizing the transmissions of first signals of stations in a group of stations comprising at each station in the group means for producing periodic position signals, means for transmitting a first signal at a random time coincident with one of said position signals, means for receiving the first signals transmitted by other stations, means for transmitting a second signal in response to the first first signal received from another station after the time of occurrence of the position signal at which the first signal was transmitted and before the occurrence of the next position signal, means for receiving the second signal transmitted in response to a first signal, means responsive to the transmitted first signal and to the received first and second signals for measuring the time difference between the transmission of the first signal at a respective station and the transmission of the first signal at the station from which the second signal is received, and means responsive to a measured time difference for adjusting the time of production of said position signals to be more nearly coincident in time to the position signals produced by the station from which the second signal is received.

22. A system as set forth in claim 21 wherein the means for adjusting the time of production of said position signals adjusts said signals to compensate for approximately one half the measured time difference.

23. A system for synchronizing the transmissions of a station joining a field of stations to the transmissions of the stations in the field comprising at each station:

means for producing a characteristic signal once during a predetermined time interval, means for producing first signals and second signals, and further comprising at the station joining the field:

means for receiving the characteristic signals from other stations in the field, means connected to said receiving means and responsive to a received characteristic signal of another station for adjusting the time of production of the characteristic signal of the station to occur at a time related to the received characteristic signal, means connected to said receiving means and also responsive to the received characteristic signal of the other station for adjusting the time of production of the first signals, and means responsive to the first and second signals of the other station for further adjusting the time of production of the first signals.

24. A system for synchronizing the transmissions of a station to the transmissions of the stations in a field of stations whose transmissions are already synchronized comprising at each station:

means for transmitting a characteristic signal at a predetermined time occurring in a given time interval, and further comprising at the station synchronizing to the field of stations:

means for receiving the characteristic signals transmitted by the stations in the field, and means for synchronizing the time of transmission of the characteristic signal to the time of reception of one of the received characteristic signals.

25. A system as set forth in claim 24 wherein the station synchronizing to the field of stations also has means connected to the synchronizing means to render it operative to synchronize the transmission of the characteristic signal in response to the first characteristic signal received after the start of the given time interval.

26. A system for synchronizing the transmissions of a station to the transmissions of the stations in a field of stations whose transmissions are already synchronized comprising at each station:

means for producing a number of periodic position signals during a given time interval, and means for transmitting a characteristic signal at a time coincident with a predetermined one of said position signals and at the same predetermined position signal occurring during each given time interval, and further comprising at the station synchronizing to the field of stations:

means for receiving the transmitted characteristic signals, and means for transmitting a characteristic signal at a time coincident with the first characteristic signal received.

27. A system for synchronizing the transmissions of a station to the transmissions of the stations in a field of stations whose transmissions are already synchronized comprising at each station:

means for producing a number of periodic position signals during a given time interval, and means for transmitting a characteristic signal at a time coincident with a predetermined one of said position signals and at the same predetermined position signal occurring during each given time interval, and further comprising at the station synchronizing to the field of stations:

means for receiving the transmitted characteristic signals, and means responsive to the received characteristic signals for adjusting the time of occurrence of the position signals to be synchronized to the reception of the characteristic signal received from the closest station in the field.

28. A system for synchronizing the transmissions of a station joining a field of stations to the synchronized transmissions of the stations in the field comprising at each station:

means for producing a number of periodic position signals during a given time interval, means for transmitting a first signal at a time coincident with at least one of said position signals, means for transmitting a characteristic signal at a time coincident with a predetermined one of said position signals and at the same predetermined position signal occurring during each given time interval, means for receiving the first signals transmitted by other stations, means responsive to a received first signal for transmitting a second signal, and means for receiving said second signals, and further comprising at the station synchronizing to the field of stations:

means for receiving the characteristic signals, means for transmitting a characteristic signal at a time coincident with the characteristic signal received from the closest station, and means responsive to the first and second signals received from the closest station to adjust the time of occurrence of the position signals toward synchronization with the position signals of the closest station.

29. A system for synchronizing the transmissions of a station joining a field of stations to the synchronized transmissions of the stations in the field comprising at each station:

means for producing a number of periodic position signals during a given time interval, means for transmitting a first signal at a time coincident with at least one of said position signals, means for transmitting a characteristic signal at a time coincident with a predetermined one of said position signals and at the same predetermined position signal occurring during each given time interval, means for receiving the first signals transmitted by other stations, means responsive to a received first signal for transmitting a second signal, and means for receiving said second signals, and further comprising at the station synchronizing to the field of stations:

means for receiving the characteristic signals, means responsive to the received characteristic signals for adjusting the time of occurrence of the position pulses to be synchronized to the reception of the characteristic signal from the closest station in the field, and means responsive to the first and second signals received from the closest station to further adjust the time of occurrence of the position signals toward synchronization with the position signals of the closest station.

30. A system for synchronizing the signal transmissions of two stations comprising at each station:

means for producing during a predetermined time interval a predetermined number of position signals, means for transmitting an information signal during one portion of said time interval coincident with a position signal and at a time corresponding to a predetermined positional information characteristic of the station, means for receiving the information signal from the other station, means for transmitting during a second portion of said interval coincident with one of said position signals an interrogation signal, means for also transmitting during the second portion of said interval a reply signal in response to an interrogation signal received from the other station, means for receiving the interrogation signal transmitted by the other station and the reply signal transmitted by the other station in reply to a received interrogation signal, and means responsive to the transmitted interrogation signal and to the received interrogation and reply signals for synchronizing the production of the position signals at the stations by adjusting the time of occurrence of the positional signals at both stations.

31. A system as set forth in claim 30 wherein means are provided at each station for randomly transmitting said interrogation signals whereby each station adjusts the time of occurrence of its position signals after only a fraction of the position signals occurring during the second portion of the interval.

32. A system for synchronizing the signal transmissions of two stations comprising at each station means for producing during a predetermined time interval a predetermined number of position signals, means for transmitting an information signal during one portion of said time interval coincident with a position signal and at a time corresponding to a predetermined positional information characteristic of the station, means for receiving the information signal from the other station, means for transmitting an interrogation signal during a second portion of said interval coincident with one of said position signals, means for also transmitting a reply signal during the second portion of said interval in response to an interrogation signal received from the other station, means for receiving the interrogation signal transmitted by the other station and the reply signal transmitted by the other station in reply to a received interrogation signal, means for measuring the time of reception of the interrogation signal from the other station with respect to the time of transmission of the interrogation signal and the time of reception of the reply signal of the other station, with respect to the time of transmission of the interrogation signal, and means responsive to the respective times measured for adjusting the time of production of the position signals at each station toward synchronization with each other.

33. A system as set forth in claim 32 wherein said means for measuring the times includes means for producing voltages corresponding to the times measured.

34. A system as set forth in claim 33 wherein said means for measuring the times includes means for counting a number of signals occurring during the times measured.

35. A system for synchronizing the signal transmission of two stations comprising at each station:

means for transmitting a first signal at predetermined times occurring within a given time interval, means for receiving the first signal transmitted by the other station, means for transmitting a second signal in reply to the received first signal, means for receiving the second signal transmitted from the other station, means responsive to the transmitted first signal and received first and second signals to adjust the occurrence of the predetermined times at which the next first signal is to be transmitted to be more nearly in synchronism at the two stations.

36. A system as set forth in claim 35 wherein means are provided to transmit said first signals randomly at said predetermined times.

37. A system for adjusting the time of production of position signals comprising a clock generator for continuously producing signals at a given frequency, first counter means connected to said generator for counting the number of signals from said generator, second counter means connected to said generator for counting the signals and for producing a position signal after each occurrence of a predetermined number of counts, means for starting a count of said first counter means in a first direction upon a first occurrence, means for changing the count of said first counter means to a count in a second direction upon a second occurrence, means for applying signals of quadruple the frequency of the signals from said generator to said first counter means upon a third occurrence, means for sensing whether the count of said first counter means crossed a predetermined count at a time between said second and third occurrences, means responsive to said sensing means for causing the quadruple frequency signals to operate said first counter means in said first direction upon sensing said predetermined count and to operate in said second direction when said predetermined count has not occurred, means for terminating the count of said first counter means after said third occurrence when the quadruple frequency signals bring its count to said predetermined count, means responsive to the counting of said quadrupled frequency signals in said first direction by said first counter means for applying signals at a frequency twice that of the signals from said generator to said second counter means between the time of said third occurrence and the occurrence of said predetermined count in said first counter means, and means responsive to the counting of the quadrupled frequency signals in said second direction in said first counter means for interrupting the counting of the generator signals by said second counter means between the time of said third occurrence and the occurrence of a said predetermined count in said first counter means.

38. A system for adjusting the time of production of position signals comprising a clock generator for continuously producing signals at a given frequency, first counter means connected to said generator for counting the number of signals from said generator, means for starting an additive count of said first counter means upon a first occurrence, means for changing the count of said first counter means to a subtractive count upon a second occurrence, means for applying signals of quadruple the frequency of the signals from said generators to said first counter means upon a third occurrence, means for sensing a negative count in said first counter means between said second and third occurrences, means for terminating the count of said first counter means when the quadruple frequency signals bring its count to zero, means responsive to said sensing means for causing the quadruple frequency signals to operate additively in said first counter means upon sensing of a negative count and to operate subtractively upon sensing of a positive count, second counter means for producing an output position signal in response to counting a predetermined number of signals from said generator, means responsive to the subtractive counting of the quadrupled frequency signals in said first counter for interrupting the counting of said second counter means between the time of said third occurrence and the occurrence of a zero count in said first counter means, and means responsive to the additive counting of the quadrupled frequency signals for applying signals at a frequency twice that of the signals from said generator to said second counter means between the time of said third occurrence and the occurrence of a zero count in said first counter means.

39. A system for adjusting the time of production of position signals in a station which produces a first signal and receives second and third signals comprising a clock generator for continuously producing signals at a given frequency, first counter means connected to said generator for counting the number of signals from said generator, second counter means connected to said generator for counting the generator signals and for producing a position signal after each occurrence of a predetermined number of counts, means for producing a first signal, means for starting a count of said first counter means in a first direction in response to said first signal, means for receiving said second and third signals, means for changing the count of said first counter means to a count in a second direction in response to a received second signal, means for applying signals of quadruple the frequency of the signals from said generator to said first counter means in response to a received third signal, means for sensing the occurrence of a predetermined count in said first counter means during the time between receiving said second and third signals and for producing a fourth signal representative thereof, means responsive to said fourth signal for operating said first counter means in said first direction to count said quadruple frequency signals, means responsive to the absence of said fourth signal for operating said first counter means in said second direction to count said quadruple frequency signals, means for sensing the count of said predetermined count in said first counter means in response to said quadruple frequency signals and for producing a fifth signal representative thereof, means responsive to said fourth signal for applying signals at twice the frequency of said generator signals to said second counter means between the time of occurrence of said third and fifth signals, and means responsive to the absence of said fourth signal for interrupting the count of said generator signals by said second counter means between the time of occurrence of said third and fifth signals.

40. The method of synchronizing the signal transmissions of a group of stations comprising the steps of:

transmitting synchronizing signals from each station in the group at random times, successively selecting pairs of stations in the group and synchronizing the signal transmissions of each selected pair of stations by said synchronizing signals.

41. The method of synchronizing the signal transmissions of a group of stations comprising the steps of:

randomly selecting a pair of stations in the group, synchronizing the signal transmissions of the randomly selected pair of stations by moving the times of their respective signal transmissions approximately half way toward each other, selecting at random a second pair of stations in the group, and synchronizing the signal transmissions of the second pair of stations by moving the times of their respective signal transmissions approximately half way toward each other.

42. A system for synchronizing the production of first signals at any two stations in a group of more than two stations comprising at each station in the group:

means for producing said first signals, means for receiving first signals produced by other stations in the group, means responsive during each of a number of periods of time to the stations own first signal and to the first signal received from one other station in the group for measuring the time difference between the production of the first signals at the two stations, and means responsive to the measured time difference for adjusting the time of production of the first signals to a time closer to synchronism with the time of production of later occurring first signals of said one other station in the group.

43. A system for synchronizing the production of first signals at any two stations in a group of more than two stations comprising at each station in the group:

means for producing a first signal during each of a number of periods of time, means for receiving a first signal produced by a different other station in the group during each of a number of periods of time, means responsive to the stations own first signal produced during a period of time and to first signal received from a said other station during the same period for measuring the time difference between the production of said first signals at the two stations, and means responsive to the measured time difference for adjusting the time of production of the first signals to a time closer to synchronism with the time of production of later occurring first signals of said other station.

44. A system for synchronizing the production of first signals at any two stations in a group of more than two stations comprising at each station in the group:

means for producing said first signals, means for receiving first signals produced by other stations in the group, means for producing a second signal in response to each received first signal, means for receiving the second signals produced by other stations in the group, means responsive during each of a number of periods of time; to the stations own first signal, to the first signal received from one other station in the group and to reception of the second signal produced by said one other station for measuring the time difference between the production of the first signals at the two stations, and means responsive to the measured time difference for adjusting the time of production of the first signals to a time closer to synchronism with the time of production of later occurring first signals of said one other station in the group.

45. A method of synchronizing the production of first signals at all stations of a group of stations comprising the steps of:

synchronizing the production of first signals at any pair of stations in the group, and successively synchronizing the production of the first signals of other pairs of stations in the group of stations.

46. A method of synchronizing the production of first signals at all stations of a group of stations comprising the steps of:

(a) measuring during a period of time the difference in time between the production of first signals at one pair of stations in the group, (b) adjusting the time of production of the first signals of said one pair of stations in response to the measured time difference, (c) and repeating steps (a) and (b) for other pairs of stations in the group.

References Cited by the Examiner

UNITED STATES PATENTS 3,153,232 10/1964 Fletcher et al. ------ 343—6.5 X

CHESTER L. JUSTUS, *Primary Examiner.*

LEWIS H. MYERS, *Examiner.*

T. H. TUBBESING, *Assistant Examiner.*

UNITED STATES PATENT OFFICE
CERTIFICATE OF CORRECTION

Patent No. 3,262,111 July 19, 1966

Walton Graham

It is hereby certified that error appears in the above numbered patent requiring correction and that the said Letters Patent should read as corrected below.

Column 9, line 25, for "asynchronized" read -- synchronized --; column 10, line 38, for "indentifiable" read -- identifiable --; column 32, line 52, for "descents" read -- descends --; column 33, line 11, for "occure" read -- occur --; column 36, line 61, for "generator" read -- generation --; column 39, line 34, for "correct" read -- correction --; column 40, line 22, after "inverted" insert -- version of the same delayed waveform produced by inverter --; column 44, line 15, for "FIGURE 21." read -- FIGURE 21, --; line 52, for "FIGURE 2" read -- FIGURE 21 --; in the drawings, Figure 14, delete the conductor connecting the output of multiplier 214 to the upper input of gate 213, add a conductor connecting the output of oscillator 210 to the upper input of gate 213, and add a signal direction arrow to the lower input of gate 202.

Signed and sealed this 10th day of October 1967.

(SEAL)
Attest:

EDWARD M.FLETCHER,JR.
Attesting Officer

EDWARD J. BRENNER
Commissioner of Patents